United States Patent
Yang

(10) Patent No.: US 8,440,355 B2
(45) Date of Patent: May 14, 2013

(54) EQUALIZING ELECTRODE PLATE WITH INSULATED SPLIT-FLOW CONDUCTIVE STRUCTURE

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 12/656,212

(22) Filed: Jan. 21, 2010

(65) Prior Publication Data

US 2011/0177394 A1    Jul. 21, 2011

(51) Int. Cl.
*H01M 4/72* (2006.01)
(52) U.S. Cl.
USPC .......................................... 429/234; 429/238
(58) Field of Classification Search .................. 429/234, 429/238
See application file for complete search history.

(56) References Cited

U.S. PATENT DOCUMENTS

| | | | | |
|---|---|---|---|---|
| 1,451,058 A | * | 4/1923 | Shatzke | 429/241 |
| 3,956,012 A | * | 5/1976 | Scholle | 429/234 |
| 4,572,879 A | * | 2/1986 | Morioka | 429/94 |
| 2006/0226757 A1 | * | 10/2006 | Yang | 313/414 |

FOREIGN PATENT DOCUMENTS

JP    04254779 A  *  9/1992

* cited by examiner

*Primary Examiner* — Zachary Best
(74) *Attorney, Agent, or Firm* — Bacon & Thomas, PLLC

(57) ABSTRACT

The present invention relates to an equalizing electrode plate with insulated split-flow conductive structure, which is a specifically installed insulated split-flow conductive structure with internal conductive body coated with insulator; one end of the insulated split-flow conductive structure connects to the electric energy input/output terminal of the electrode plate, and another end connects to the electrode plate area farther away from the electric energy input/output terminal and/or with larger impedance in the electrode plate; thus the dedicated insulated split-flow conductive structure connects with the electric energy input/output terminal to specifically transmit the electric energy therebetween.

10 Claims, 43 Drawing Sheets

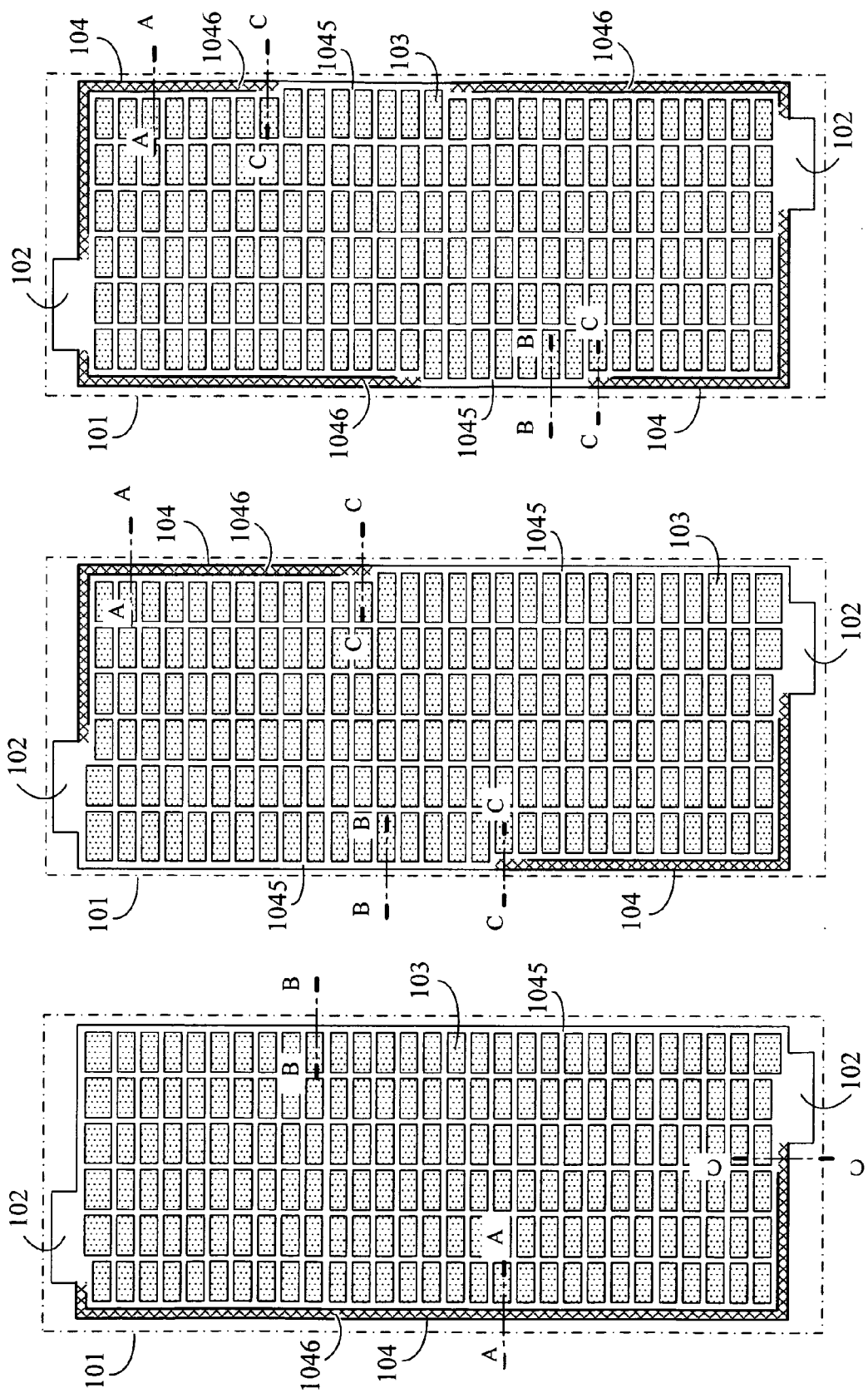

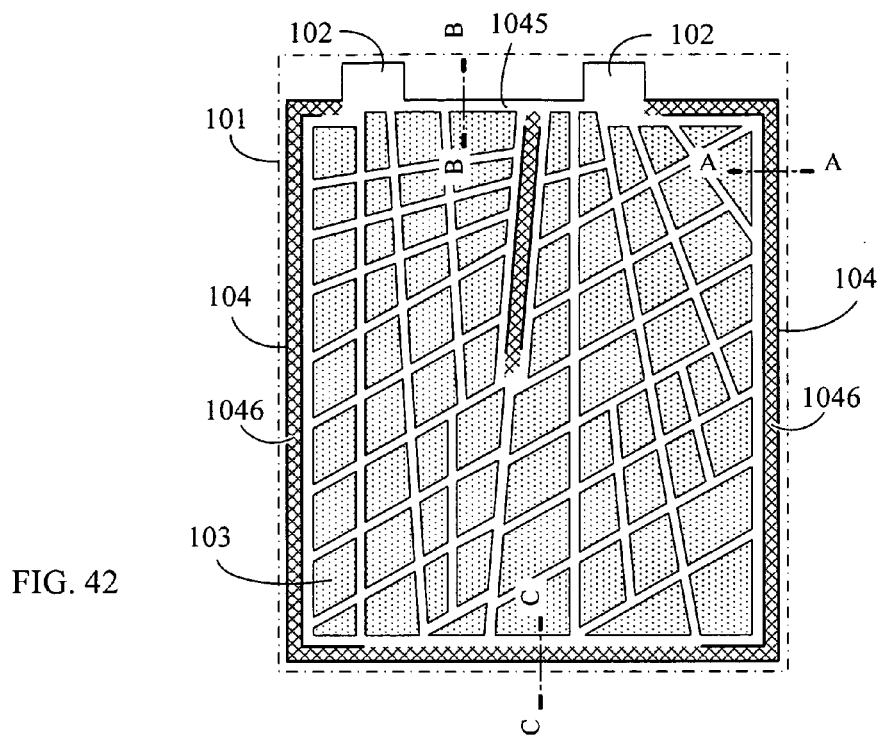
FIG. 42
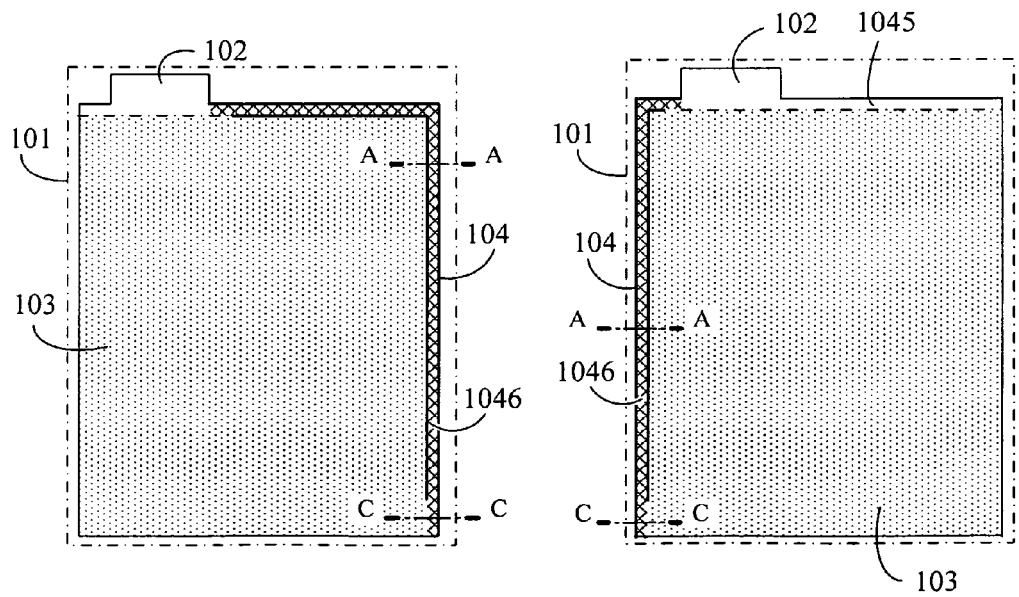
FIG. 43
FIG. 44

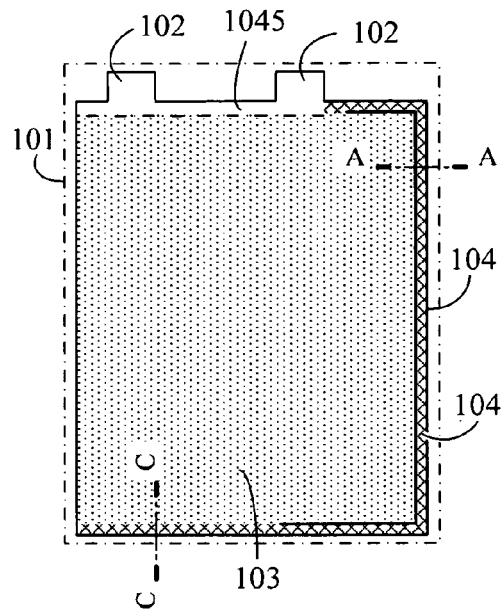
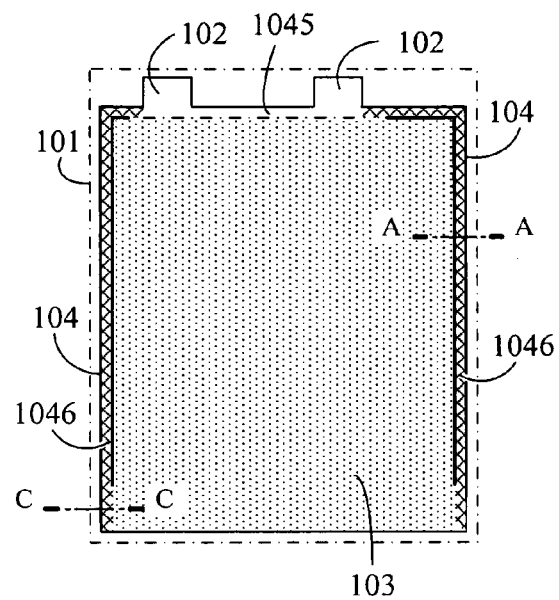
FIG. 49　　　　　　　　FIG. 50
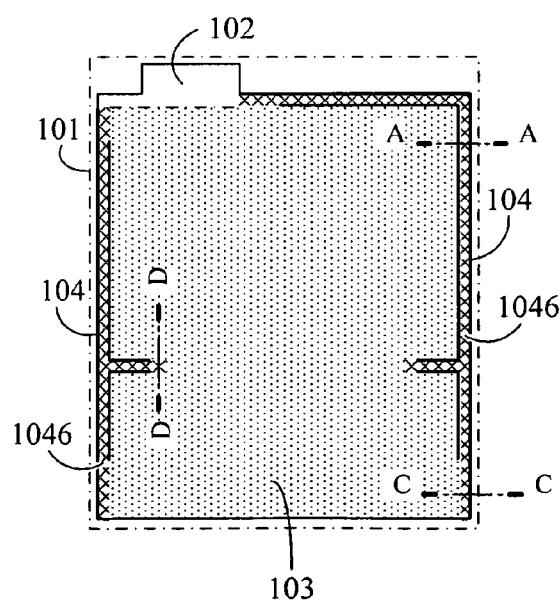
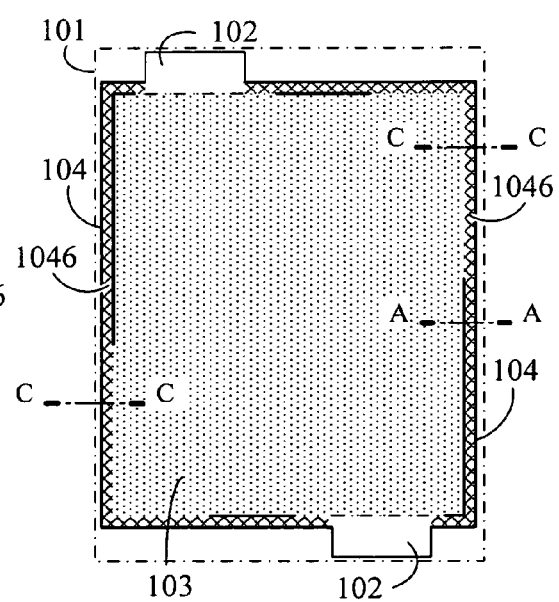
FIG. 51　　　　　　　　FIG. 52

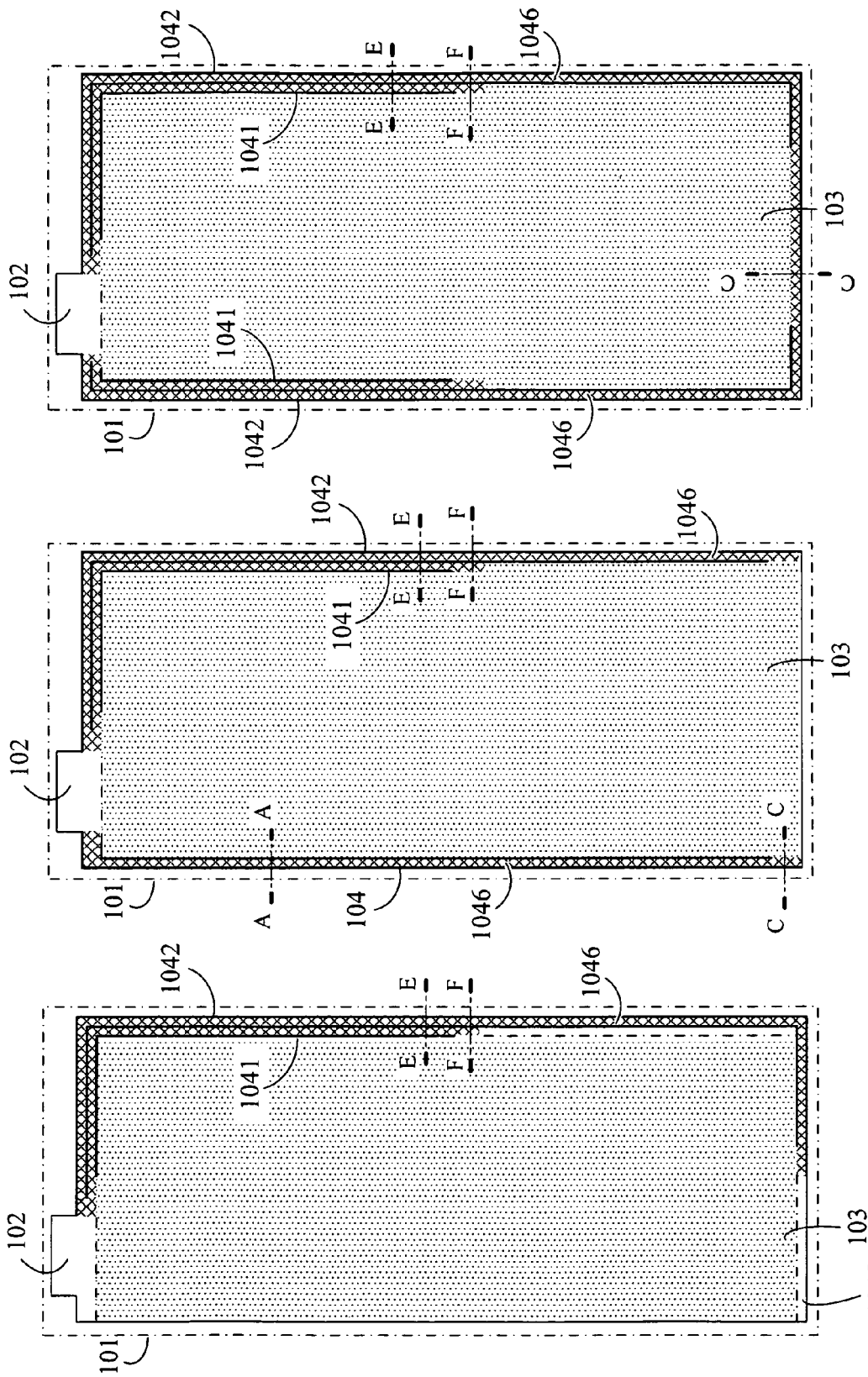

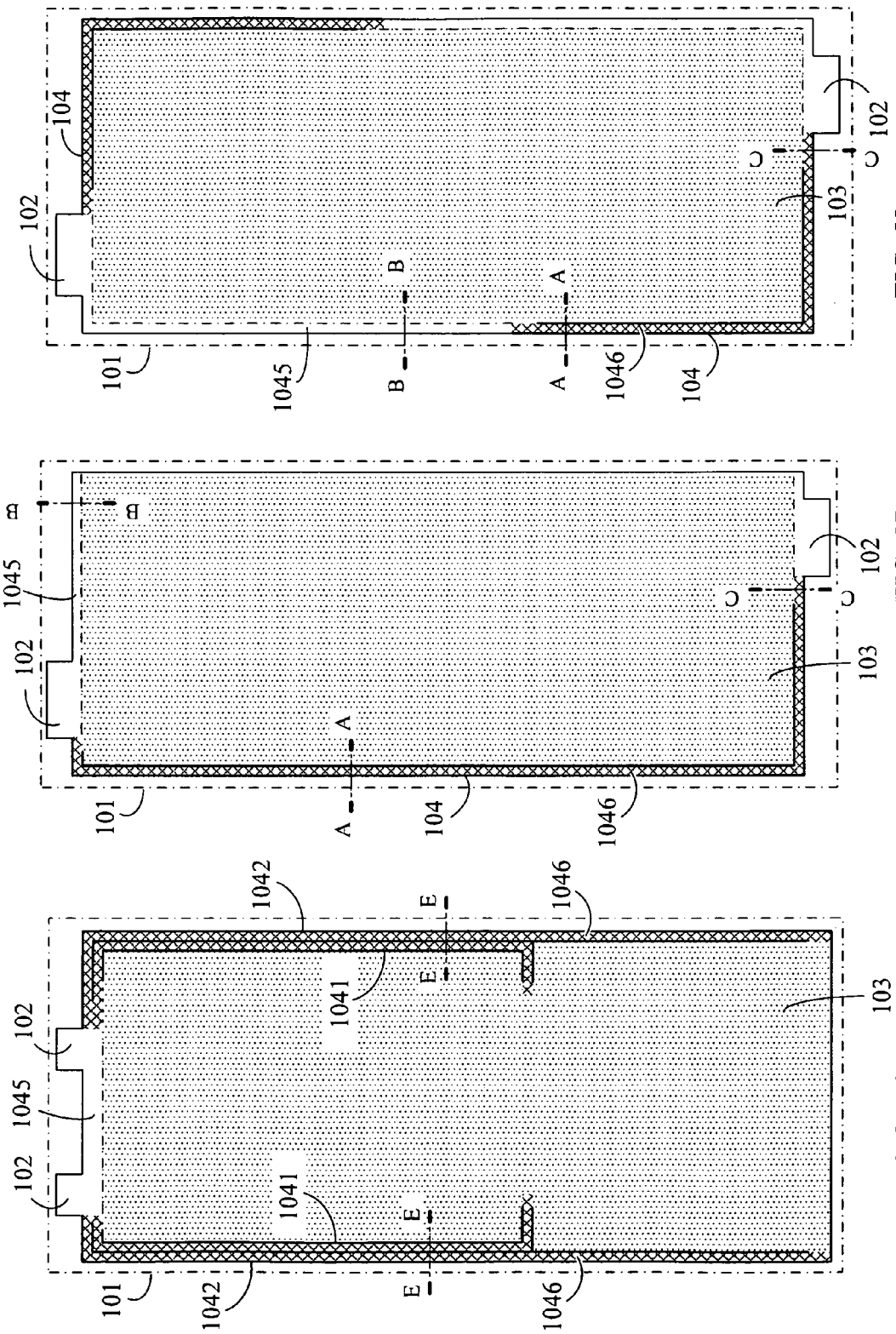

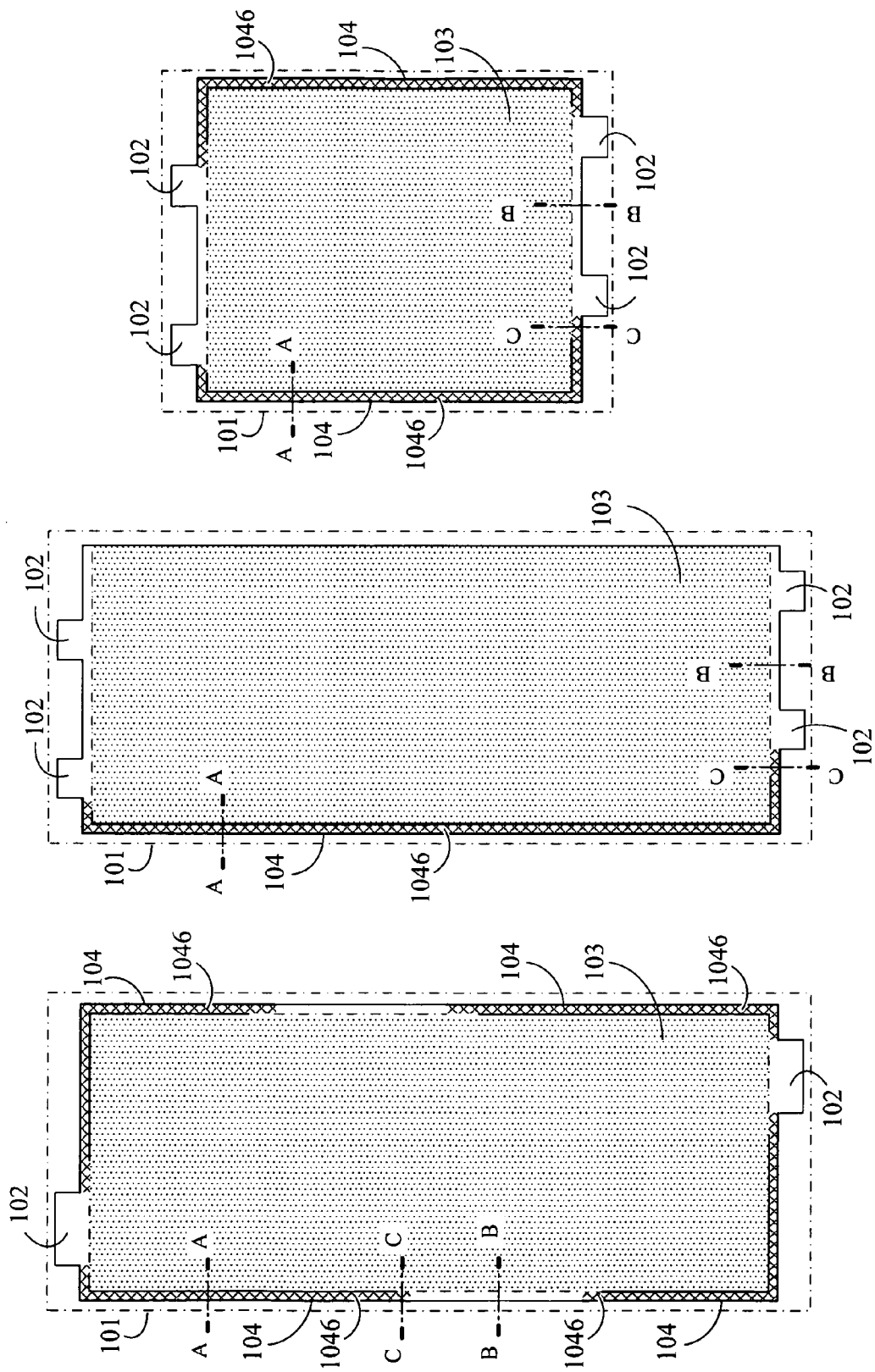

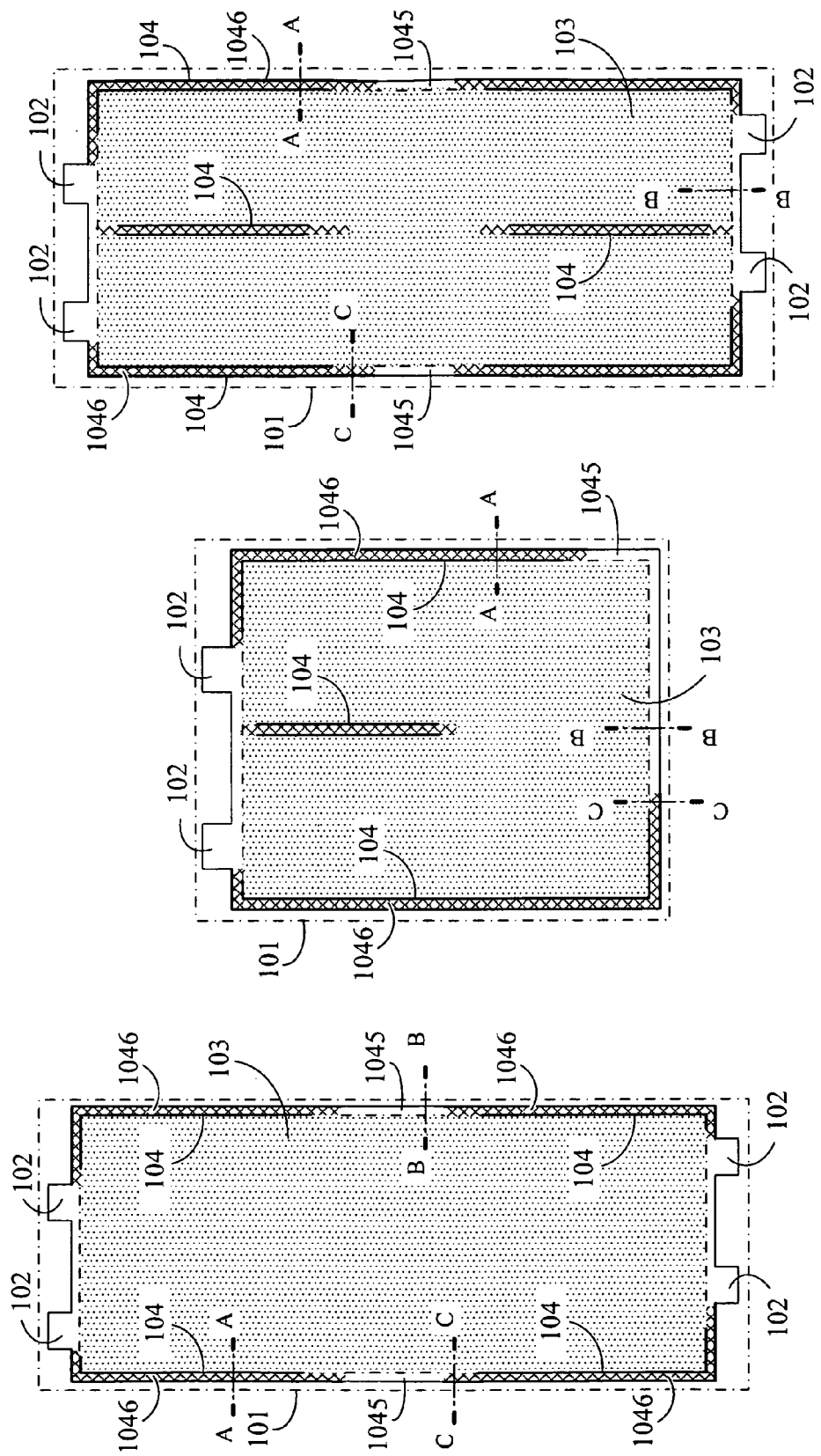

EQUALIZING ELECTRODE PLATE WITH INSULATED SPLIT-FLOW CONDUCTIVE STRUCTURE

BACKGROUND OF THE INVENTION (a) Field of the Invention

The present invention is an innovation for capacitors for electrostatic storage/discharge, or for rechargeable device with the function to transfer electric energy to chemical energy and/or transfer chemical energy to electric energy, or for electrode plate conductive structure used for fuel cell; the electrode plate of the invention is used to constitute power supply and/or rechargeable device, and the feature of the invention relates to a specifically installed insulated split-flow conductive structure with internal conductive body coated with insulator, wherein one end of the insulated split-flow conductive structure connects to the electric energy input/output terminal of the electrode plate, and another end connects to the electrode plate area where the current path farther away from the electric energy input/output terminal and/or the current passing with larger impedance, such as the surrounding part and/or the middle part and/or the bottom of the electrode plate, by way of the dedicated insulated split-flow conductive structure connecting with the electric energy input/output terminal, the electric energy, between the electrode plate area where the current path farther away from the electric energy output terminal and/or the current passing with larger impedance and the electric energy input/output terminal, specifically transmits therebetween, and the conductive body and the contacting electrochemical active substance in every area of the electrode plate can operate in more uniform current density when outputting and/or inputting electric energy.

(b) Description of the Prior Art

The conventional electrode plate is usually installed with one or more electric energy input/output terminals at single side for outputting electrical energy or charging, wherein the impedance between the electrode plate area at another side farther away from the electric energy input/output terminal and the electric energy input/output terminal, and the impedance between the electrode plate area nearer the electric energy input/output terminal and the electric energy input/output terminal, the two impedances are different, thus there is a shortcoming that the current between the above both areas is uneven when outputting and/or inputting electric energy.

SUMMARY OF THE INVENTION

The present invention relates to an equalizing electrode plate with insulated split-flow conductive structure, which is a specifically installed insulated split-flow conductive structure with internal conductive body coated with insulator, wherein one end of the insulated split-flow conductive structure connects to the electric energy input/output terminal of the electrode plate, and another end connects to the electrode plate area in the electrode plate where the current path farther away from the electric energy input/output terminal and/or the current passing with larger impedance when outputting and/or inputting electric energy, by way of the dedicated insulated split-flow conductive structure connecting with the electric energy input/output terminal, the electric energy, between the electrode plate area where the current path farther away from the electric energy output terminal and/or the electrode plate area with larger impedance and the electric energy input/output terminal, specifically transmits therebetween, and the conductive body and the contacting electro-chemical active substance in every area of the electrode plate can operate in more uniform current density when outputting and/or inputting electric energy; the present invention can be applied for plate type or laminate or winding type electrode plate, or for the electrode plate constituting primary battery, rechargeable secondary battery, capacitor, or ultra-capacitor, or fuel cell for transferring chemical energy to electric energy.

BRIEF DESCRIPTION OF THE DRAWINGS

FIG. 16 shows the 16th embodiment of the present invention;
FIG. 17 shows the 17th embodiment of the present invention;
FIG. 18 shows the 18th embodiment of the present invention.

FIG. 42 shows the 42th embodiment of the present invention;
FIG. 43 shows the 43th embodiment of the present invention;
FIG. 44 shows the 44th embodiment of the present invention;
FIG. 49 shows the 49th embodiment of the present invention;
FIG. 50 shows the 50th embodiment of the present invention;
FIG. 51 shows the 51th embodiment of the present invention;
FIG. 52 shows the 52th embodiment of the present invention;
FIG. 53 shows the 53th embodiment of the present invention;
FIG. 54 shows the 54th embodiment of the present invention;
FIG. 55 shows the 55th embodiment of the present invention;
FIG. 56 shows the 56th embodiment of the present invention;
FIG. 57 shows the 57th embodiment of the present invention;
FIG. 58 shows the 58th embodiment of the present invention;
FIG. 59 shows the 59th embodiment of the present invention;
FIG. 60 shows the 60th embodiment of the present invention;
FIG. 61 shows the 61th embodiment of the present invention;
FIG. 62 shows the 62th embodiment of the present invention;
FIG. 63 shows the 63th embodiment of the present invention;
FIG. 64 shows the 64th embodiment of the present invention.

DESCRIPTION OF MAIN COMPONENT SYMBOLS

101: Electrode plate
102, 1021, 1022: Electric energy input/output terminal
103: Electrochemical active substance
104, 1041, 1042: Insulated split-flow conductive structure
1023: Electric energy input/output terminal for independently inputting/outputting electric energy
1045: Conductive body
1046: Insulator

DETAILED DESCRIPTION OF THE PREFERRED EMBODIMENTS

The present invention relates to an equalizing electrode plate with insulated split-flow conductive structure, which is specifically installed insulated split-flow conductive structure with one or more internal conductive bodies coated with insulators, wherein one end of the insulated split-flow conductive structure connects to the electric energy input/output terminal of the electrode plate, and another end connects to the surrounding part and/or the middle part and/or the bottom of the electrode plate, the electrode plate area where the current path farther away from the electric energy input/output terminal and/or the current passing with larger impedance when outputting and/or inputting electric energy, by way of the dedicated insulated split-flow conductive structure connecting with the electric energy input/output terminal, the electric energy, between the electrode plate area where the current path farther away from the electric energy output terminal and/or the electrode plate area with larger impedance and the electric energy input/output terminal, specifically transmits therebetween, and the conductive body and the contacting electrochemical active substance in every area of the electrode plate can operate in more uniform current density when outputting and/or inputting electric energy.

Figure 1:
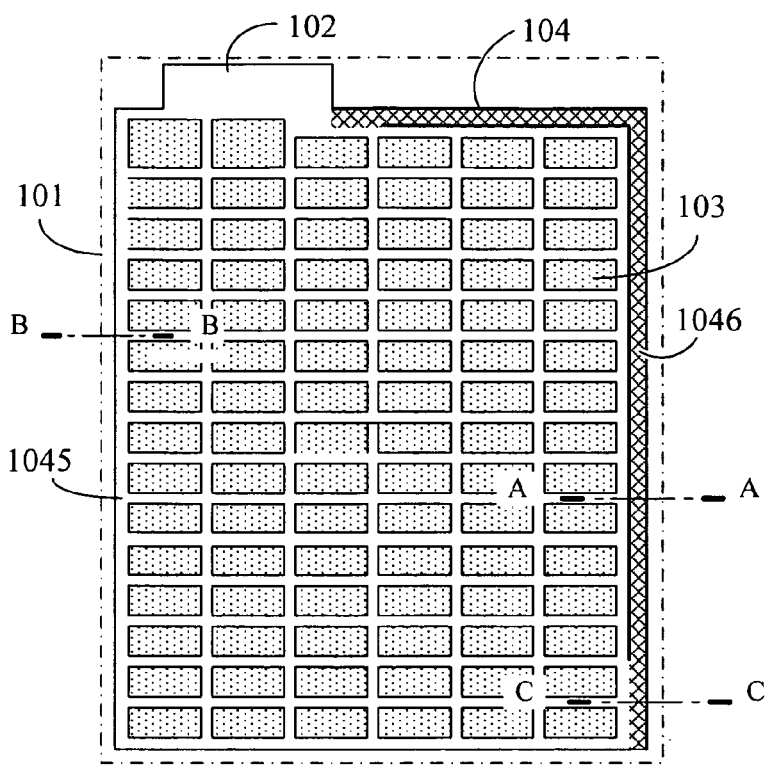
FIG. 1 shows the first embodiment of the present invention.
Figure 70:
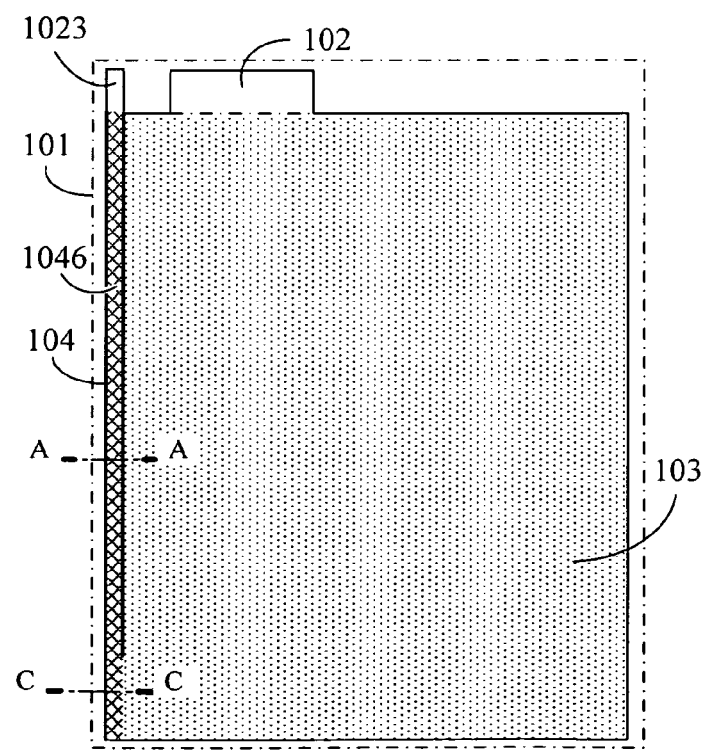
FIG. 70 shows the 70th embodiment of the present invention.

FIGS. 1 to 70 show the principles and foundations of the equalizing electrode plate with insulated split-flow conductive structure, according to the present invention; the following embodiments are provided to facilitate the description, and the main components include:

Electrode plate 101: related to positive and/or negative electrode plate constituted by grid sheet, radiative grid sheet, laminate, or winding type electrode plate, wherein the positive pole and the negative pole of the electrode plate is constituted by same or different conductive material;

Electric energy input/output terminal 102: made of the electrode plate extended or being additionally installed, to connect the electrode plate 101 at one or more sides, wherein every side is installed with one or more electric energy input/output terminals to be the interface for the electrode plate outputting and/or inputting electric energy, and the conductive material of the electric energy input/output terminal and that of the electrode plate are same or different;

Electrochemical active substance 103: related to electrochemical material in gaseous state, liquid state, colloidal state, or solid state; and Insulated split-flow conductive structure 104: constituted by a conductive body 1045, whose material is same as or different from that of the electrode plate, around covered or draped with an insulator 1046, wherein one or more insulated split-flow conductive structures 104 are installed along the side of the electrode plate and/or into the central area of the electrode plate, one end of the insulated split-flow conductive structure 104 connects in a manner of conductive features to the electric energy input/output terminal 102 of the electrode plate 101 or the conductive body of the electrode plate, including welding, heat sealing, spot welding, mechanical riveting, locking, clamping, and blocking, and another end connects in a manner of conductive features to the electrode plate area of the electrode plate where the current path farther away from the electric energy input/output terminal 102 and/or the current passing with larger impedance when outputting and/or inputting electric energy, including welding, heat sealing, spot welding, mechanical riveting, locking, clamping and blocking, for specifically transmitting the electric energy therebetween.

For the equalizing electrode plate with insulated split-flow conductive structure, which is applied for a positive and negative electrode plate, including grid sheet, radiative grid sheet, laminate, or winding type electrode plate constituting primary battery, rechargeable secondary battery, capacitor, or ultra-capacitor, or rechargeable device or fuel cell for transferring electric energy to chemical energy or chemical energy to electric energy.

For the equalizing electrode plate with insulated split-flow conductive structure, the conductive body 1045 of the insulated split-flow conductive structure 104 is made of the following one or more ways, including:

(1) made of the same material as that of the electrode plate;
(2) made of the different material, which is well conductive material with the specific resistance lower than that of the electrode plate;
(3) made of the electrode plate material coated with the conductive body with the specific resistance lower than that of the electrode plate material; and
(4) made of two or more different materials from that of the electrode plate, wherein the materials are ring coating with each other for two or more layers.

The combination of the insulated split-flow conductive structure 104 and the electrode plate 101 is constituted by the following one or more ways, including:

(1) the insulated split-flow conductive structure 104 and the electrode plate 101 are integrated, wherein the conductive body 1045 of the insulated split-flow conductive structure 104 is around covered or coated with the insulator 1046, or draped with the insulator 1046, such as epoxy resin, insulating glue, varnish, insulating paint, or PVF, etc.; one end of the insulated split-flow conductive structure 104 and the electrode plate area set in the electrode plate 101 for directly transmitting current to the electric energy input/output terminal 102 and/or the conductive body of the electrode plate 101 are integrated, another end and the electric energy input/output terminal 102 or the conductive body of the electrode plate 101 are integrated, and the current is directly transmitted in lower impedance therebetween; the insulated split-flow conductive structure 104 in flat or curved shape matches with the electrode plate 101 to form a part of the electrode plate for being co-located in the groove structural body or case of the applying device for electrochemical action;

(2) one end of the insulated split-flow conductive structure 104 and the electrode plate area set in the electrode plate 101 for directly transmitting current to the electric energy input/output terminal 102 and/or the conductive body of the electrode plate 101 are integrated, wherein the conductive body 1045 of the insulated split-flow conductive structure 104 is around covered or coated with the insulator 1046, or draped with the insulator 1046, such as epoxy resin, insulating glue, insulating paint, varnish, or PVF, another end is welded, riveted, clamped, or locked at the electric energy input/output terminal 102 or the conductive body of the electrode plate 101, and the current is directly transmitted in lower impedance therebetween; the insulated split-flow conductive structure 104 in flat or curved shape matches with the electrode plate 101 to form a part of the electrode plate for being co-located in the groove structural body or case of the applying device for electrochemical action;

(3) the insulated split-flow conductive structure 104 in the type of independent conductive line or conductive strip constitutes the conductive body 1045, the conductive body 1045 is around covered or coated with the insulator 1046, or draped with the insulator 1046, such as epoxy resin, insulating glue, insulating paint, varnish, or PVF, and the two ends of the conductive body 1045 of the insulated split-flow conductive structure 104 respectively connect in a manner of conductive features, including welding, heat sealing, spot welding, mechanical riveting, locking, clamping, and blocking, wherein one end connects to the electric energy input/output terminal 102 and/or the conductive body of the electrode plate, and another end connects to the electrode plate area set in the electrode plate 101 for directly transmitting current to the electric energy input/output terminal 102 and/or the conductive body of the electrode plate 101 and parallels the electrode plate 101; when outputting and/or inputting electric energy, the current is directly transmitted in lower impedance between the electrode plate area set in the electrode plate 101 for directly transmitting current to the electric energy input/output terminal 102 and/or the conductive body of the electrode plate 101 and the electric energy input/output terminal 102 and/or the conductive body of the electrode plate 101; and the insulated split-flow conductive structure 104 in flat or curved shape matches with the electrode plate 101 to form a part of the electrode plate for being co-located in the groove structural body or case of the applying device for electrochemical action;

(4) the insulated split-flow conductive structure 104 in the type of independent conductive line or conductive strip constitutes the conductive body 1045, the conductive body 1045 is around covered or coated with the insulator 1046, or draped with the insulator 1046, such as epoxy resin, insulating glue, insulating paint, varnish, or PVF, and the two ends of the conductive body 1045 of the insulated split-flow conductive structure 104 respectively connect in a manner of conductive features, including welding, heat sealing, spot welding, mechanical riveting, locking, clamping, and blocking, wherein one end connects to the electric energy input/output terminal 102 and/or the conductive body of the electrode plate, and another end connects to the electrode plate area set in the electrode plate 101 for directly transmitting current to the electric energy input/output terminal 102 and/or the conductive body of the electrode plate 101; the insulated split-flow conductive structure 104 is installed and superimposed on one or two sides of the electrode plate 101; when outputting and/or inputting electric energy, the current in the current path is directly transmitted in lower impedance between the electrode plate area set in the electrode plate 101 for directly transmitting current to the electric energy input/output terminal 102 and/or the conductive body of the electrode plate 101 and the electric energy input/output terminal 102 or the conductive body of the electrode plate 101; and the insulated split-flow conductive structure 104 in flat or curved shape matches with the electrode plate 101 to form a part of the electrode plate for being co-located in the groove structural body or case of the applying device for electrochemical action; and (5) the independent insulated split-flow conductive structure 104 is installed at the external part of the groove structural body or case of the electrode plate, wherein the independent insulated split-flow conductive structure 104 includes the conductive body 1045 of the insulated split-flow conductive structure 104 covered or coated with the insulator 1046, or draped with the insulator 1046, such as epoxy resin, insulating glue, insulating paint, varnish, or PVF, and the electrode plate area set in the electrode plate 101 for directly transmitting current to the electric energy input/output terminal 102 and/or the conductive body of the electrode plate 101; in the current path when outputting and/or inputting electric energy, between the electrode plate area set in the electrode plate 101 for directly transmitting current to the electric energy input/output terminal 102 and/or the conductive body of the electrode plate 101 and the electric energy input/output terminal 102 and/or the conductive body of the electrode plate 101, the electric energy is directly transmitted in lower impedance therebetween, or the above both separate and respectively operate for outputting and/or inputting electric energy.

For the equalizing electrode plate with insulated split-flow conductive structure, based on the above principles, which is applied for various structural arrangements, and the following embodiments are provided only for descriptions but not limited to the applications.

For the equalizing electrode plate with insulated split-flow conductive structure, as shown in FIGS. 1 to 10, which is constituted by a grid sheet, radiative grid sheet, laminate, or winding type electrode plate, wherein the single side of the electrode plate 101 is installed with one or more electric energy input/output terminals 102, and the electric energy input/output terminal 102 downward extends to one or two sides of the electrode plate 101 for installing with the insulated split-flow conductive structure 104, including extending to the intermediate part of the side of the electrode plate 101; and/or extending to the bottom of the side of the electrode plate 101; and/or extending to the bottom of electrode plate 101 and further extending to the bottom edge of electrode plate 101.

FIG. 1 shows the first embodiment of the present invention; as shown in FIG. 1, the electric energy input/output terminal 102 is installed at the left upper of the electrode plate 101, extends along the upside of the electrode plate 101 to the right side farther away from the electric energy input/output terminal 102, and further downward extends from the right side of the electrode plate 101 to the bottom or near the bottom for installing with the insulated split-flow conductive structure 104, thus the input/output current is direct transmitted between the right side bottom of the electrode plate 101 and the electric energy input/output terminal 102.

Figure 2:
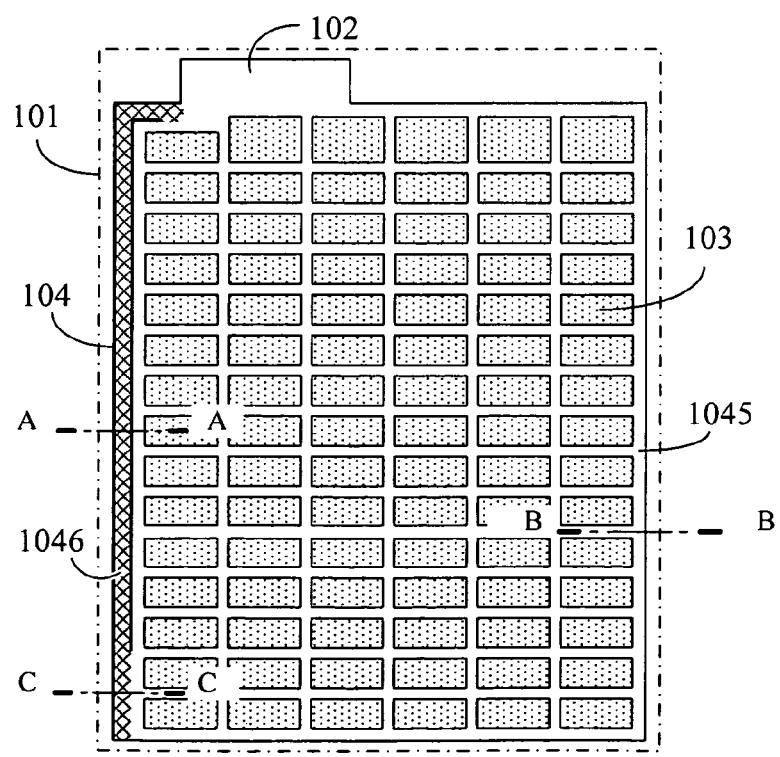
FIG. 2 shows the second embodiment of the present invention.

FIG. 2 shows the second embodiment of the present invention; as shown in FIG. 2, the electric energy input/output terminal 102 is installed at the left upper of the electrode plate 101, and extends along the left upside of the electrode plate 101 and along the left side of the electrode plate 101 to the bottom of the electrode plate 101 for installing with the insulated split-flow conductive structure 104, thus the input/output current is direct transmitted between the bottom of the electrode plate 101 and the electric energy input/output terminal 102.

Figure 3:
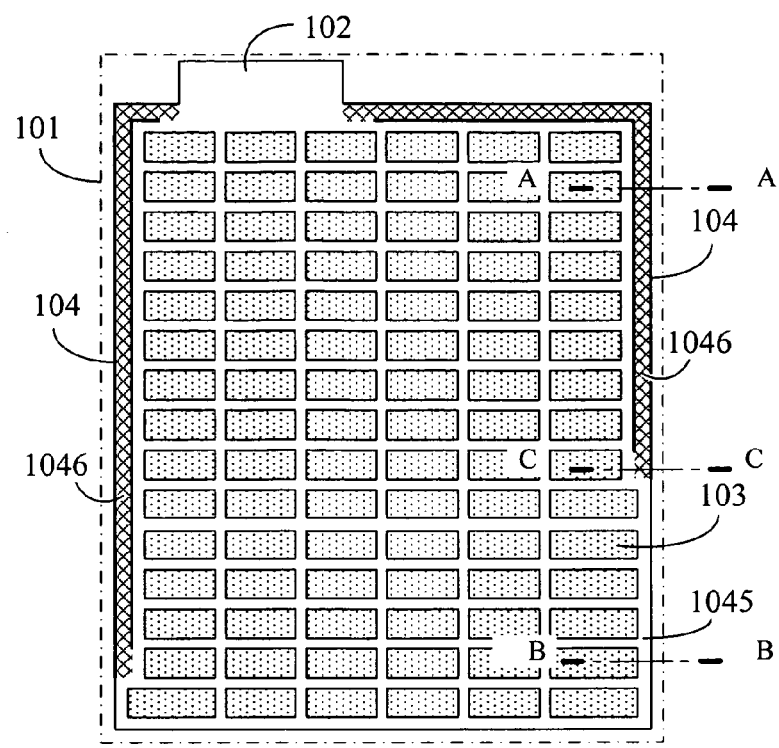
FIG. 3 shows the third embodiment of the present invention.

FIG. 3 shows the third embodiment of the present invention; as shown in FIG. 3, the electric energy input/output terminal 102 is installed at the upside of the electrode plate 101, and extends along the upside of the electrode plate 101 to the right side and the right side near the intermediate part for installing with the insulated split-flow conductive structure 104, thus the input/output current is direct transmitted between the intermediate parts of the two sides of the electrode plate 101 and the electric energy input/output terminal 102; and the electric energy input/output terminal 102 extends along the upside of the electrode plate 101 to the left side and the left side bottom of the electrode plate 101 for installing with the insulated split-flow conductive structure 104, thus the input/output current is direct transmitted between the bottom of the electrode plate 101 and the electric energy input/output terminal 102.

Figure 4:
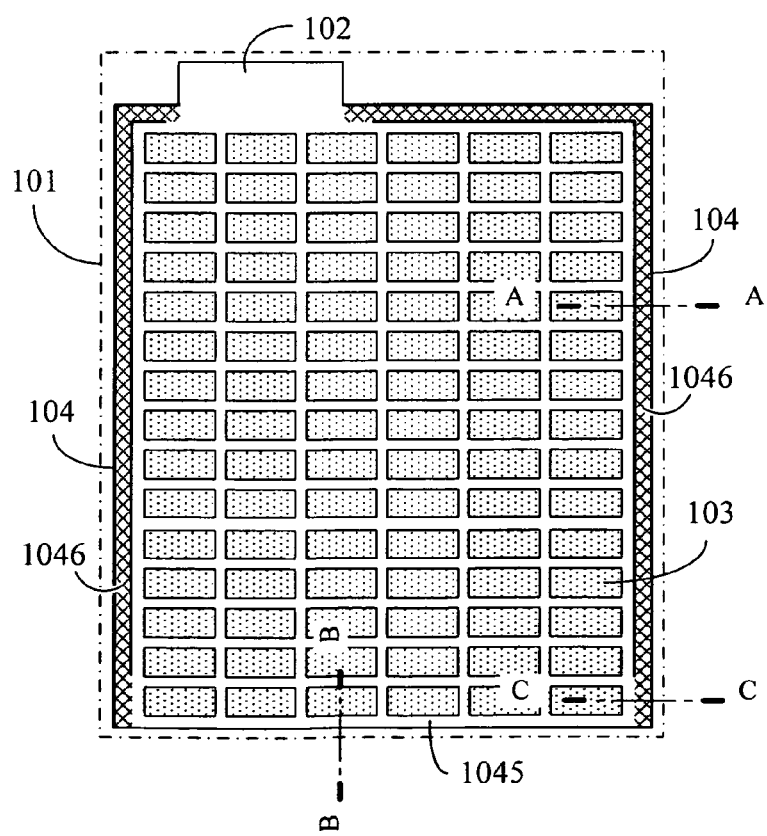
FIG. 4 shows the fourth embodiment of the present invention.

FIG. 4 shows the fourth embodiment of the present invention; as shown in FIG. 4, the electric energy input/output terminal 102 is installed at the upside of the electrode plate 101, extends along the upside of the electrode plate 101 to the left and right sides, and further extends to the bottom for installing with the insulated split-flow conductive structure 104, thus the input/output current is direct transmitted between the bottoms of two sides of the electrode plate 101 and the electric energy input/output terminal 102.

Figure 5:
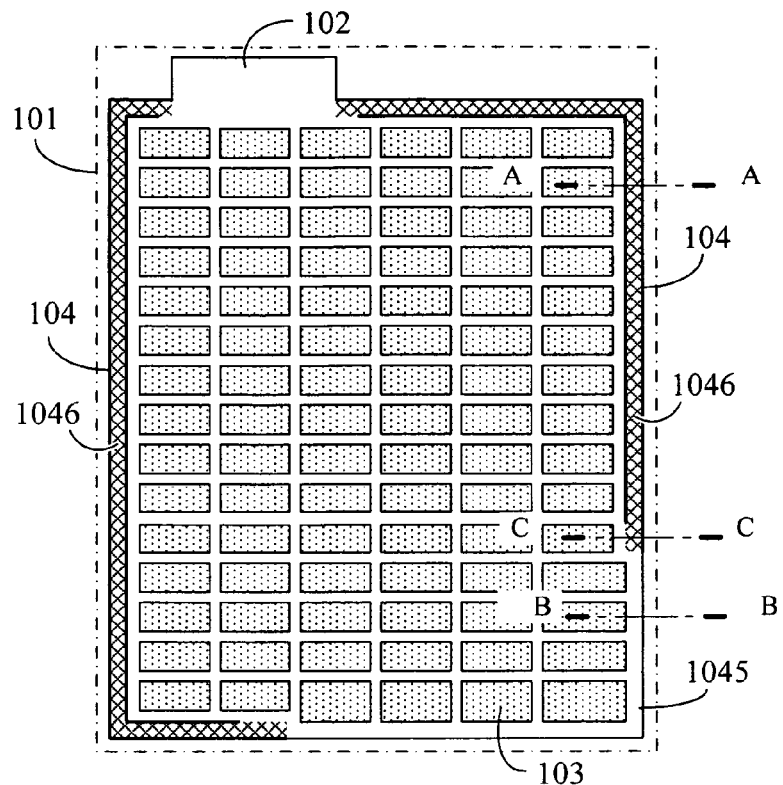
FIG. 5 shows the fifth embodiment of the present invention.

FIG. 5 shows the fifth embodiment of the present invention; as shown in FIG. 5, the electric energy input/output terminal 102 is installed at the upside of the electrode plate 101, and extends along the upside of the electrode plate 101 to two sides for installing with the insulated split-flow conductive structure 104, in which the insulated split-flow conductive structure 104 installed at the left side of the electrode plate 101 nearer the electric energy input/output terminal 102 extends to the bottom near the intermediate part of the electrode plate 101, thus the input/output current is direct transmitted between the intermediate part of the bottom of the electrode plate 101 and the electric energy input/output terminal 102; and the insulated split-flow conductive structure 104 installed at the right side of the electrode plate 101 farther away from the electric energy input/output terminal 102 extends to the intermediate part of the right side near the bottom of the electrode plate 101, thus the input/output current is direct transmitted between the intermediate part of the right side near the bottom of the electrode plate 101 and the electric energy input/output terminal 102.

Figure 6:
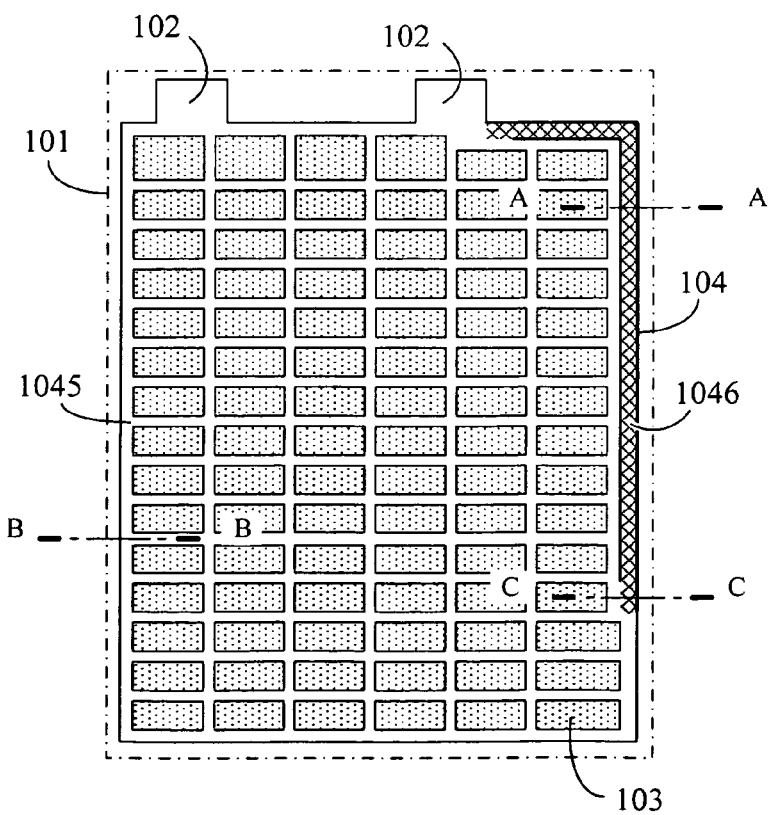
FIG. 6 shows the sixth embodiment of the present invention.

FIG. 6 shows the sixth embodiment of the present invention; as shown in FIG. 6, two electric energy input/output terminals 102 are installed at the upside of the electrode plate 101, in which the electric energy input/output terminal 102 installed at the upside near the left side is nearer the left side of the electrode plate 101, the electric energy input/output terminal 102 installed at the upside near the right side is nearer the right side of the electrode plate 101, and the electric energy input/output terminal 102 installed at the upside near the right side extends along the intermediate part of the right side of the electrode plate 101 to the position near the bottom for installing with the insulated split-flow conductive structure 104, thus the input/output current is direct transmitted between the electric energy input/output terminal 102 installed at the intermediate part of the right side near the bottom of the electrode plate 101 and the electric energy input/output terminal 102 installed at the upside near the right side of the electrode plate 101.

Figure 7:
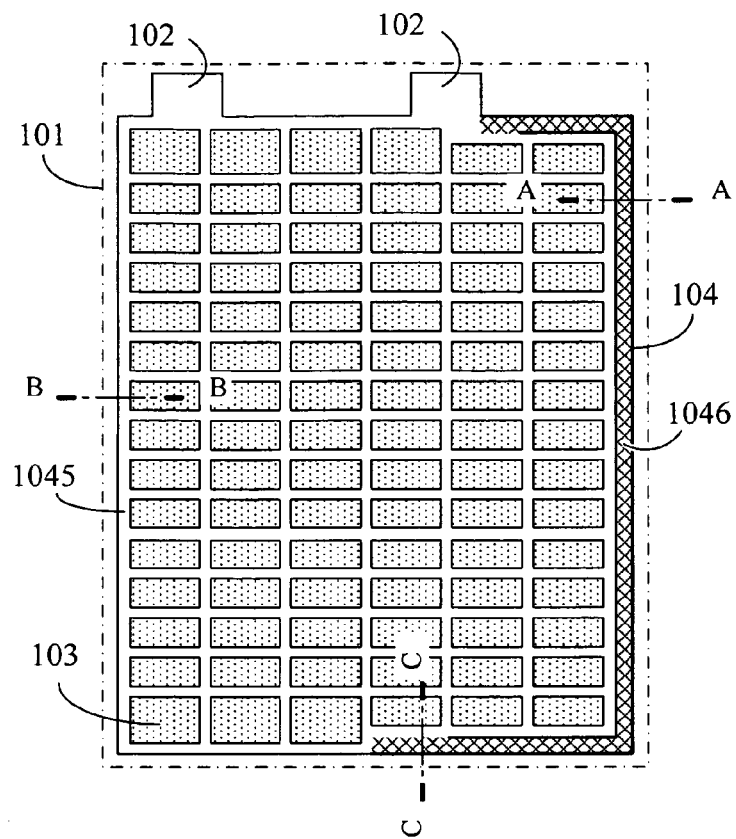
FIG. 7 shows the seventh embodiment of the present invention.

FIG. 7 shows the seventh embodiment of the present invention; as shown in FIG. 7, two electric energy input/output terminals 102 are installed at the upside of the electrode plate 101, in which the electric energy input/output terminal 102 installed at the upside near the left side is nearer the left side of the electrode plate 101, the electric energy input/output terminal 102 installed at the upside near the right side is nearer the right side of the electrode plate 101, and the electric energy input/output terminal 102 installed at the upside near the right side extends along the right side of the electrode plate 101 to the intermediate part of the bottom for installing with the insulated split-flow conductive structure 104, thus the input/output current is direct transmitted between the electric energy input/output terminal 102 installed at the intermediate part of the bottom of the electrode plate 101 and the electric energy input/output terminal 102 installed at the upside near the right side of the electrode plate 101.

Figure 8:
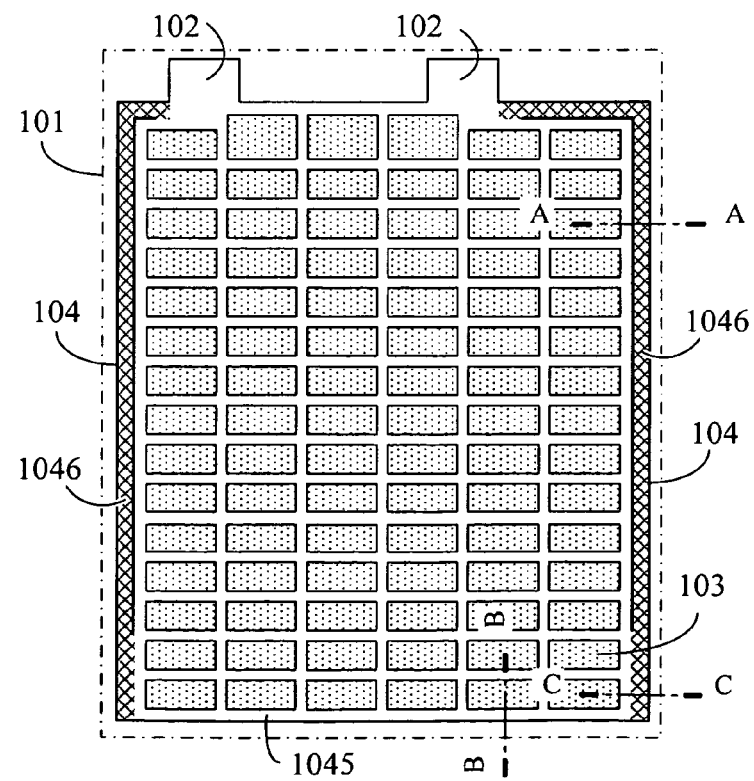
FIG. 8 shows the eighth embodiment of the present invention.

FIG. 8 shows the eighth embodiment of the present invention; as shown in FIG. 8, two electric energy input/output terminals 102 are installed at the upside of the electrode plate 101, in which the electric energy input/output terminal 102 installed at the upside near the left side is nearer the left side of the electrode plate 101, the electric energy input/output terminal 102 installed at the upside near the right side is nearer the right side of the electrode plate 101; the electric energy input/output terminal 102 installed at the upside near the left side downward extends along the left side of the electrode plate 101 to the position near the bottom for installing with the insulated split-flow conductive structure 104, thus the input/output current is direct transmitted between the electric energy input/output terminal 102 installed at the left side near the bottom of the electrode plate 101 and the electric energy input/output terminal 102 installed at the upside near the left side of the electrode plate 101; and the electric energy input/output terminal 102 installed at the upside near the right side downward extends along the right side of the electrode plate 101 to the position near the bottom for installing with the insulated split-flow conductive structure 104, thus the input/output current is direct transmitted between the electric energy input/output terminal 102 installed at the right side near the bottom of the electrode plate 101 and the electric energy input/output terminal 102 installed at the upside near the right side of the electrode plate 101.

Figure 9:
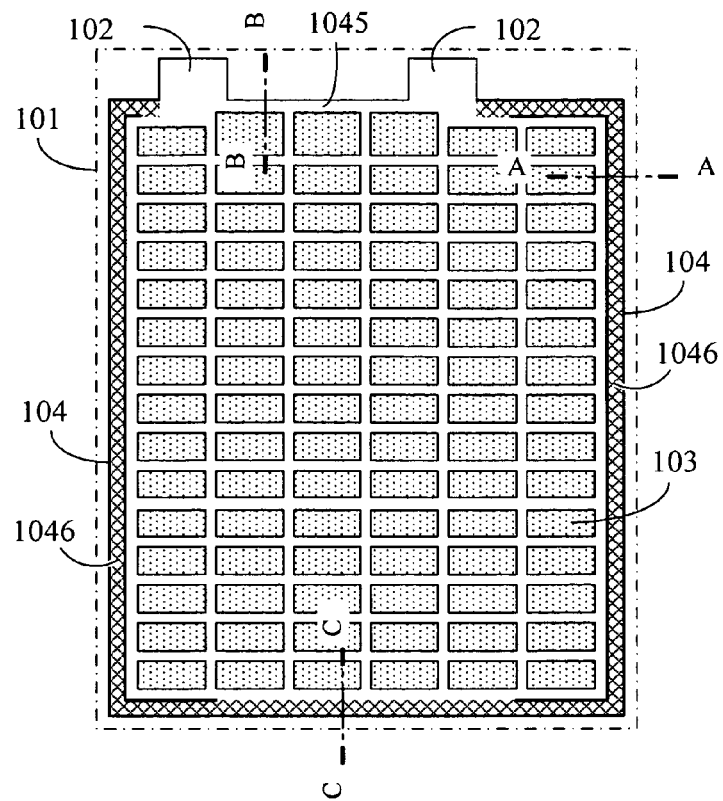
FIG. 9 shows the ninth embodiment of the present invention.

FIG. 9 shows the ninth embodiment of the present invention; as shown in FIG. 9, two electric energy input/output terminals 102 are installed at the upside of the electrode plate 101, in which the electric energy input/output terminal 102 installed at the upside near the left side is nearer the left side of the electrode plate 101, the electric energy input/output terminal 102 installed at the upside near the right side is nearer the right side of the electrode plate 101; the electric energy input/output terminal 102 installed at the upside near the left side downward extends along the left side of the electrode plate 101 to the bottom edge near the position of the intermediate part for installing with the insulated split-flow conductive structure 104, thus the input/output current is direct transmitted between the electric energy input/output terminal 102 installed at the bottom edge near the position of the intermediate part of the electrode plate 101 and the electric energy input/output terminal 102 installed at the upside near the left side of the electrode plate 101; and the electric energy input/output terminal 102 installed at the upside near the right side downward extends along the right side of the electrode plate 101 to the bottom edge near the position of the intermediate part for installing with the insulated split-flow conductive structure 104, thus the input/output current is direct transmitted between the electric energy input/output terminal 102 installed at the bottom edge near the position of the intermediate part of the electrode plate 101 and the electric energy input/output terminal 102 installed at the upside near the right side of the electrode plate 101; the bommom segment of the insulated split-flow conductive structure 104 nears or links with that of the above insulated split-flow conductive structure 104 downward extending from the left side of the electrode plate 101, and is conductive with the electrode plate 101.

Figure 10:
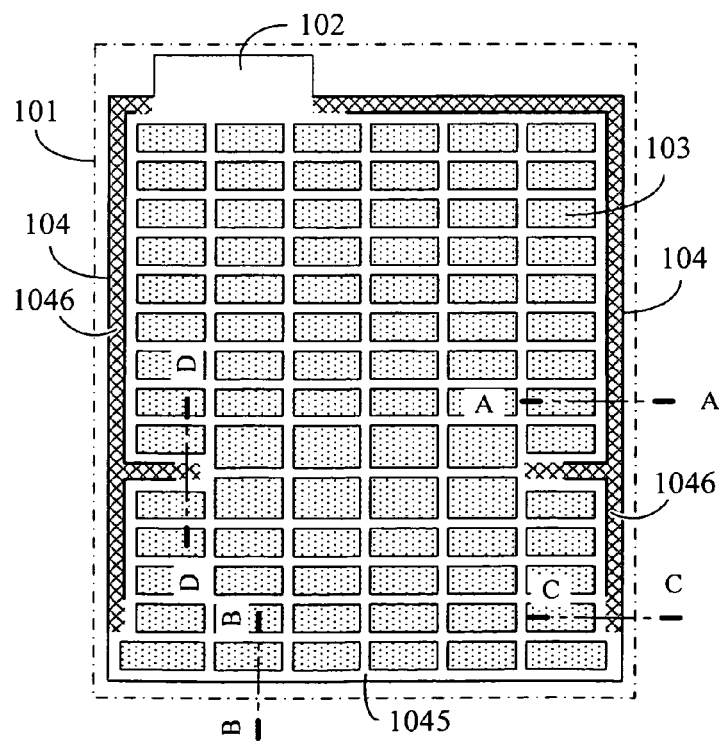
FIG. 10 shows the tenth embodiment of the present invention.

FIG. 10 shows the tenth embodiment of the present invention; as shown in FIG. 10, the electric energy input/output terminal 102 is installed at the upside of the electrode plate 101, and downward extends along the left side and the right side of the electrode plate 101 to the position near the bottom for installing with two insulated split-flow conductive structures 104, thus the input/output current is direct transmitted between two sides near the bottom of the electrode plate 101 and the electric energy input/output terminal 102; and the segments of the insulated split-flow conductive structures 104 installed at two sides near the intermediate part of the bottom are respectively installed with the insulated split-flow conductive structure 104 with shunt function extending inward the electrode plate 101, thus the input/output current is direct transmitted between the segments, near the bottom and the intermediate part of the electrode plate 101, with shunt function extending inward the electrode plate 101, and the electric energy input/output terminal 102.

For the equalizing electrode plate with insulated split-flow conductive structure, as shown in FIGS. 11 to 14, which is constituted by a grid sheet, radiative grid sheet, laminate, or winding type electrode plate, wherein the single side of the electrode plate 101 is installed with one or more electric energy input/output terminals 102, and the electric energy input/output terminal 102 downward extends to one or two sides of the electrode plate 101 for installing with two or more parallel insulated split-flow conductive structures 104, each insulated split-flow conductive structure 104 downward extends to the intermediate part of the side of the electrode plate 101, and/or to the bottom of the side of the electrode plate 101, and/or through the bottom of the side of the electrode plate 101 and further to the bottom edge of electrode plate 101.

Figures 11, 12, 13:
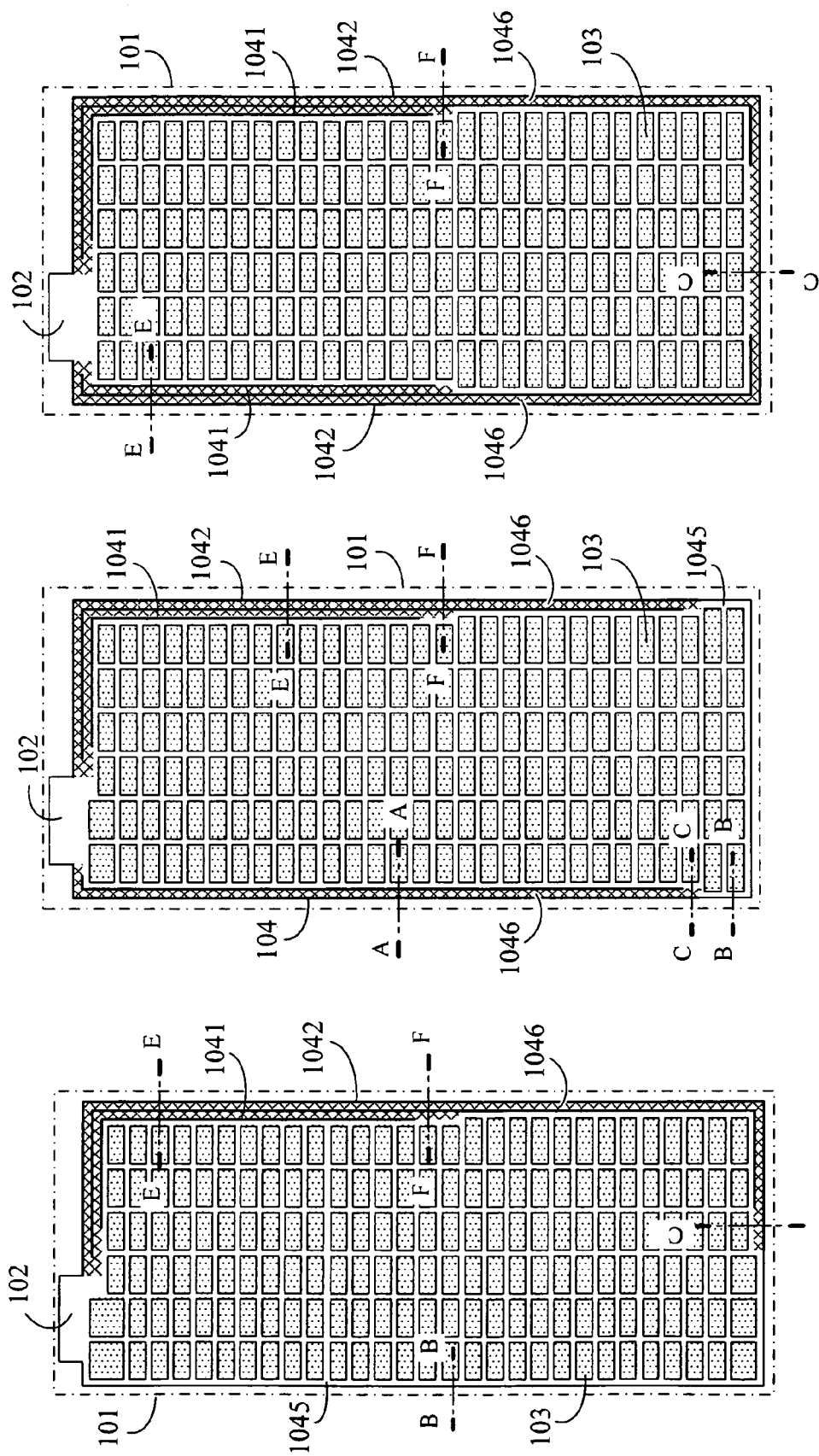
FIG. 11 shows the eleventh embodiment of the present invention.
FIG. 12 shows the 12th embodiment of the present invention.
FIG. 13 shows the 13th embodiment of the present invention.
Figure 99:
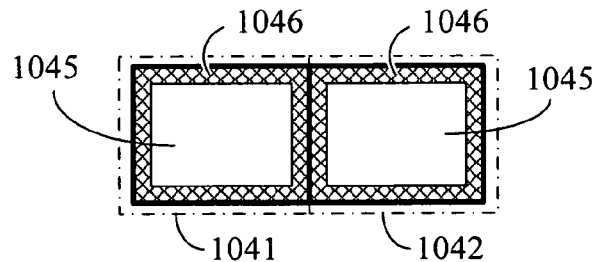
FIG. 99 is the E-E cross-section view of the parallel insulated split-flow conductive structures 104, according to the present invention.

FIG. 11 shows the eleventh embodiment of the present invention; as shown in FIG. 11, the electric energy input/output terminal 102 is installed at the upside near the left side of the electrode plate 101, and extends along the upside to the right side of the electrode plate 101 to be parallel, or as shown in FIG. 99, two insulated split-flow conductive structures 1041 and 1042 are laminated and installed, in which the insulated split-flow conductive structure 1041 extends along the upside of the electrode plate 101 to the right side near the intermediate part of the electrode plate 101, thus the input/output current is direct transmitted between the intermediate part of the right side of the electrode plate 101 and the electric energy input/output terminal 102; and the insulated split-flow conductive structure 1042 extends along the upside of the electrode plate 101 to the right side near the bottom of the electrode plate 101, thus the input/output current is direct transmitted between the right side bottom of the electrode plate 101 and the electric energy input/output terminal 102.

FIG. 12 shows the 12th embodiment of the present invention; as shown in FIG. 12, the electric energy input/output terminal 102 is installed at the upside near the left side of the electrode plate 101, and extends along the upside to the right side of the electrode plate 101 to be parallel, or as shown in FIG. 99, two insulated split-flow conductive structures 1041 and 1042 are laminated and installed, in which the insulated split-flow conductive structure 1041 extends along the upside of the electrode plate 101 to the right side near the intermediate part of the electrode plate 101, thus the input/output current is direct transmitted between the intermediate part of the right side of the electrode plate 101 and the electric energy input/output terminal 102; and the insulated split-flow conductive structure 1042 extends along the upside of the electrode plate 101 to the right side near the bottom of the electrode plate 101, thus the input/output current is direct transmitted between the right side bottom of the electrode plate 101 and the electric energy input/output terminal 102; and the electric energy input/output terminal 102 extends along the upside to the left side of the electrode plate 101, and further downward extends to the left side bottom of the electrode plate 101 for installing with the insulated split-flow conductive structure 104, thus the input/output current is direct transmitted between the left side bottom of the electrode plate 101 and the electric energy input/output terminal 102.

FIG. 13 shows the 13th embodiment of the present invention; as shown in FIG. 13, the electric energy input/output terminal 102 is installed at the upside near the left side of the electrode plate 101, and extends along the upside to the right side of the electrode plate 101 to be parallel, or as shown in FIG. 99, two insulated split-flow conductive structures 1041 and 1042 are laminated and installed, in which the insulated split-flow conductive structure 1041 extends along the upside of the electrode plate 101 to the right side near the intermediate part of the electrode plate 101, thus the input/output current is direct transmitted between the intermediate part of the right side of the electrode plate 101 and the electric energy input/output terminal 102; and the insulated split-flow conductive structure 1042 extends along the upside of the electrode plate 101 to the right side near the bottom of the electrode plate 101, thus the input/output current is direct transmitted between the right side bottom of the electrode plate 101 and the electric energy input/output terminal 102; and the electric energy input/output terminal 102 extends along the upside to the left side of the electrode plate 101 for installing with two insulated split-flow conductive structures 1041 and 1042, in which the insulated split-flow conductive structure 1041 extends along the upside of the electrode plate 101 to the left side near the intermediate part of the electrode plate 101, thus the input/output current is direct transmitted between the intermediate part of the left side of the electrode plate 101 and the electric energy input/output terminal 102;

and the insulated split-flow conductive structure 1042 extends along the upside of the electrode plate 101 to the left side near the bottom of the electrode plate 101, thus the input/output current is direct transmitted between the left side bottom of the electrode plate 101 and the electric energy input/output terminal 102.

Figure 14:
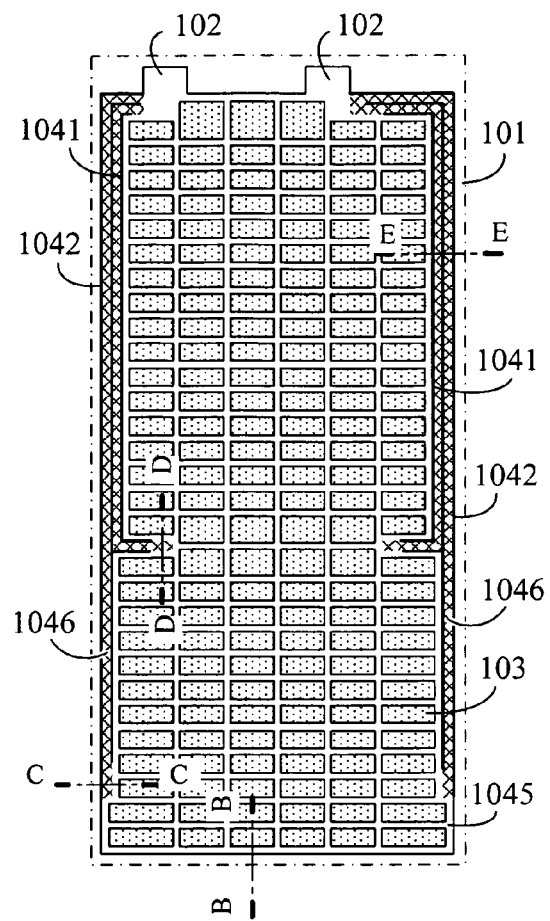
FIG. 14 shows the 14th embodiment of the present invention.

FIG. 14 shows the 14th embodiment of the present invention; as shown in FIG. 14, the electric energy input/output terminal 102 is installed at the upside near the right side of the electrode plate 101, and extends along the upside to the right side of the electrode plate 101 to be parallel, or as shown in FIG. 99, two insulated split-flow conductive structures 1041 and 1042 are laminated and installed, in which the insulated split-flow conductive structure 1041 extends along the upside of the electrode plate 101 to the region where the right side near the intermediate part and bending inwards into the electrode plate 101, thus the input/output current is direct transmitted between the electric energy input/output terminal 102 installed at the region where the intermediate part of the right side and bending inwards into the electrode plate 101 and the electric energy input/output terminal 102 installed at the upside near the right side of the electrode plate 101; and the insulated split-flow conductive structure 1042 extends along the upside of the electrode plate 101 to the right side near the bottom of the electrode plate 101, thus the input/output current is direct transmitted between the electric energy input/output terminal 102 installed at the right side bottom of the electrode plate 101 and the electric energy input/output terminal 102 installed at the upside near the right side of the electrode plate 101; and the electric energy input/output terminal 102 extends along the upside near the left side to the left side of the electrode plate 101 for installing with two insulated split-flow conductive structures 1041 and 1042, in which the insulated split-flow conductive structure 1041 extends along the upside of the electrode plate 101 to the region where the left side near the intermediate part and bending inwards into the electrode plate 101, thus the input/output current is direct transmitted between the electric energy input/output terminal 102 installed at the region where the intermediate part of the left side and bending inwards into the electrode plate 101 and the electric energy input/output terminal 102 installed at the upside near the left side of the electrode plate 101; and the insulated split-flow conductive structure 1042 extends along the upside of the electrode plate 101 to the left side near the bottom of the electrode plate 101, thus the input/output current is direct transmitted between the left side bottom of the electrode plate 101 and the electric energy input/output terminal 102.

For the equalizing electrode plate with insulated split-flow conductive structure, as shown in FIGS. 15 to 21, which is constituted by a grid sheet, radiative grid sheet, laminate, or winding type electrode plate, wherein one or more electric energy input/output terminals 102 are installed at each of two or more sides of the electrode plate 101, and the electric energy input/output terminal 102 downward extends to one or two sides of the electrode plate 101 for installing with the insulated split-flow conductive structure 104, including extending to the intermediate part of the side of the electrode plate 101 for installing with the insulated split-flow conductive structure 104; and/or extending to the bottom of the side of the electrode plate 101 for installing with the insulated split-flow conductive structure 104; and/or extending to the bottom of the side of the electrode plate 101 and further to the bottom edge of electrode plate 101.

Figure 15:
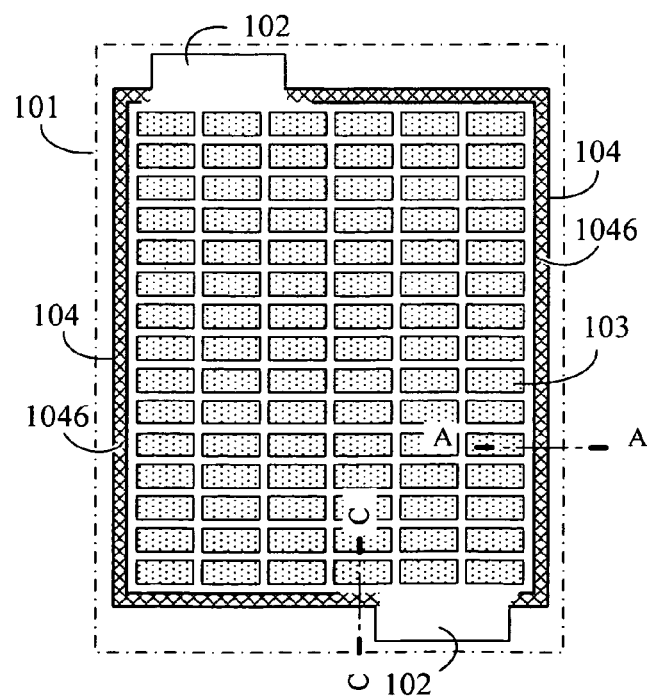
FIG. 15 shows the 15th embodiment of the present invention.

FIG. 15 shows the 15th embodiment of the present invention; as shown in FIG. 15, the electric energy input/output terminal 102 is installed at the upside of the electrode plate 101, and downward extends along the left side of the upside to the intermediate part of the left side of the electrode plate 101 for installing with the insulated split-flow conductive structure 104, thus' the input/output current is direct transmitted between the intermediate part of the left side of the electrode plate 101 and the electric energy input/output terminal 102 installed at the upside of the electrode plate 101; and the electric energy input/output terminal 102 extends along the upside of the electrode plate 101 to the position near the right side of the electrode plate 101 for installing with the insulated split-flow conductive structure 104, thus the input/output current is direct transmitted between the right side of the electrode plate 101 and the electric energy input/output terminal 102 installed at the upside of the electrode plate 101; and the electric energy input/output terminal 102 is installed at the downside of the electrode plate 101, and upward extends from the right side of the electric energy input/output terminal 102 to the intermediate part of the right side of the electrode plate 101 for installing with the insulated split-flow conductive structure 104, thus the input/output current is direct transmitted between the intermediate part of the right side of the electrode plate 101 and the electric energy input/output terminal 102 installed at the downside of the electrode plate 101; the electric energy input/output terminal 102 leftward extends along the downside of the electrode plate 101 to the position near the left lower of the electrode plate 101 for installing with the insulated split-flow conductive structure 104, thus the input/output current is direct transmitted between the left lower of the electrode plate 101 and the electric energy input/output terminal 102; and the electric energy input/output terminal 102 extends along the downside of the electrode plate 101 and from the downside to the intermediate part of the right side of the electrode plate 101 for installing with the insulated split-flow conductive structure 104, thus the input/output current is direct transmitted between the intermediate part of the right side of the electrode plate 101 and the electric energy input/output terminal 102 installed at the downside of the electrode plate 101.

FIG. 16 shows the 16th embodiment of the present invention; as shown in FIG. 16, the electric energy input/output terminal 102 is installed at the left side of the upside of the electrode plate 101, and the electric energy input/output terminal 102 is installed at the right side of the downside of the upside of the electrode plate 101, and the insulated split-flow conductive structure 104 is installed between the left side of the electric energy input/output terminal 102 installed at the upside of the electrode plate 101 and the segment extents along the bottom edge to the electric energy input/output terminal 102 installed at the downside of the electrode plate 101, thus the input/output current is direct transmitted between the electric energy input/output terminal 102 installed at the upside of the electrode plate 101 and the electric energy input/output terminal 102 installed at the upside of the electrode plate 101.

FIG. 17 shows the 17th embodiment of the present invention; as shown in FIG. 17, the electric energy input/output terminal 102 is installed at the left side of the upside of the electrode plate 101, and downward extends along the right side of the upside of the electric energy input/output terminal 102 installed at the upside of the electrode plate 101 to the position near the intermediate part of the right side of the electrode plate 101 for installing with the insulated split-flow conductive structure 104, thus the input/output current is direct transmitted between the position near the intermediate part of the right side of the electrode plate 101 and the electric energy input/output terminal 102 installed at the upside of the electrode plate 101; and the electric energy input/output terminal 102 is installed at the right side of the downside of the electrode plate 101, and leftward and upward extends along the downside of the electrode plate 101 to the position near the intermediate part of the left side of the electrode plate 101 for installing with the insulated split-flow conductive structure 104, thus the input/output current is direct transmitted between the position near the intermediate part of the left side of the electrode plate 101 and the electric energy input/output terminal 102 installed at the downside of the electrode plate 101.

FIG. 18 shows the 18th embodiment of the present invention; as shown in FIG. 18, the electric energy input/output terminal 102 is installed at the left side of the upside of the electrode plate 101, and downward extends along the right side of the electric energy input/output terminal 102 installed at the upside of the electrode plate 101 to the position near the intermediate part of the right side of the electrode plate 101 for installing with the insulated split-flow conductive structure 104, thus the input/output current is direct transmitted between the position near the intermediate part of the right side of the electrode plate 101 and the electric energy input/output terminal 102 installed at the upside of the electrode plate 101; and the electric energy input/output terminal 102 installed at the upside of the electrode plate 101 leftward and downward extends along the upside of the electrode plate 101 to the position near the intermediate part of the left side of the electrode plate 101 for installing with the insulated split-flow conductive structure 104, thus the input/output current is direct transmitted between the position near the intermediate part of the left side of the electrode plate 101 and the electric energy input/output terminal 102 installed at the upside of the electrode plate 101; and the electric energy input/output terminal 102 is installed at the right side of the downside of the electrode plate 101, and leftward and upward extends along the downside of the electrode plate 101 to the position near the intermediate part of the left side of the electrode plate 101 for installing with the insulated split-flow conductive structure 104, thus the input/output current is direct transmitted between the position near the intermediate part of the right side of the electrode plate 101 and the electric energy input/output terminal 102 installed at the downside of the electrode plate 101; and the electric energy input/output terminal 102 installed at the downside of the electrode plate 101 rightward and upward extends along the downside of the electrode plate 101 to the position near the intermediate part of the right side of the electrode plate 101 for installing with the insulated split-flow conductive structure 104, thus the input/output current is direct transmitted between the position near the intermediate part of the right side of the electrode plate 101 and the electric energy input/output terminal 102 installed at the downside of the electrode plate 101.

Figure 19:
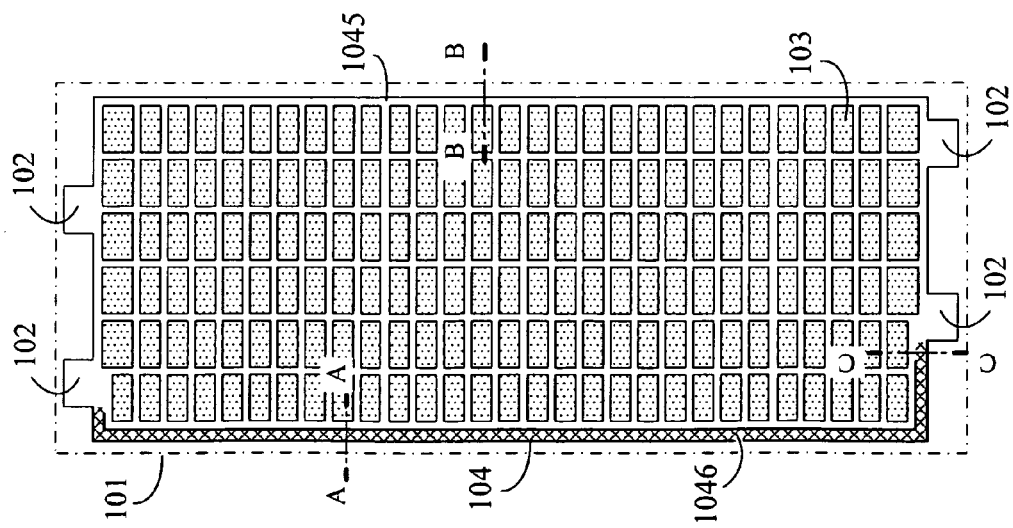
FIG. 19 shows the 19th embodiment of the present invention.

FIG. 19 shows the 19th embodiment of the present invention; as shown in FIG. 19, two electric energy input/output terminals 102 are installed at the upside of the electrode plate 101, in which the electric energy input/output terminal 102 installed at position near the left side of the upside is nearer the left side of the upside of the electrode plate 101, and the electric energy input/output terminal 102 installed at position near the right side of the upside is nearer the right side of the upside of the electrode plate 101; and two electric energy input/output terminals 102 are installed at the downside of the electrode plate 101, in which the electric energy input/output terminal 102 installed at position near the right side of the downside is nearer the right side of the downside of the electrode plate 101, and the electric energy input/output terminal 102 installed at position near the left side of the downside is nearer the left side of the downside of the electrode plate 101; the electric energy input/output terminal 102 installed at the position near the left side of the upside downward extends along the upside of the electrode plate 101 to the left side, and along the left side of the electrode plate 101 to the downside of the electrode plate 101, and rightward extends from the downside of the electrode plate 101 to connect the electric energy input/output terminal 102 installed at the position near the left side of the downside for installing with the insulated split-flow conductive structure 104, thus the input/output current is direct transmitted between the electric energy input/output terminal 102 installed at the position near the left side of the upside and the electric energy input/output terminal 102 installed at the position near the left side of the downside.

Figure 20:
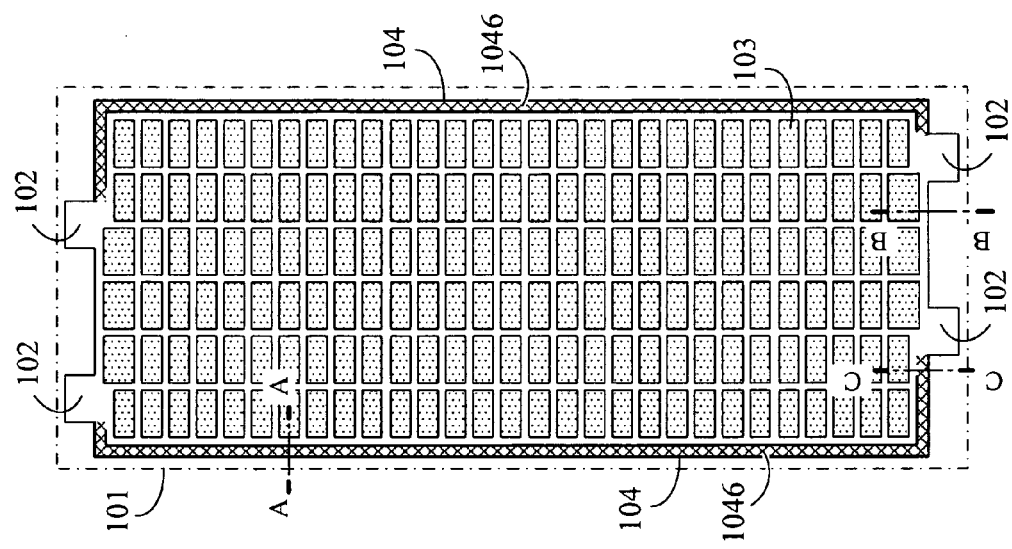
FIG. 20 shows the 20th embodiment of the present invention.

FIG. 20 shows the 20th embodiment of the present invention; as shown in FIG. 20, two electric energy input/output terminals 102 are installed at the upside of the electrode plate 101, in which the electric energy input/output terminal 102 installed at position near the left side of the upside is nearer the left side of the electrode plate 101, and the electric energy input/output terminal 102 installed at position near the right side of the upside is nearer the right side of the electrode plate 101; and two electric energy input/output terminals 102 are installed at the downside of the electrode plate 101, in which the electric energy input/output terminal 102 installed at position near the right side of the downside is nearer the right side of the electrode plate 101, and the electric energy input/output terminal 102 installed at position near the left side of the downside is nearer the left side of the electrode plate 101; the electric energy input/output terminal 102 installed at the position near the left side of the upside downward extends along the neighboring left side to the electric energy input/output terminal 102 installed at the position near the left side of the downside of the left side of the neighboring bottom edge for installing with the insulated split-flow conductive structure 104, thus the input/output current is direct transmitted between the electric energy input/output terminal 102 installed at the position near the left side of the upside and the electric energy input/output terminal 102 installed at the position near the left side of the downside; and the electric energy input/output terminal 102 installed at the position near the right side of the upside downward extends along the neighboring right side to the electric energy input/output terminal 102 installed at the position near the right side of the downside of the right side of the neighboring bottom edge for installing with the insulated split-flow conductive structure 104, thus the input/output current is direct transmitted between the electric energy input/output terminal 102 installed at the position near the right side of the upside and the electric energy input/output terminal 102 installed at the position near the right side of the downside.

Figure 21:
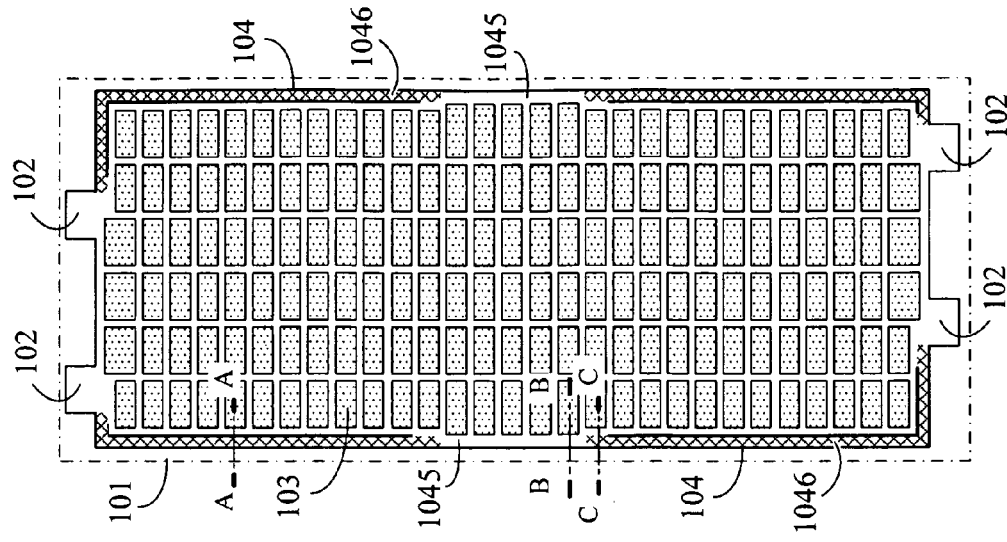
FIG. 21 shows the 21th embodiment of the present invention.

FIG. 21 shows the 21th embodiment of the present invention; as shown in FIG. 21, two electric energy input/output terminals 102 are installed at the upside of the electrode plate 101, in which the electric energy input/output terminal 102 installed at position near the left side of the upside is nearer the left side of the electrode plate 101, and the electric energy input/output terminal 102 installed at position near the right side of the upside is nearer the right side of the electrode plate 101; the insulated split-flow conductive structure 104 is installed along the left side of the electric energy input/output terminal 102 installed at the position near the left side of the upside to the position near the intermediate part of the left side, thus the input/output current is direct transmitted between the position near the intermediate part of the left side of the electrode plate 101 and the electric energy input/output terminal 102 installed at the position near the left side of the upside; and the insulated split-flow conductive structure 104 is installed along the right side of the electric energy input/output terminal 102 installed at the position near the right side of the upside to the position near the intermediate part of the right side, thus the input/output current is direct transmitted between the position near the intermediate part of the right side of the electrode plate 101 and the electric energy input/output terminal 102 installed at the position near the right side of the upside; and two electric energy input/output terminals 102 are installed at the downside of the electrode plate 101, in which the electric energy input/output terminal 102 installed at position near the right side of the downside is nearer the right side of the downside of the electrode plate 101, and the electric energy input/output terminal 102 installed at position near the left side of the downside is nearer the left side of the electrode plate 101; the insulated split-flow conductive structure 104 is installed along the left side of the electric energy input/output terminal 102 installed at the position near the left side of the downside to the position near the intermediate part of the left side of the electrode plate 101, thus the input/output current is direct transmitted between the position near the intermediate part of the left side of the electrode plate 101 and the electric energy input/output terminal 102 installed at the position near the left side of the downside; and the insulated split-flow conductive structure 104 is installed along the right side of the electric energy input/output terminal 102 installed at the position near the right side of the downside to the position near the intermediate part of the right side of the electrode plate 101, thus the input/output current is direct transmitted between the position near the intermediate part of the right side of the electrode plate 101 and the electric energy input/output terminal 102 installed at the position near the right side of the downside.

For the equalizing electrode plate with insulated split-flow conductive structure, as shown in FIGS. 22 to 28, which is constituted by a grid sheet, radiative grid sheet, laminate, or winding type electrode plate, wherein the electric energy input/output terminal 102 or the conductive body of the electrode plate 101 between two electric energy input/output terminals 102 in the non-side electrode plate region of the electrode plate 101 downward extend for installing with the insulated split-flow conductive structure 104, including extending to the intermediate region of the electrode plate, or downward extending through the intermediate region of the electrode plate 101 to the bottom edge of the electrode plate 101, or downward extending through the intermediate region of the electrode plate 101 to the bottom edge of the electrode plate 101 and further extending to the insulated split-flow conductive structure 104; and/or the electric energy input/output terminal 102 downward extends to one or two sides of the electrode plate 101 for installing with the insulated split-flow conductive structure 104, including extending to the intermediate part of the side of the electrode plate 101; and/or extending to the bottom of the side of the electrode plate 101; and/or extending to the bottom of the side of the electrode plate 101 and further extending to the bottom edge of the electrode plate 101.

Figure 22:
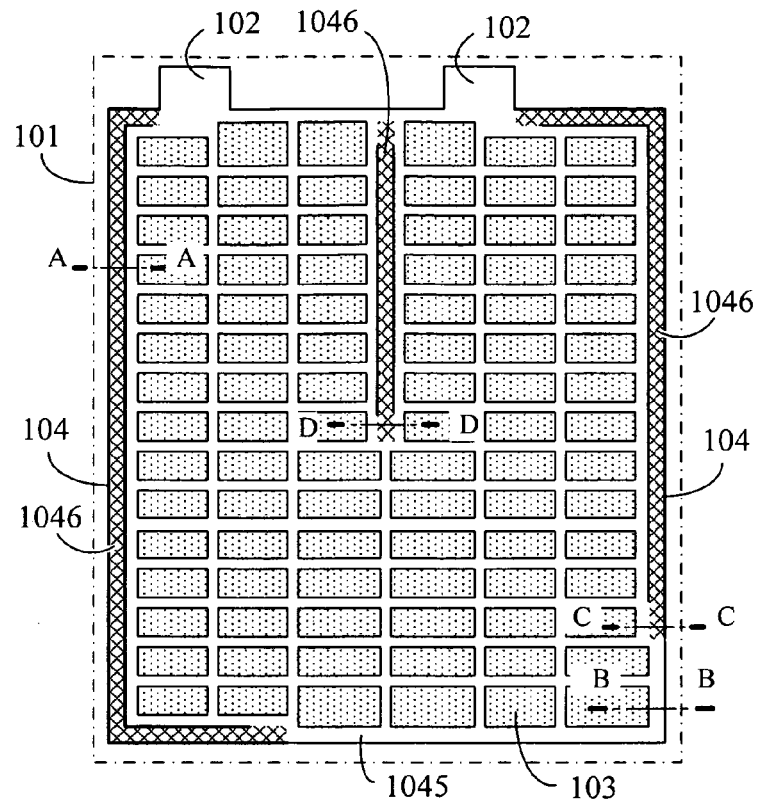
FIG. 22 shows the 22th embodiment of the present invention.

As shown in FIGS. 22 to 28, the insulated split-flow conductive structure 104 is installed between the electric energy input/output terminal 102 and the intermediate part and/or the bottom of the electrode plate 101 in the grid sheet electrode plate with the grid conductive body, according to the present invention, to make the current density when inputting/outputting current between the intermediate part or the bottom of the electrode plate 101 and the electric energy input/output terminal 102 to be more similar with that of other regions; the related embodiments are described as following:

FIG. 22 shows the 22th embodiment of the present invention; as shown in FIG. 22, two electric energy input/output terminals 102 are installed at the upside of the electrode plate 101, in which the electric energy input/output terminal 102 installed at the position near the left side of the upside is nearer the left side of the electrode plate 101, and the electric energy input/output terminal 102 installed at the position near the right side of the upside is nearer the right of the electrode plate 101; the electric energy input/output terminal 102 installed at the position near the left side of the upside downward extends along the left side of the electrode plate 101 to the intermediate part of the bottom edge for installing with the insulated split-flow conductive structure 104, thus the input/output current is direct transmitted between the electric energy input/output terminal 102 installed at the intermediate part of the bottom edge of the left side of the electrode plate 101 and the electric energy input/output terminal 102 installed at the position near the left side of the upside; and the electric energy input/output terminal 102 installed at the position near the right side of the upside downward extends along the right side of the electrode plate 101 to the position near the bottom edge for installing with the insulated split-flow conductive structure 104, thus the input/output current is direct transmitted between the electric energy input/output terminal 102 installed at the position near the bottom edge of the right side of the electrode plate 101 and the electric energy input/output terminal 102 installed at the position near the right side of the upside; and further the insulated split-flow conductive structure 104 is installed at the position extended between the electric energy input/output terminal 102 installed at the position near the left side of the upside of the electrode plate 101 and the electric energy input/output terminal 102 installed at position near the right side of the upside, to the intermediate part of the electrode plate 101, thus the input/output current is direct transmitted between the intermediate part of the electrode plate 101 and the position between the electric energy input/output terminal 102 installed at the position near the left side of the upside and the electric energy input/output terminal 102 installed at position near the right side of the upside.

Figure 23:
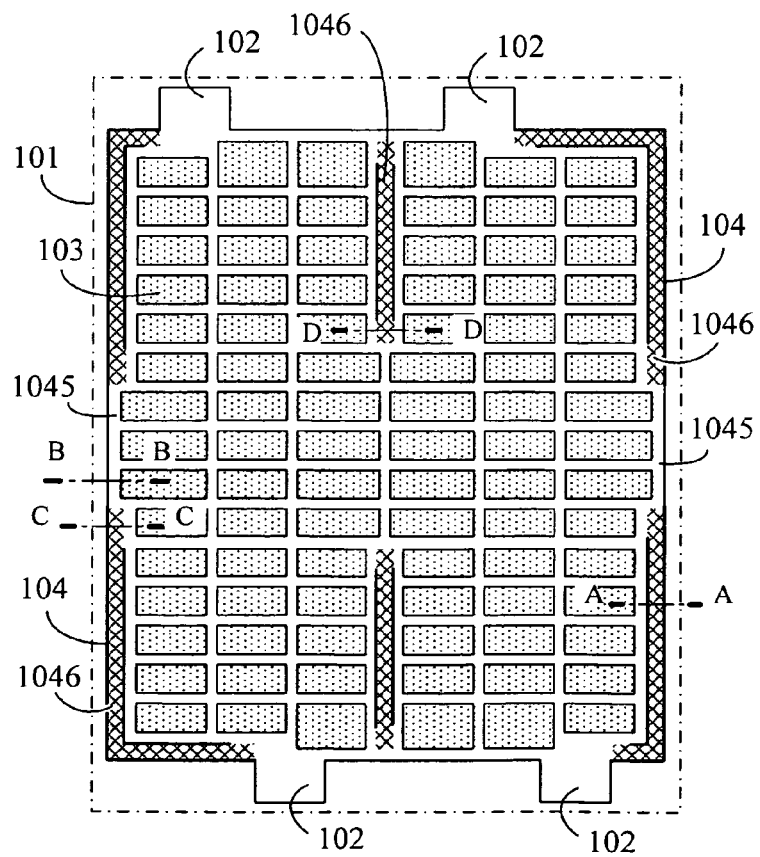
FIG. 23 shows the 23th embodiment of the present invention.

FIG. 23 shows the 23th embodiment of the present invention; as shown in FIG. 23, two electric energy input/output terminals 102 are installed at the upside of the electrode plate 101, in which the electric energy input/output terminal 102 installed at the position near the left side of the upside is nearer the left side of the electrode plate 101, and the electric energy input/output terminal 102 installed at the position near the right side of the upside is nearer the right side of the electrode plate 101; and two electric energy input/output terminals 102 are installed at the downside of the electrode plate 101, in which the electric energy input/output terminal 102 installed at the position near the left side of the downside is nearer the left side of the electrode plate 101, and the electric energy input/output terminal 102 installed at the position near the right side of the downside is nearer the right side of the electrode plate 101; and the electric energy input/output terminal 102 installed at the position near the left side of the upside downward extends along the left side of the electrode plate 101 to the position near the intermediate part of the left side of the electrode plate 101 for installing the insulated split-flow conductive structure 104, thus the input/output current is direct transmitted between the electric energy input/output terminal 102 installed at the position near the intermediate part of the left side of the electrode plate 101 and the electric energy input/output terminal 102 installed at the position near the left side of the upside; and the electric energy input/output terminal 102 installed at the position near the right side of the upside downward extends along the right side of the electrode plate 101 to the position near the intermediate part of the right side of the electrode plate 101 for installing the insulated split-flow conductive structure 104, thus the input/output current is direct transmitted between the electric energy input/output terminal 102 installed at the position near the intermediate part of the right side of the electrode plate 101 and the electric energy input/output terminal 102 installed at the position near the right side of the upside; and the electric energy input/output terminal 102 installed at the position near the left side of the downside upward extends along the left side of the electrode plate 101 to the position near the intermediate part of the left side of the electrode plate 101 for installing the insulated split-flow conductive structure 104, thus the input/output current is direct transmitted between the electric energy input/output terminal 102 installed at the position near the intermediate part of the left side of the electrode plate 101 and the electric energy input/output terminal 102 installed at the position near the left side of the downside; and the electric energy input/output terminal 102 installed at the position near the right side of the downside upward extends along the right side of the electrode plate 101 to the position near the intermediate part of the right side of the electrode plate 101 for installing the insulated split-flow conductive structure 104, thus the input/output current is direct transmitted between the electric energy input/output terminal 102 installed at the position near the intermediate part of the right side of the electrode plate 101 and the electric energy input/output terminal 102 installed at the position near the right side of the downside; and the insulated split-flow conductive structure 104 is installed at the position extended between the electric energy input/output terminal 102 installed at the position near the right side of the upside of the electrode plate 101 and the electric energy input/output terminal 102 installed at position near the left side of the upside, to the intermediate part of the electrode plate 101, thus the input/output current is direct transmitted between the intermediate part of the electrode plate 101 and the position between the electric energy input/output terminal 102 installed at the position near the right side of the upside and the electric energy input/output terminal 102 installed at position near the left side of the upside; and the insulated split-flow conductive structure 104 is installed at the position extended between the electric energy input/output terminal 102 installed at the position near the right side of the downside of the electrode plate 101 and the electric energy input/output terminal 102 installed at position near the left side of the downside, to the intermediate part of the electrode plate 101, thus the input/output current is direct transmitted between the intermediate part of the electrode plate 101 and the position between the electric energy input/output terminal 102 installed at the position near the right side of the downside and the electric energy input/output terminal 102 installed at position near the left side of the downside.

Figure 24:
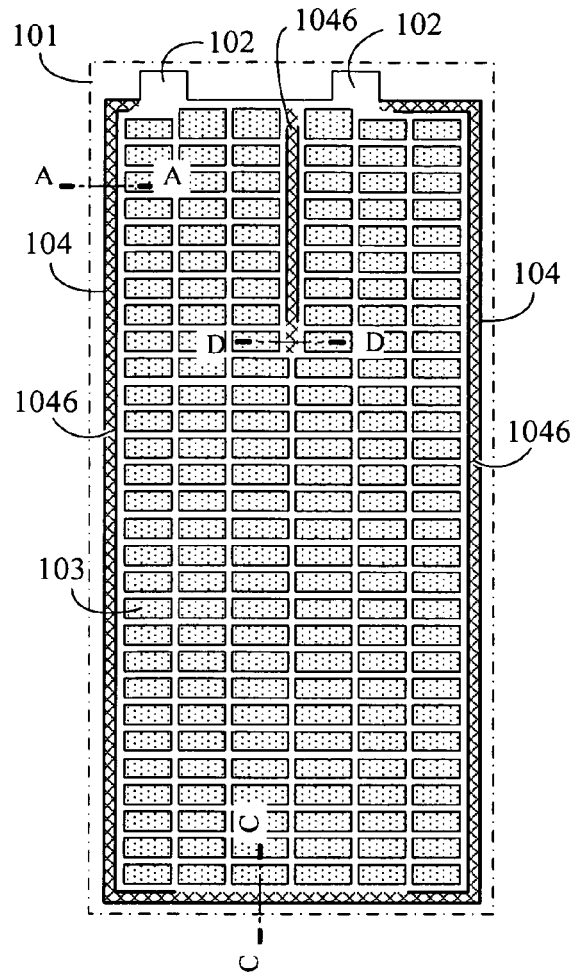
FIG. 24 shows the 24th embodiment of the present invention.

FIG. 24 shows the 24th embodiment of the present invention; as shown in FIG. 24, two electric energy input/output terminals 102 are installed at the upside of the electrode plate 101, in which the electric energy input/output terminal 102 installed at the position near the left side of the upside is nearer the left side of the electrode plate 101, and the electric energy input/output terminal 102 installed at the position near the right side of the upside is nearer the right side of the electrode plate 101; and the electric energy input/output terminal 102 installed at the position near the left side of the upside downward extends along the left side of the electrode plate 101 to the bottom edge for installing the insulated split-flow conductive structure 104, thus the input/output current is direct transmitted between the electric energy input/output terminal 102 installed at the bottom edge of the left side of the electrode plate 101 and the electric energy input/output terminal 102 installed at the position near the left side of the upside; and the electric energy input/output terminal 102 installed at the position near the right side of the upside downward extends along the right side of the electrode plate 101 to the bottom edge for installing the insulated split-flow conductive structure 104, thus the input/output current is direct transmitted between the electric energy input/output terminal 102 installed at the bottom edge of the right side of the electrode plate 101 and the electric energy input/output terminal 102 installed at the position near the right side of the upside; and the insulated split-flow conductive structure 104 is installed at the position downward extended between the electric energy input/output terminal 102 installed at the position near the left side of the upside of the electrode plate 101 and the electric energy input/output terminal 102 installed at position near the right side of the upside, to the intermediate part of the electrode plate 101, thus the input/output current is direct transmitted between the intermediate part of the electrode plate 101 and the position between the electric energy input/output terminal 102 installed at the position near the left side of the upside and the electric energy input/output terminal 102 installed at position near the right side of the upside.

Figure 25:
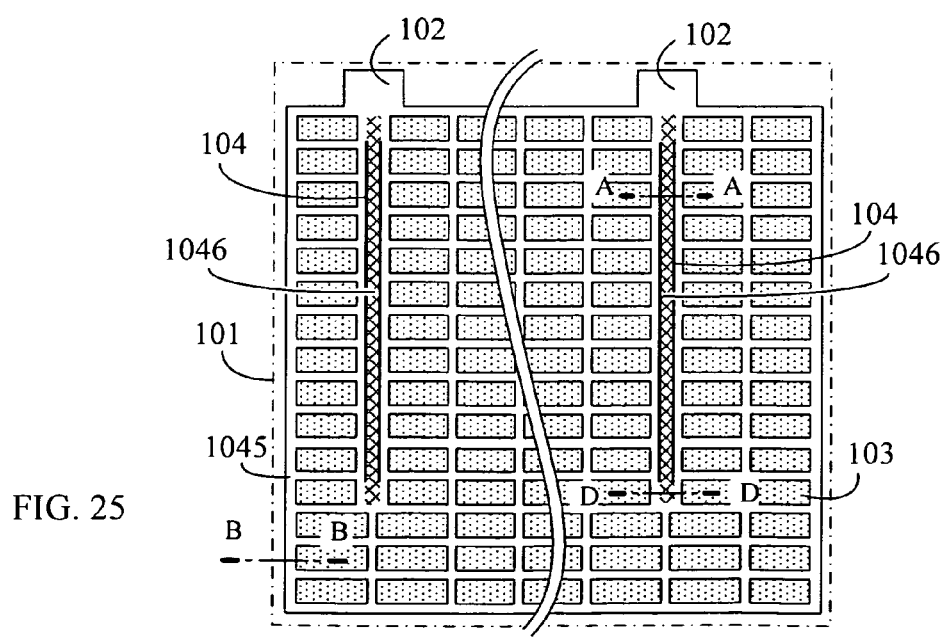
FIG. 25 shows the 25th embodiment of the present invention.

FIG. 25 shows the 25th embodiment of the present invention; as shown in FIG. 25, one or more electric energy input/output terminals 102 are installed at the upside of the electrode plate 101, and it is characterized by the insulated split-flow conductive structure 104 installed at the position downward extended from the downside of one or more electric energy input/output terminals 102 installed at the electrode plate 101, and through the intermediate part of the electrode plate 101.

Figure 26:
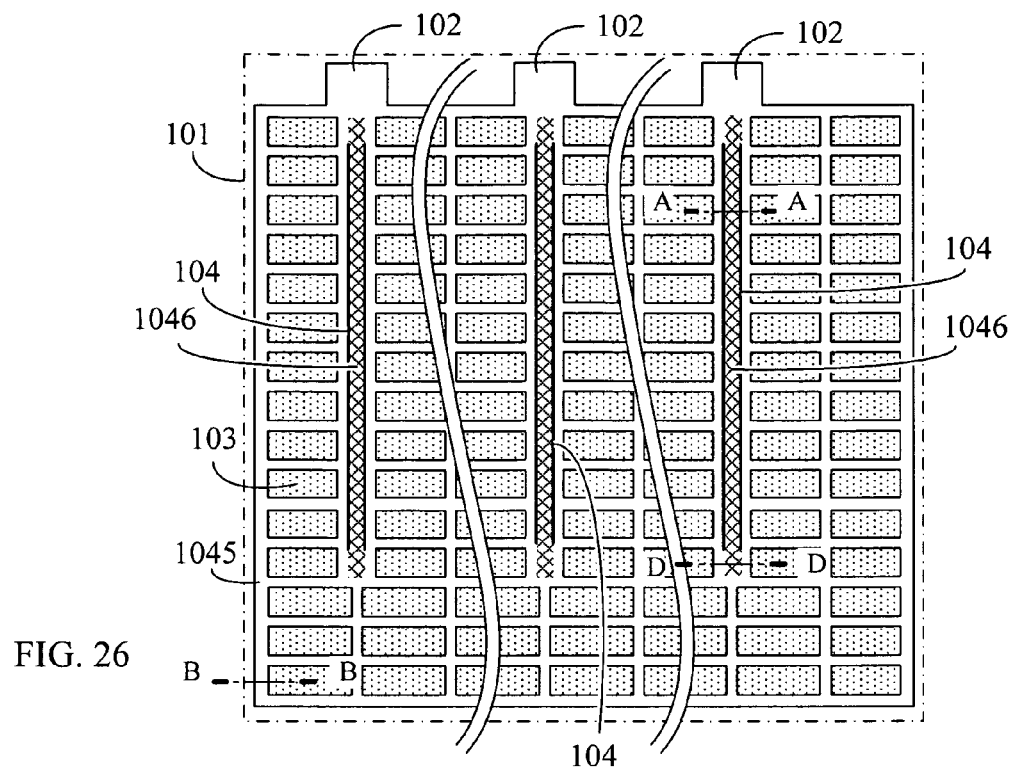
FIG. 26 shows the second embodiment of FIG. 25.

FIG. 26 shows the 26th embodiment of the present invention; and FIG. 26 is the second embodiment of the same structural features of the equalizing electrode plate with insulated split-flow conductive structure as shown in FIG. 25.

Figure 27:
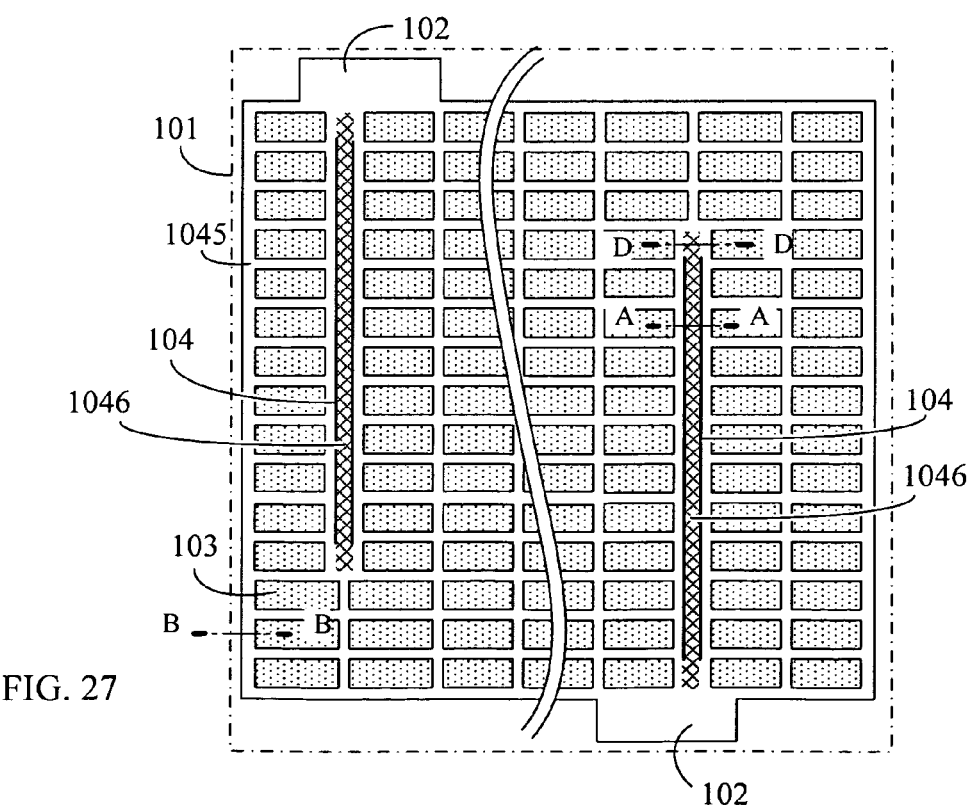
FIG. 27 shows the 27th embodiment of the present invention.

FIG. 27 shows the 27th embodiment of the present invention; as shown in FIG. 27, one or more electric energy input/output terminal 102 are installed at the upside of the electrode plate 101, one or more electric energy input/output terminal 102 are installed at the downside of the electrode plate 101, and the electric energy input/output terminals 102 installed at the upside of the electrode plate 101 and the electric energy input/output terminals 102 installed at the downside of the electrode plate 101 are staggered; in which the insulated split-flow conductive structure 104 is installed at the position downward extended from the downside of the electric energy input/output terminal 102 installed at the upside of the electrode plate 101, and through the intermediate part of the electrode plate 101, thus the input/output current is direct transmitted between the electric energy input/output terminal 102 installed at the upside of the electrode plate 101 and the intermediate part of the electrode plate 101; and the insulated split-flow conductive structure 104 is installed at the position upward extended from the upside of the electric energy input/output terminal 102 installed at the downside of the electrode plate 101, and through the intermediate part of the electrode plate 101, thus the input/output current is direct transmitted between the electric energy input/output terminal 102 installed at the downside of the electrode plate 101 and the intermediate part of the electrode plate 101.

Figure 28:
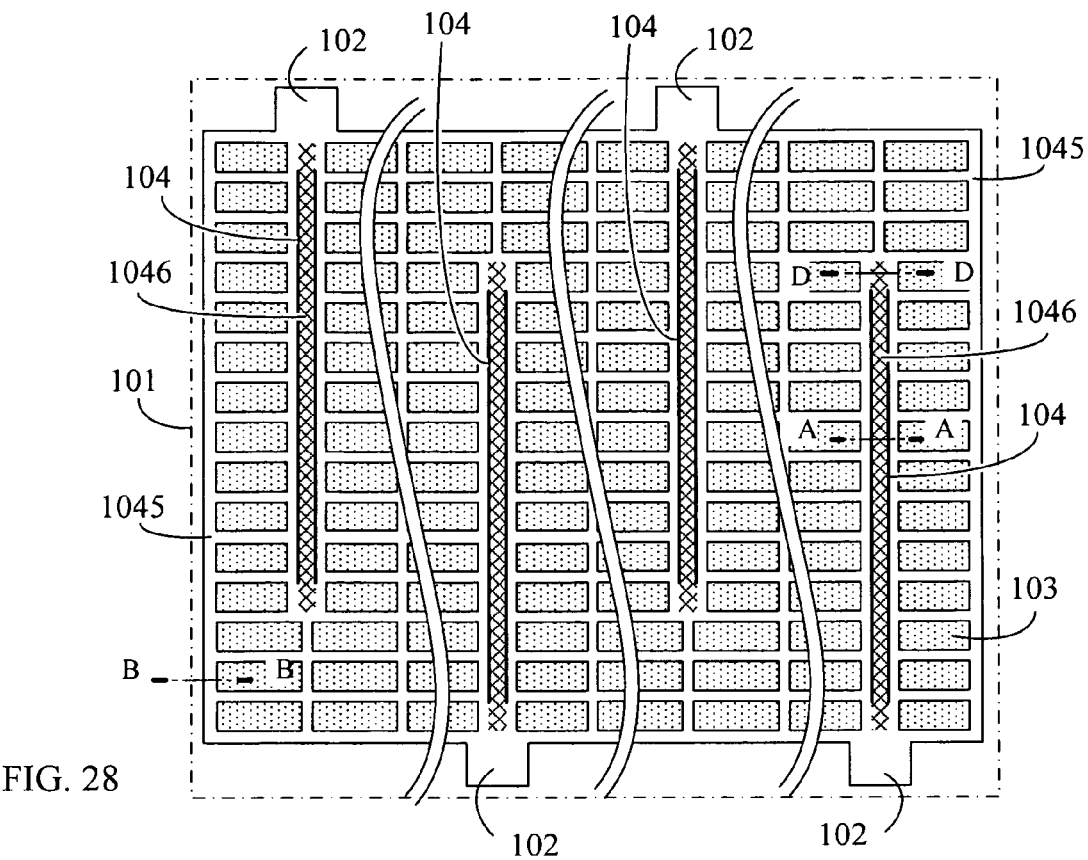
FIG. 28 shows the 28th embodiment of the present invention.

FIG. 28 shows the 28th embodiment of the present invention; and FIG. 28 is the second embodiment of the same structural features of the equalizing electrode plate with insulated split-flow conductive structure as shown in FIG. 27.

Figure 29:
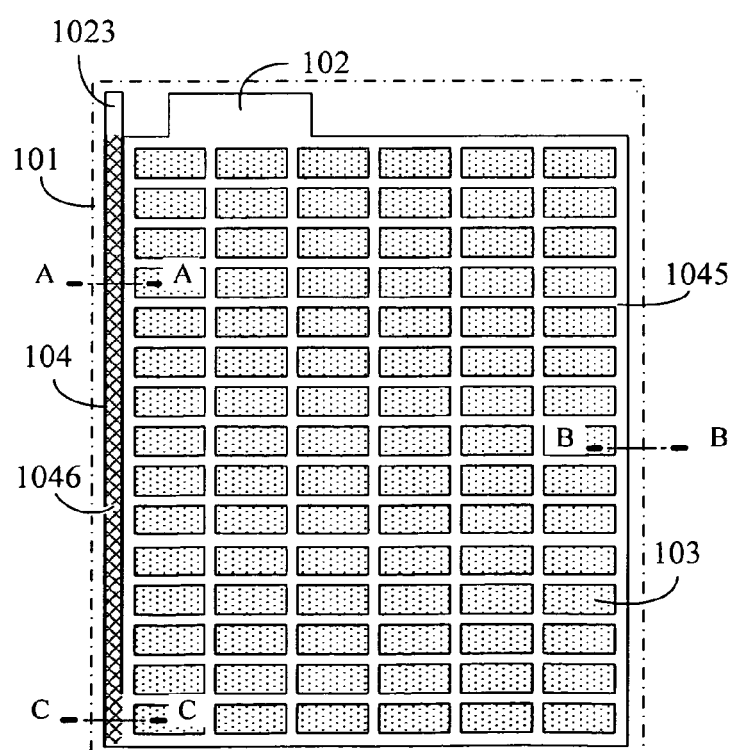
FIG. 29 shows the 29th embodiment of the present invention.
Figure 30:
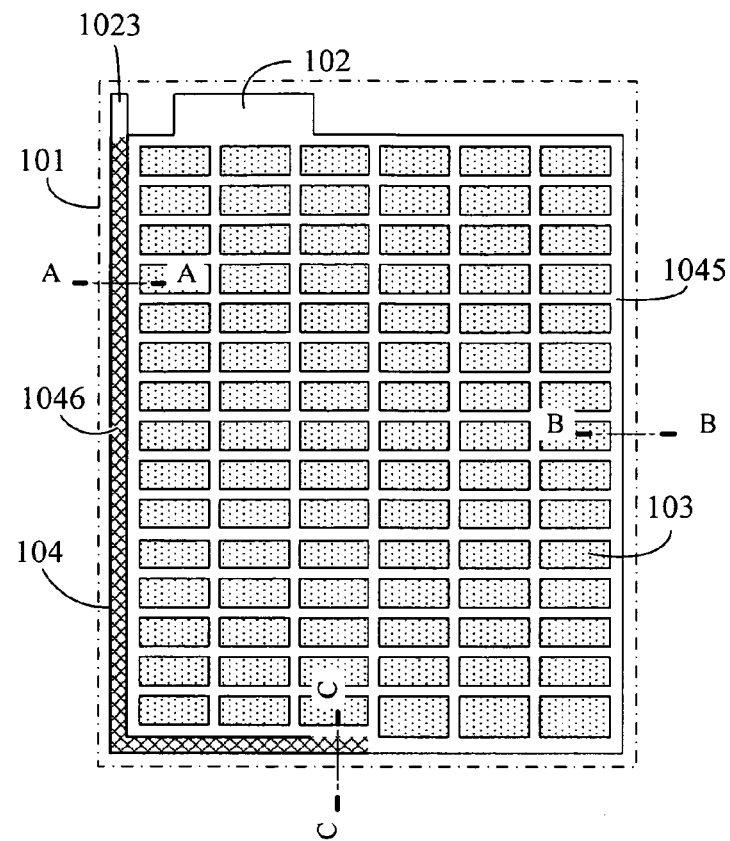
FIG. 30 shows the 30th embodiment of the present invention.
Figure 31:
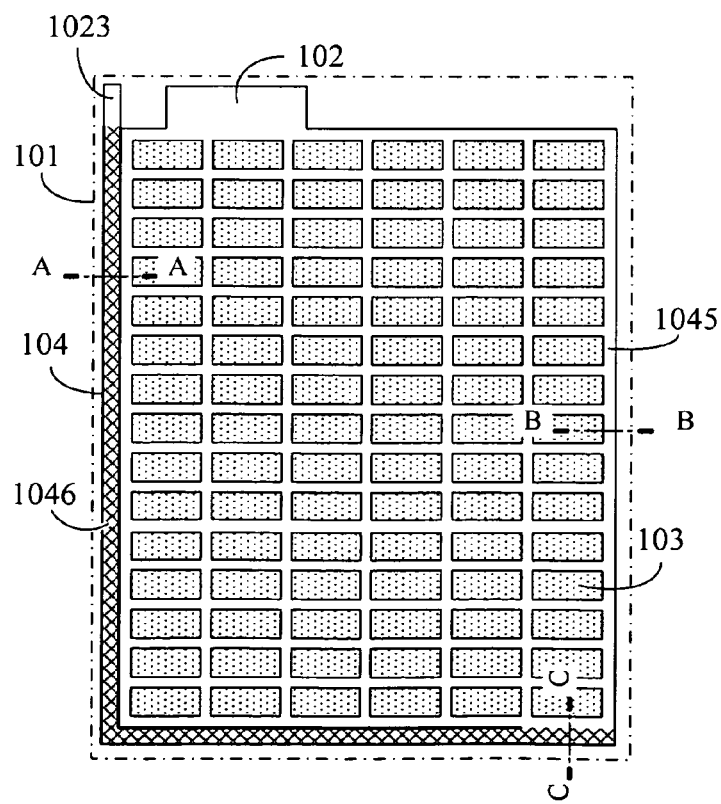
FIG. 31 shows the 31th embodiment of the present invention.

For the equalizing electrode plate with insulated split-flow conductive structure, as shown in FIGS. 29 to 31, which is constituted by a grid sheet, radiative grid sheet, laminate, or winding type electrode plate, wherein the independent insulated split-flow conductive structure 104 is additional installed at one or more sides of the electrode plate 101, and the independent insulated split-flow conductive structure 104 includes an electric energy input/output terminal 1023 for independently inputting/outputting electric energy, which downward extends along the side of the electrode plate 101 to the bottom of the side of the electrode plate 101, and/or extends to the bottom of the electrode plate 101 and further to the intermediate part of the bottom edge of the electrode plate 101, and/or extends to the bottom of the electrode plate 101 and further to the bottom edge of the whole electrode plate 101.

FIG. 29 shows the 29th embodiment of the present invention; as shown in FIG. 29, the electric energy input/output terminal 102 is installed at the upside of the electrode plate 101, and it is characterized by the insulated split-flow conductive structure 104 independently installed from the position near the bottom edge of the electrode plate 101, extending to the direction of the electric energy input/output terminal 102, and to the electric energy input/output terminal 1023 for independently inputting/outputting electric energy.

FIG. 30 shows the 30th embodiment of the present invention; as shown in FIG. 30, the electric energy input/output terminal 102 is installed at the upside of the electrode plate 101, and it is characterized by the insulated split-flow conductive structure 104 independently installed from the intermediate part of the bottom edge of the electrode plate 101, extending to the direction of the electric energy input/output terminal 102, and to the electric energy input/output terminal 1023 for independently inputting/outputting electric energy.

FIG. 31 shows the 31th embodiment of the present invention; as shown in FIG. 31, the electric energy input/output terminal 102 is installed at the upside of the electrode plate 101, and it is characterized by the insulated split-flow conductive structure 104 independently installed from the bottom edge where the electrode plate 101 and the electric energy input/output terminal 102 are diagonal, extending to the direction of the electric energy input/output terminal 102, and to the electric energy input/output terminal 1023 for independently inputting/outputting electric energy.

For the equalizing electrode plate with insulated split-flow conductive structure, as shown in FIGS. 1 to 31, wherein one or more electric energy input/output terminals 102 are installed at each of one or more sides of the electrode plate with radiative grid conductive body, and one or more insulated split-flow conductive structures 104 are installed around and/or at the intermediate part and/or at the bottom of the electric energy input/output terminal 102 and the electrode plate 101.

Figure 32:
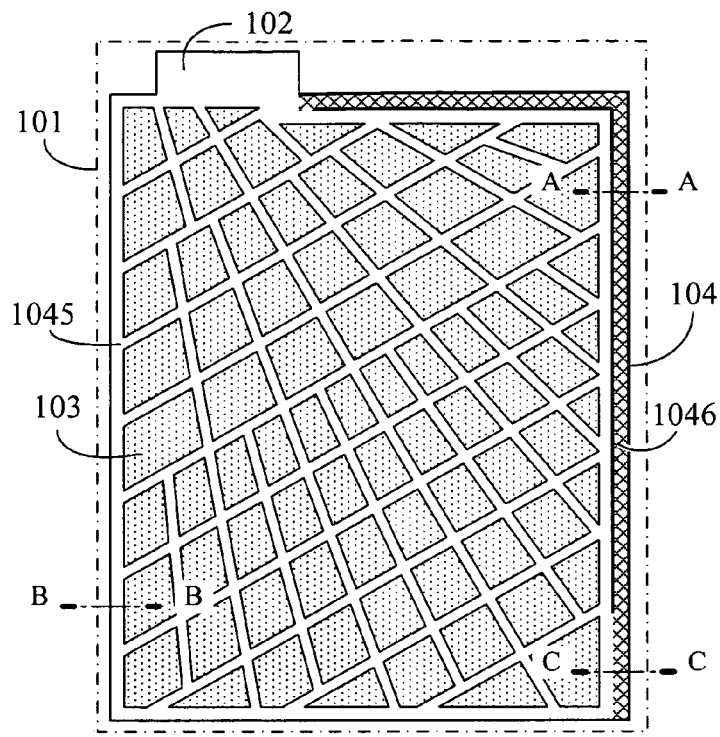
FIG. 32 shows the 32th embodiment of the present invention.

As shown in FIGS. 32 to 40, which are the drawings showing the embodiments of the insulated split-flow conductive structures 104 installed between the electric energy input/output terminal 102 of the electrode plate with radiative grid conductive body and the position around the electrode plate, according to the present invention, and the descriptions are as following:

FIG. 32 shows the 32th embodiment of the present invention; as showing in FIG. 32, the constitution is same as that of the embodiment shown in FIG. 1.

Figure 33:
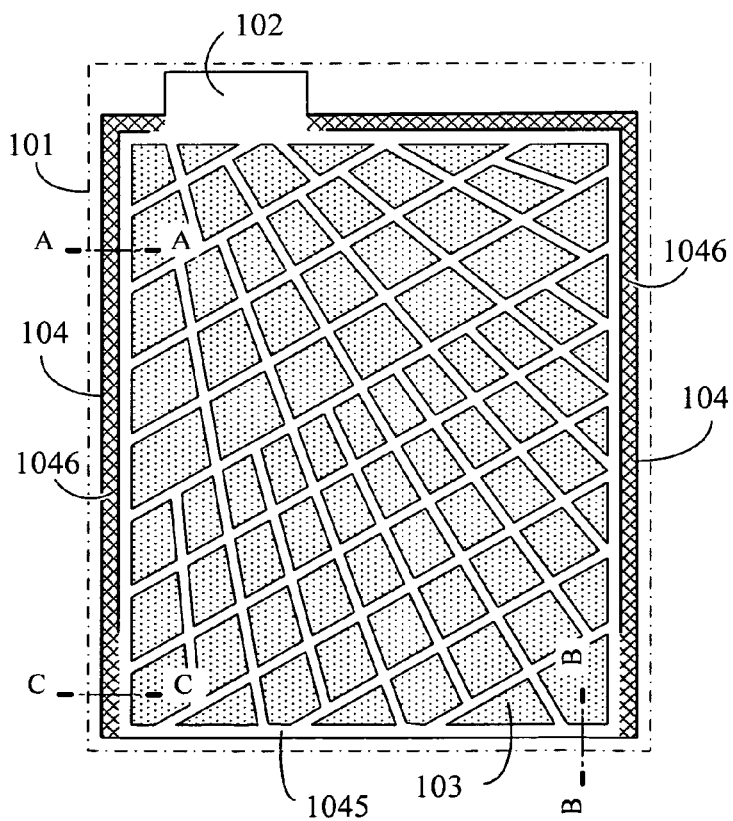
FIG. 33 shows the 33th embodiment of the present invention.

FIG. 33 shows the 33th embodiment of the present invention; as showing in FIG. 33, the constitution of the insulated split-flow conductive structure 104 is same as that of the embodiment shown in FIG. 3.

Figure 34:
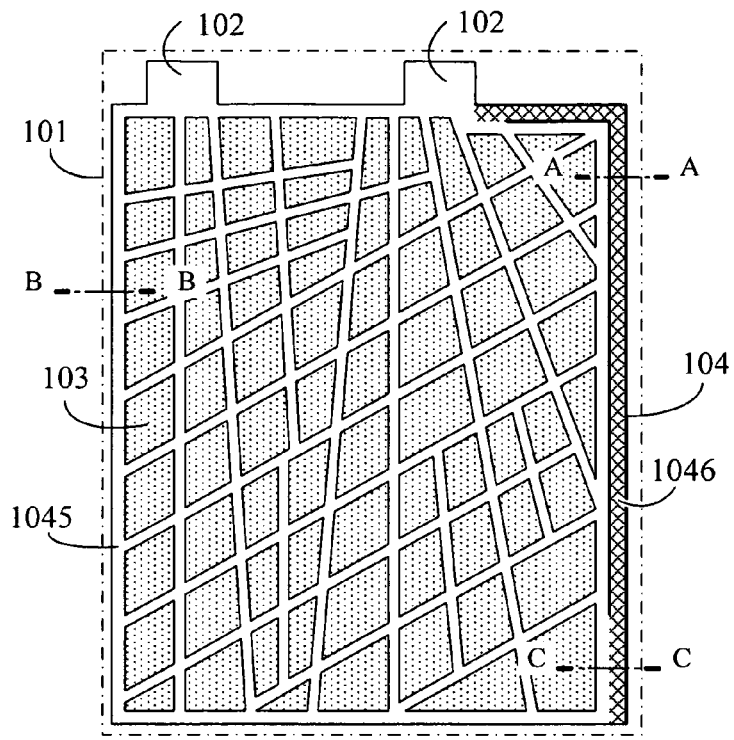
FIG. 34 shows the 34th embodiment of the present invention.

FIG. 34 shows the 34th embodiment of the present invention; as showing in FIG. 34, the constitution of the insulated split-flow conductive structure 104 is same as that of the embodiment shown in FIG. 6.

Figure 35:
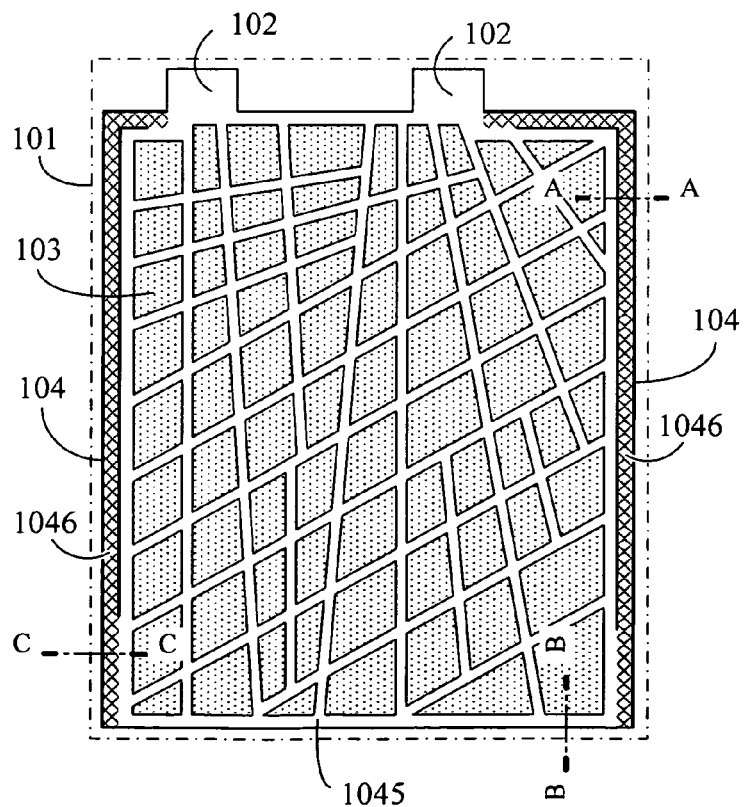
FIG. 35 shows the 35th embodiment of the present invention.

FIG. 35 shows the 35th embodiment of the present invention; as showing in FIG. 35, the constitution of the insulated split-flow conductive structure 104 is same as that of the embodiment shown in FIG. 8.

Figure 36:
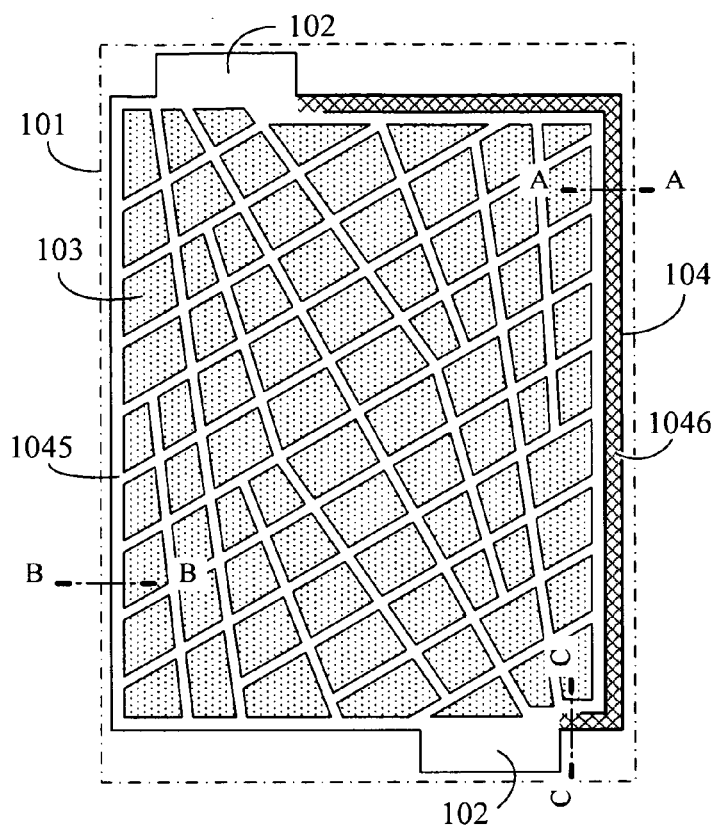
FIG. 36 shows the 36th embodiment of the present invention.

FIG. 36 shows the 36th embodiment of the present invention; as showing in FIG. 36, the constitution of the insulated split-flow conductive structure 104 is same as that of the embodiment shown in FIG. 15.

Figure 37:
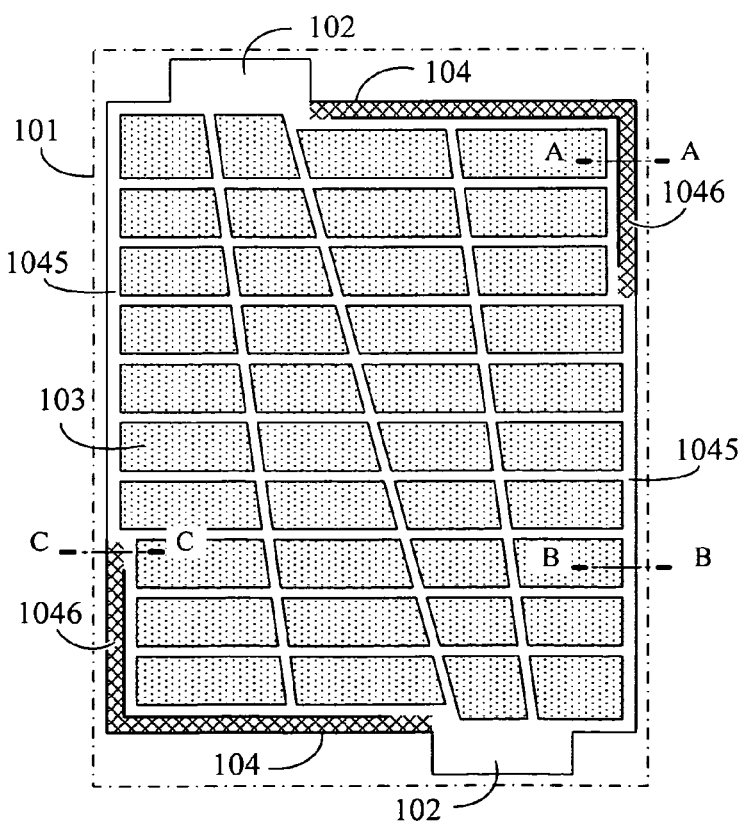
FIG. 37 shows the 37th embodiment of the present invention.

FIG. 37 shows the 37th embodiment of the present invention; as showing in FIG. 37, the constitution of the insulated split-flow conductive structure 104 is same as that of the embodiment shown in FIG. 16.

Figure 38:
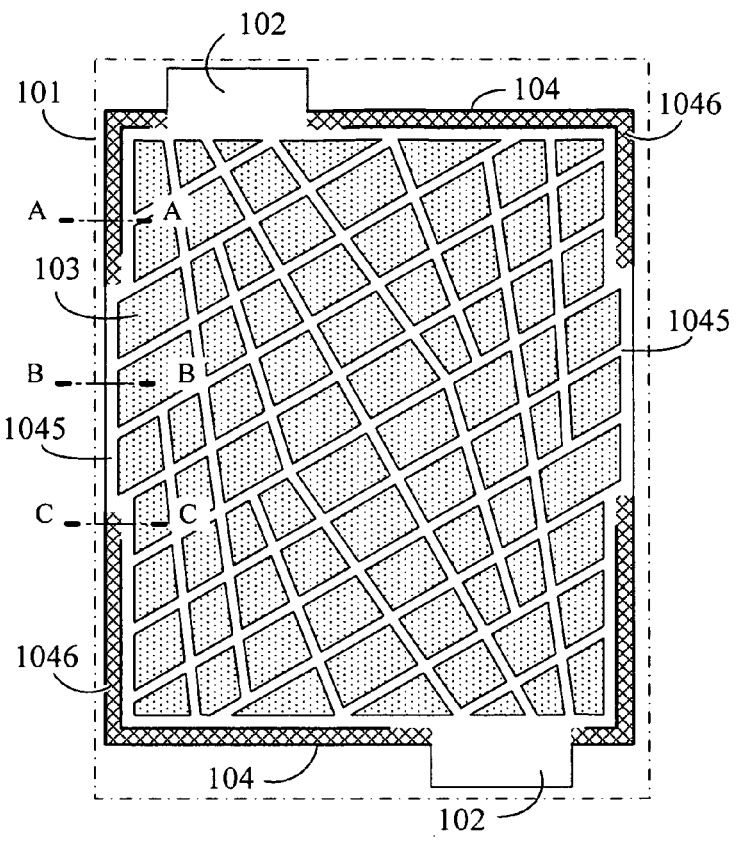
FIG. 38 shows the 38th embodiment of the present invention.

FIG. 38 shows the 38th embodiment of the present invention; as showing in FIG. 38, the constitution of the insulated split-flow conductive structure 104 is same as that of the embodiment shown in FIG. 17.

Figure 39:
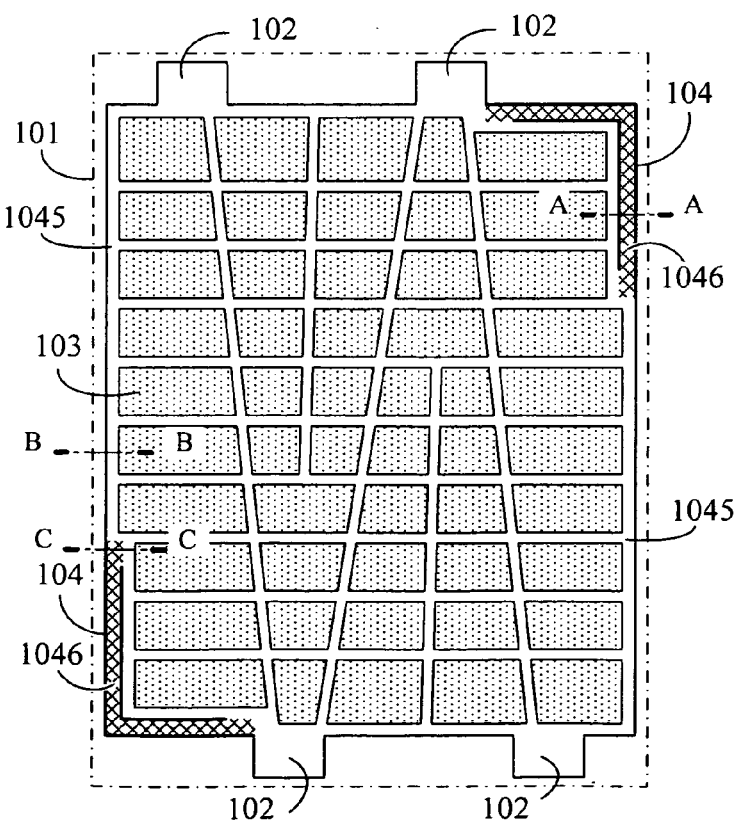
FIG. 39 shows the 39th embodiment of the present invention.

FIG. 39 shows the 39th embodiment of the present invention; as shown in FIG. 39, two electric energy input/output terminals 102 are installed at the upside of the electrode plate 101, wherein the electric energy input/output terminal 102 installed at the position near the left side of the upside is nearer the left side of the electrode plate 101, and the electric energy input/output terminal 102 installed at the position near the right side of the upside is nearer the right side of the electrode plate 101; and two electric energy input/output terminals 102 are installed at the downside of the electrode plate 101, wherein the electric energy input/output terminal 102 installed at the position near the right side of the downside is nearer the right side of the electrode plate 101, and the electric energy input/output terminal 102 installed at the position near the left side of the downside is nearer the left side of the electrode plate 101; and the electric energy input/output terminal 102 installed at the position near the right side of the upside downward extends along the right side to the position near the intermediate part of the right side of the electrode plate 101 for installing with the insulated split-flow conductive structure 104, thus the input/output current is direct transmitted between the position near the intermediate part of the right side of the electrode plate 101 and the electric energy input/output terminal 102 installed at the position near the right side of the upside; and the electric energy input/output terminal 102 installed at the position near the left side of the downside upward extends along the left side to the position near the intermediate part of the left side of the electrode plate 101 for installing with the insulated split-flow conductive structure 104, thus the input/output current is direct transmitted between the position near the intermediate part of the left side of the electrode plate 101 and the electric energy input/output terminal 102 installed at the position near the left side of the downside.

Figure 40:
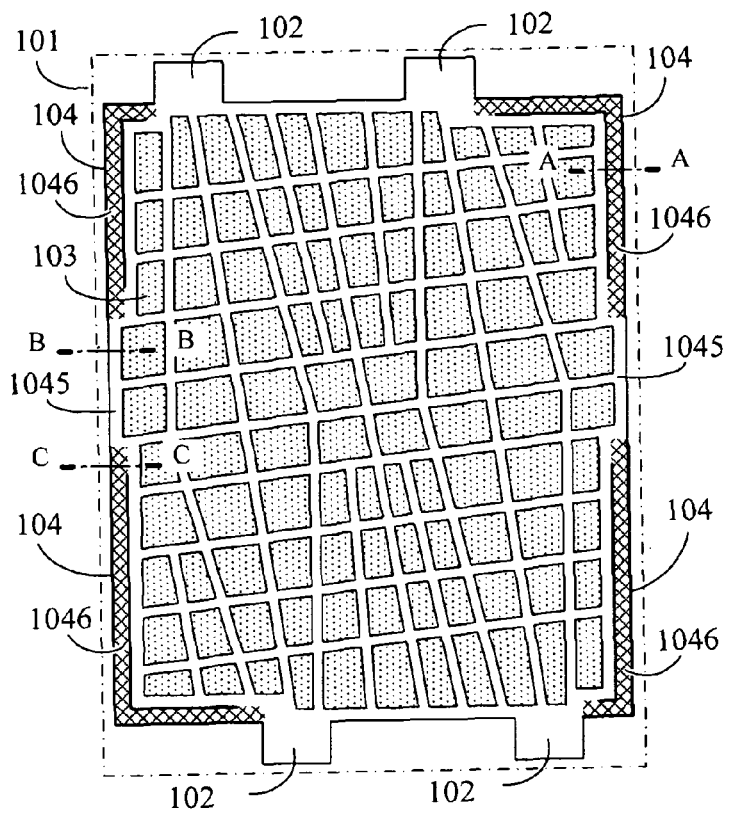
FIG. 40 shows the 40th embodiment of the present invention.

FIG. 40 shows the 40th embodiment of the present invention; as showing in FIG. 40, the constitution of the insulated split-flow conductive structure 104 is same as that of the embodiment shown in FIG. 21.

Figure 41:
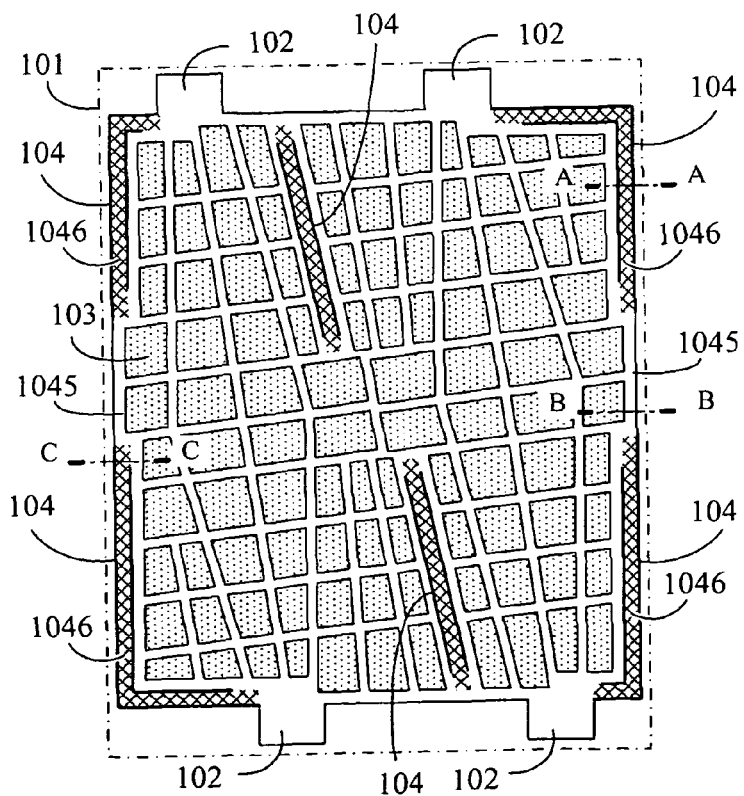
FIG. 41 shows the 41th embodiment of the present invention.

As shown in FIGS. 41 to 42, which are the drawings showing the embodiments of the insulated split-flow conductive structures 104 installed at the electric energy input/output terminal 102 and the intermediate part and/or the bottom of the electrode plate 101 in the electrode plate with radiative grid conductive body, and the descriptions are as following:

FIG. 41 shows the 41th embodiment of the present invention; as showing in FIG. 41, the constitution of the insulated split-flow conductive structure 104 is same as that of the embodiment shown in FIG. 23.

FIG. 42 shows the 42th embodiment of the present invention; as showing in FIG. 42, the constitution of the insulated split-flow conductive structure 104 is same as that of the embodiment shown in FIG. 24.

For the equalizing electrode plate with insulated split-flow conductive structure, which is further constituted by the insulated split-flow conductive structure installed between the electric energy input/output terminal 102 of the laminate electrode plate and the position around and/or at the intermediate part of and/or at the bottom of the laminate electrode plate 101.

As shown in FIGS. 43 to 62, which are the drawings showing the embodiments of the electrode plate constituted by the insulated split-flow conductive structures 104 installed between the electric energy input/output terminal 102 of the laminate electrode plate and the position around or at the bottom of the electrode plate 101, and the descriptions are as following:

FIG. 43 shows the 43th embodiment of the present invention; as showing in FIG. 43, the constitution of the insulated split-flow conductive structure 104 is same as that of the embodiment shown in FIG. 1.

FIG. 44 shows the 44th embodiment of the present invention; as showing in FIG. 44, the constitution of the insulated split-flow conductive structure 104 is same as that of the embodiment shown in FIG. 2.

Figure 45:
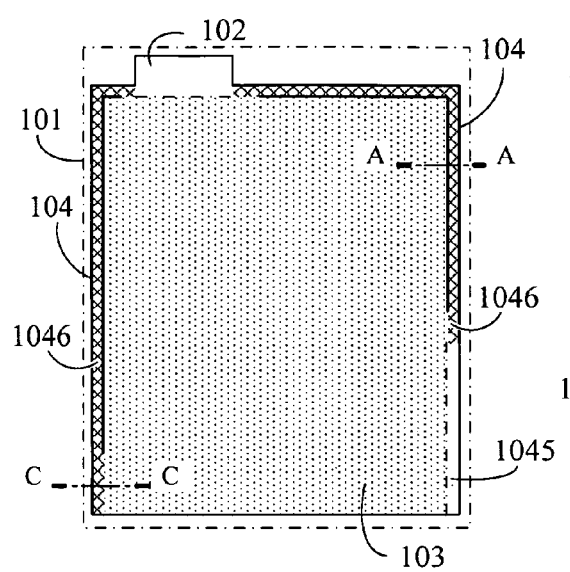
FIG. 45 shows the 45th embodiment of the present invention.

FIG. 45 shows the 45th embodiment of the present invention; as showing in FIG. 45, the constitution of the insulated split-flow conductive structure 104 is same as that of the embodiment shown in FIG. 3.

Figure 46:
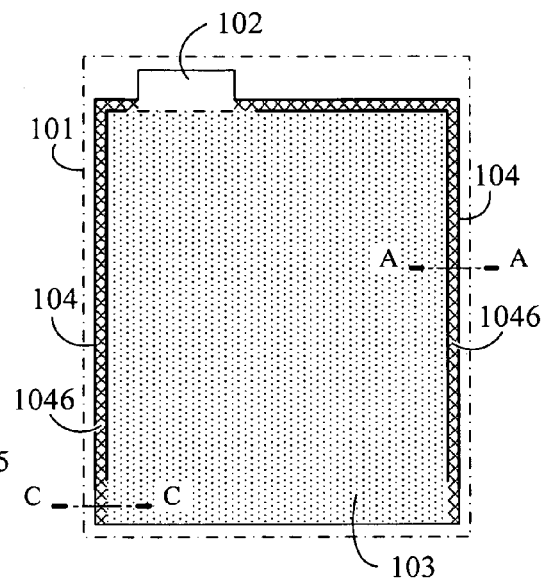
FIG. 46 shows the 46th embodiment of the present invention.

FIG. 46 shows the 46th embodiment of the present invention; as showing in FIG. 46, the constitution of the insulated split-flow conductive structure 104 is same as that of the embodiment shown in FIG. 4.

Figure 47:
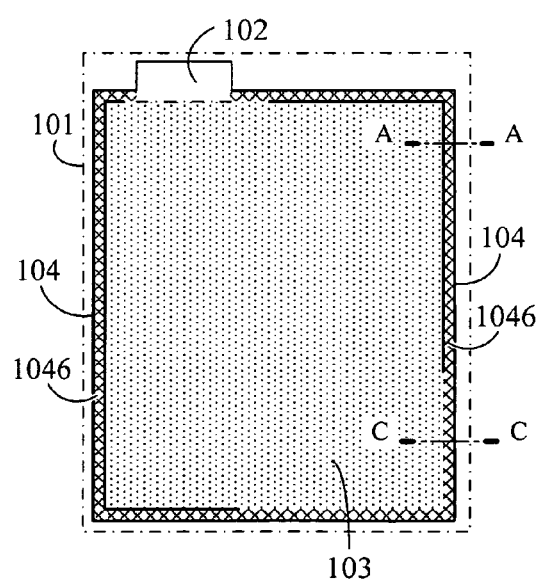
FIG. 47 shows the 47th embodiment of the present invention.

FIG. 47 shows the 47th embodiment of the present invention; as showing in FIG. 47, the constitution of the insulated split-flow conductive structure 104 is same as that of the embodiment shown in FIG. 5.

Figure 48:
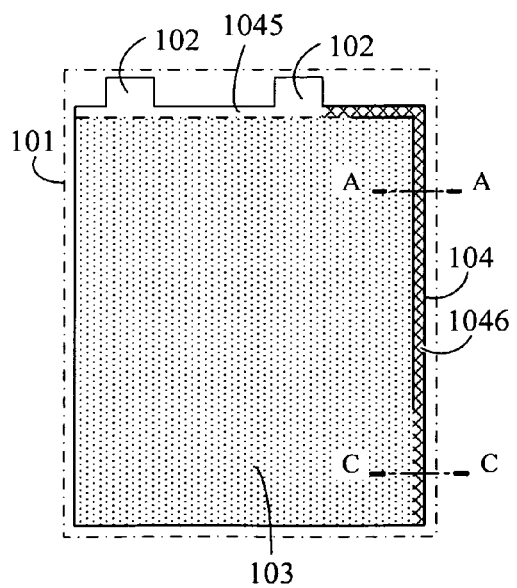
FIG. 48 shows the 48th embodiment of the present invention.

FIG. 48 shows the 48th embodiment of the present invention; as showing in FIG. 48, the constitution of the insulated split-flow conductive structure 104 is same as that of the embodiment shown in FIG. 6.

FIG. 49 shows the 49th embodiment of the present invention; as showing in FIG. 49, the constitution of the insulated split-flow conductive structure 104 is same as that of the embodiment shown in FIG. 7.

FIG. 50 shows the 50th embodiment of the present invention; as showing in FIG. 50, the constitution of the insulated split-flow conductive structure 104 is same as that of the embodiment shown in FIG. 8.

FIG. 51 shows the 51th embodiment of the present invention; as showing in FIG. 51, the constitution of the insulated split-flow conductive structure 104 is same as that of the embodiment shown in FIG. 10.

FIG. 52 shows the 52th embodiment of the present invention; as showing in FIG. 52, the constitution of the insulated split-flow conductive structure 104 is same as that of the embodiment shown in FIG. 15.

FIG. 53 shows the 53th embodiment of the present invention; as showing in FIG. 53, the constitution of the insulated split-flow conductive structure 104 is same as that of the embodiment shown in FIG. 11.

FIG. 54 shows the 54th embodiment of the present invention; as showing in FIG. 54, the constitution of the insulated split-flow conductive structure 104 is same as that of the embodiment shown in FIG. 12.

FIG. 55 shows the 55th embodiment of the present invention; as showing in FIG. 55, the constitution of the insulated split-flow conductive structure 104 is same as that of the embodiment shown in FIG. 13.

FIG. 56 shows the 56th embodiment of the present invention; as showing in FIG. 56, the constitution of the insulated split-flow conductive structure 104 is same as that of the embodiment shown in FIG. 14.

FIG. 57 shows the 57th embodiment of the present invention; as showing in FIG. 57, the constitution of the insulated split-flow conductive structure 104 is same as that of the embodiment shown in FIG. 16.

FIG. 58 shows the 58th embodiment of the present invention; as showing in FIG. 58, the constitution of the insulated split-flow conductive structure 104 is same as that of the embodiment shown in FIG. 17.

FIG. 59 shows the 59th embodiment of the present invention; as showing in FIG. 59, the constitution of the insulated split-flow conductive structure 104 is same as that of the embodiment shown in FIG. 18.

FIG. 60 shows the 60th embodiment of the present invention; as showing in FIG. 60, the constitution of the insulated split-flow conductive structure 104 is same as that of the embodiment shown in FIG. 19.

FIG. 61 shows the 61th embodiment of the present invention; as showing in FIG. 61, the constitution of the insulated split-flow conductive structure 104 is same as that of the embodiment shown in FIG. 20.

FIG. 62 shows the 62th embodiment of the present invention; as showing in FIG. 62, the constitution of the insulated split-flow conductive structure 104 is same as that of the embodiment shown in FIG. 21.

As shown in FIGS. 63 to 72, which are the drawings showing the embodiments of the insulated split-flow conductive structures 104 installed between the electric energy input/output terminal 102 of the laminate electrode plate and the intermediate part and/or the bottom of the electrode plate, according to the present invention, and the descriptions are as following:

FIG. 63 shows the 63th embodiment of the present invention; as showing in FIG. 63, the constitution of the insulated split-flow conductive structure 104 is same as that of the embodiment shown in FIG. 22.

FIG. 64 shows the 64th embodiment of the present invention; as showing in FIG. 64, the constitution of the insulated split-flow conductive structure 104 is same as that of the embodiment shown in FIG. 23.

Figure 65:
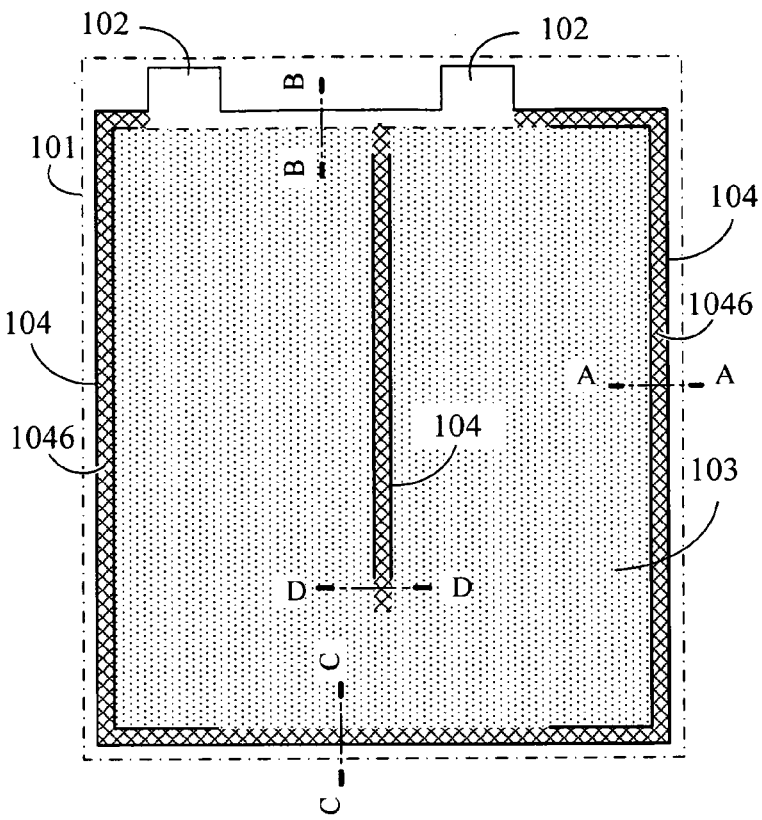
FIG. 65 shows the 65th embodiment of the present invention.

FIG. 65 shows the 65th embodiment of the present invention; as showing in FIG. 65, the constitution of the insulated split-flow conductive structure 104 is same as that of the embodiment shown in FIG. 24.

Figure 66:
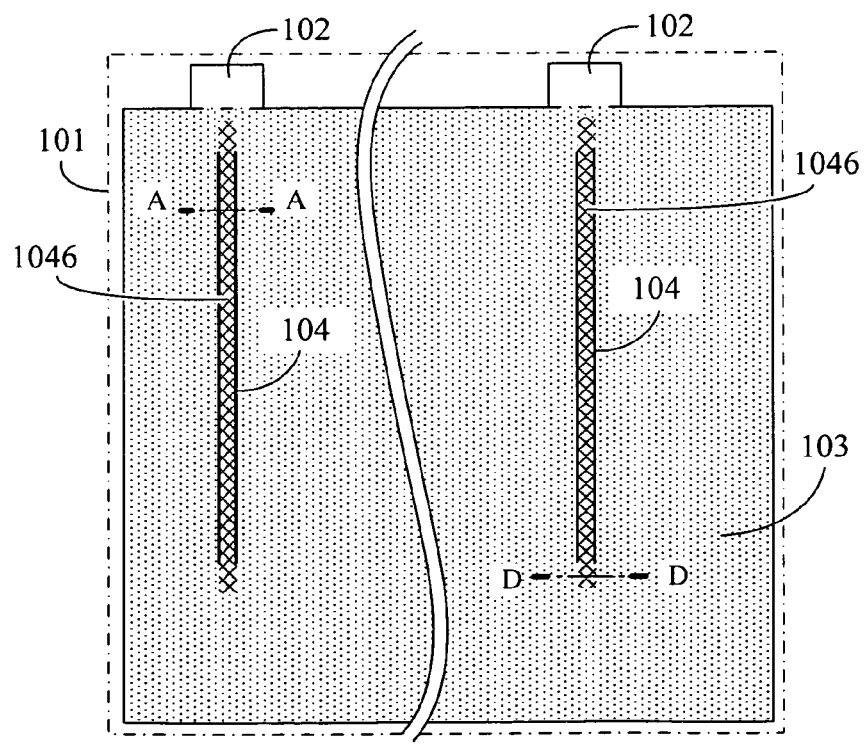
FIG. 66 shows the 66th embodiment of the present invention.

FIG. 66 shows the 66th embodiment of the present invention; as showing in FIG. 66, the constitution of the insulated split-flow conductive structure 104 is same as that of the embodiment shown in FIG. 25.

Figure 67:
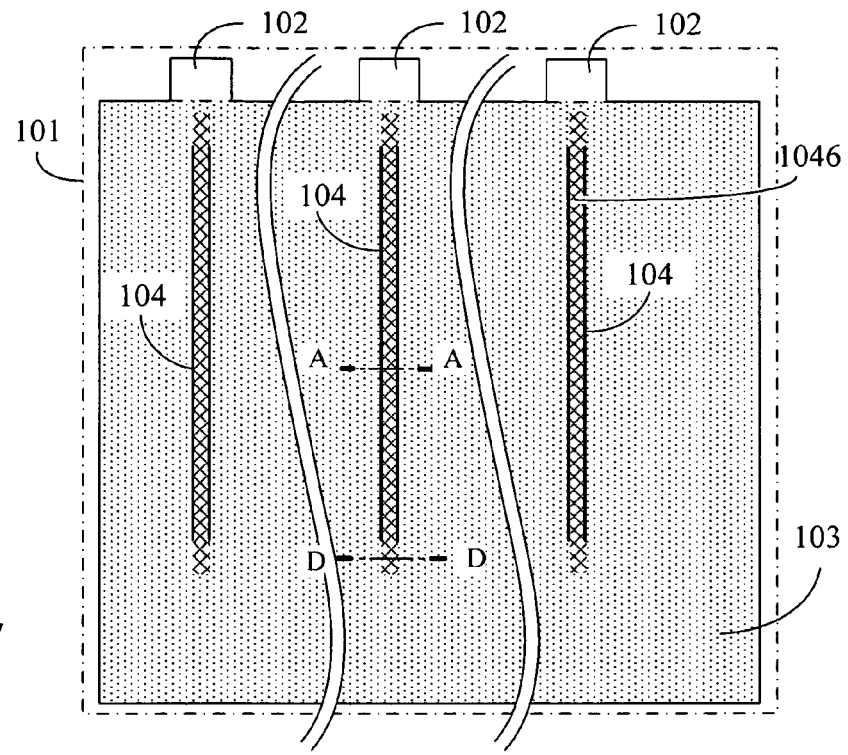
FIG. 67 shows the 67th embodiment of the present invention.

FIG. 67 shows the 67th embodiment of the present invention; as showing in FIG. 67, the constitution of the insulated split-flow conductive structure 104 is same as that of the embodiment shown in FIG. 26.

Figure 68:
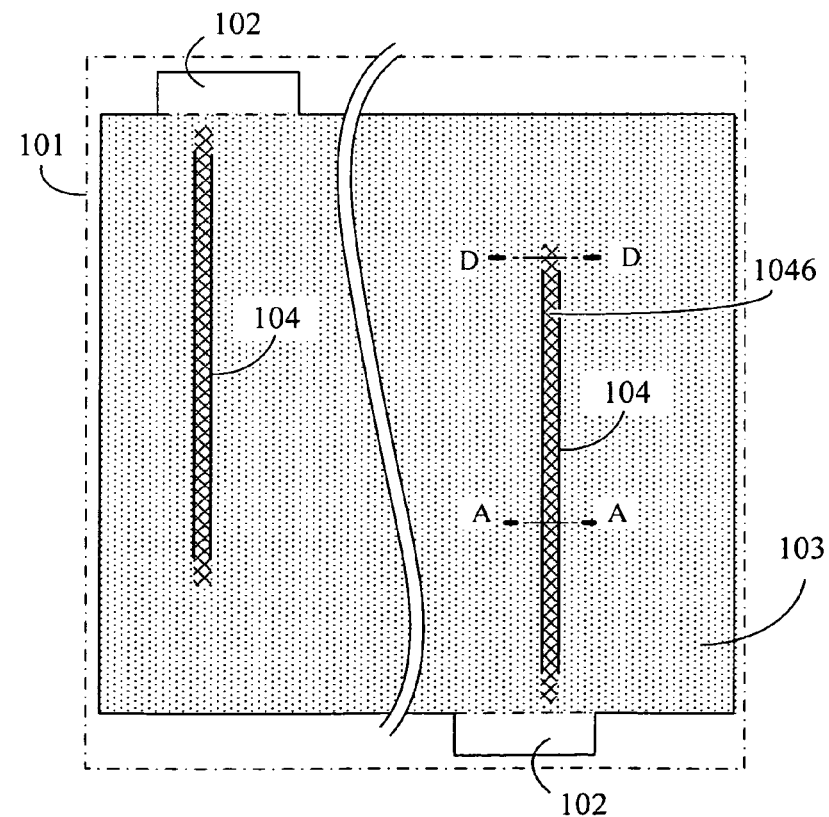
FIG. 68 shows the 68th embodiment of the present invention.

FIG. 68 shows the 68th embodiment of the present invention; as showing in FIG. 68, the constitution of the insulated split-flow conductive structure 104 is same as that of the embodiment shown in FIG. 27.

Figure 69:
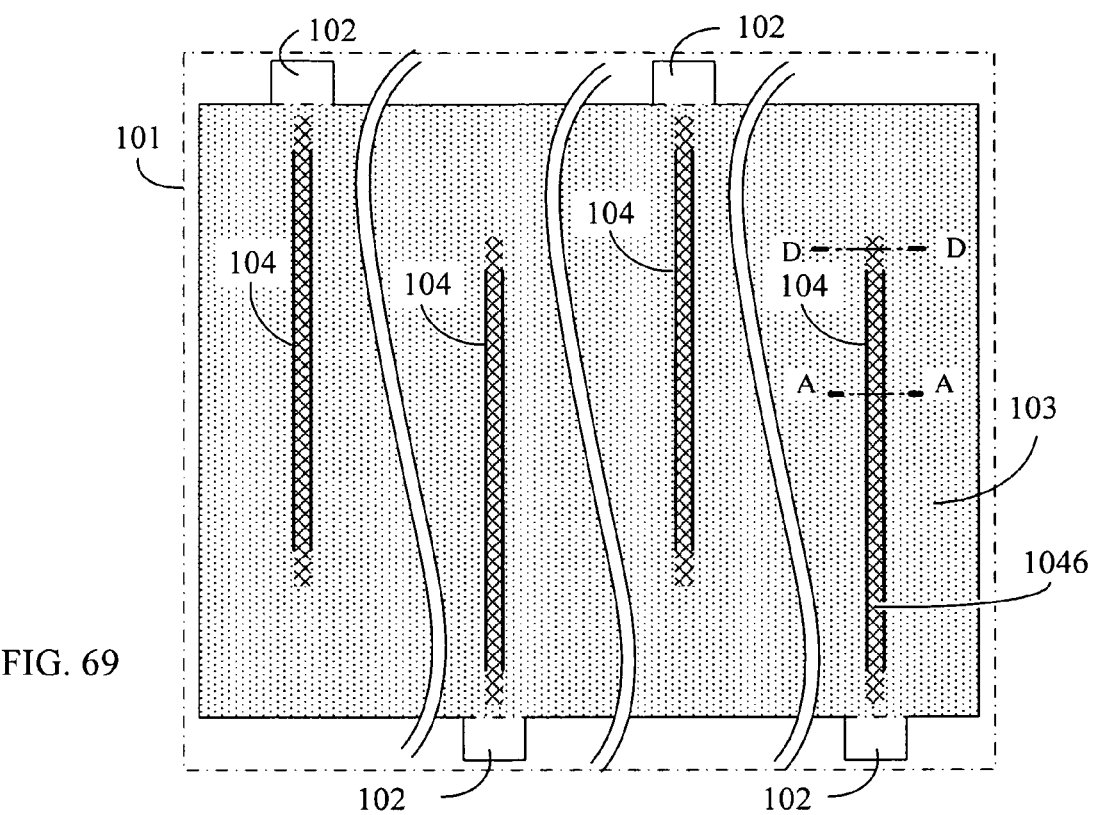
FIG. 69 shows the 69th embodiment of the present invention.

FIG. 69 shows the 69th embodiment of the present invention; as showing in FIG. 69, the constitution of the insulated split-flow conductive structure 104 is same as that of the embodiment shown in FIG. 28.

FIG. 70 shows the 70th embodiment of the present invention; as showing in FIG. 70, the constitution of the insulated split-flow conductive structure 104 is same as that of the embodiment shown in FIG. 29.

Figure 71:
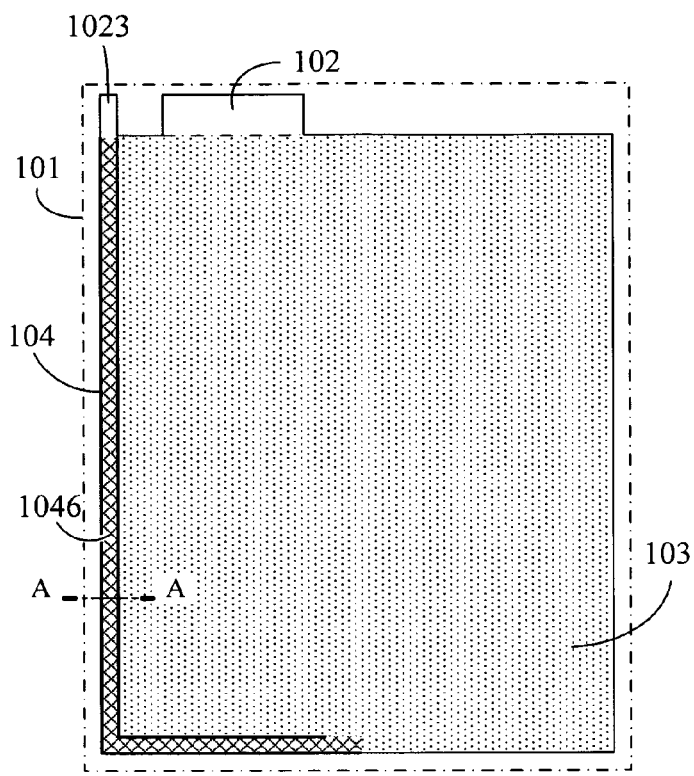
FIG. 71 shows the 71th embodiment of the present invention.

FIG. 71 shows the 71th embodiment of the present invention; as showing in FIG. 71, the constitution of the insulated split-flow conductive structure 104 is same as that of the embodiment shown in FIG. 30.

Figure 72:
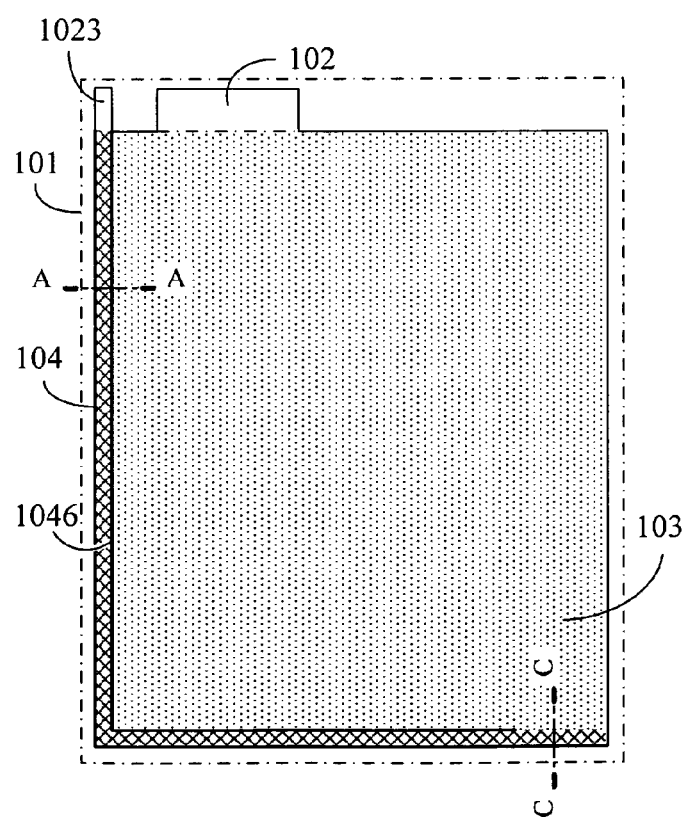
FIG. 72 shows the 72th embodiment of the present invention.

FIG. 72 shows the 72th embodiment of the present invention; as showing in FIG. 72, the constitution of the insulated split-flow conductive structure 104 is same as that of the embodiment shown in FIG. 31.

For the equalizing electrode plate with insulated split-flow conductive structure, which is applied to the electrode plate constituted by the grid sheet conductive material, or radiative grid sheet, laminate, or winding type electrode plate; and there is the electric energy input/output terminal 102 with same or near width as that of the electrode plate at one or more sides of the electrode plate, in which the arrangement of the insulated split-flow conductive structure 104 is same as which, single electric energy input/output terminal installed at one or more sides of the electrode plate 101, in the above embodiments.

Figure 73:
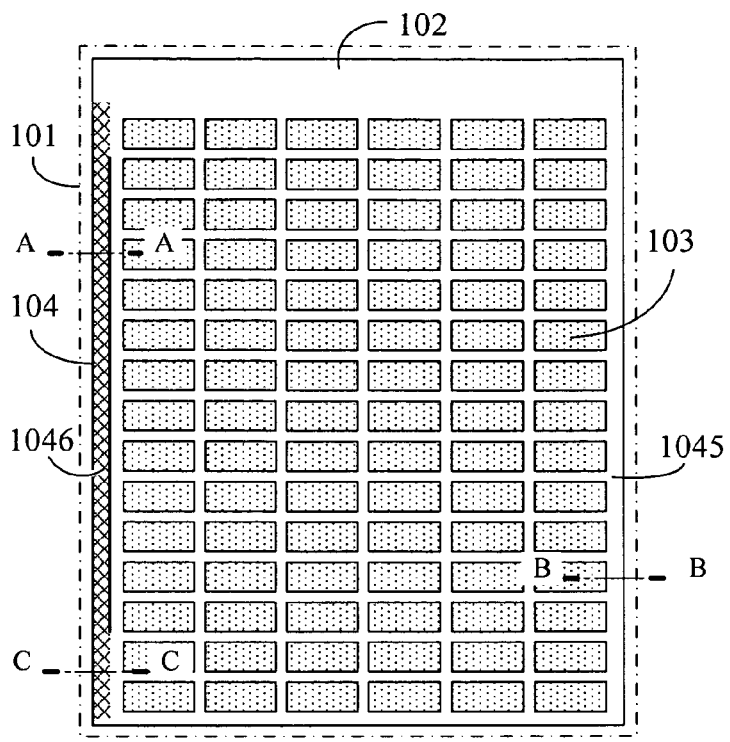
FIG. 73 shows the 73th embodiment of the present invention.

FIG. 73 shows the 73th embodiment of the present invention; as shown in FIG. 73, the electrode plate 101 is grid sheet structure, in which the constitution of the insulated split-flow conductive structure 104 is same as that in FIG. 2, and the further feature is that there is the electric energy input/output terminal with same or near width as that of the electrode plate at one side of the electrode plate.

Figure 74:
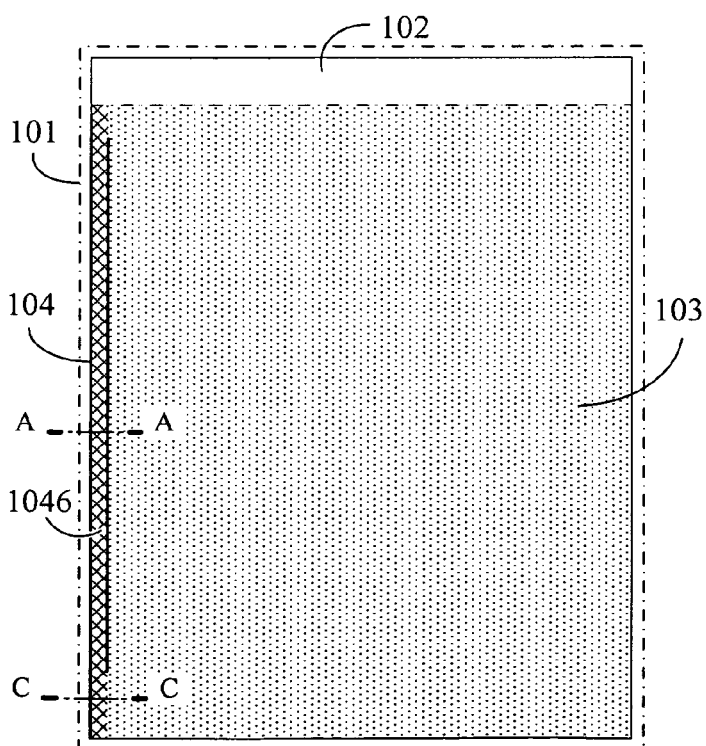
FIG. 74 shows the 74th embodiment of the present invention.

FIG. 74 shows the 74th embodiment of the present invention; as shown in FIG. 74, the electrode plate 101 is laminate structure, in which the constitution of the insulated split-flow conductive structure 104 is same as that in FIG. 44, and the further feature is that there is the electric energy input/output terminal with same or near width as that of the electrode plate at one side of the electrode plate.

Figure 75:
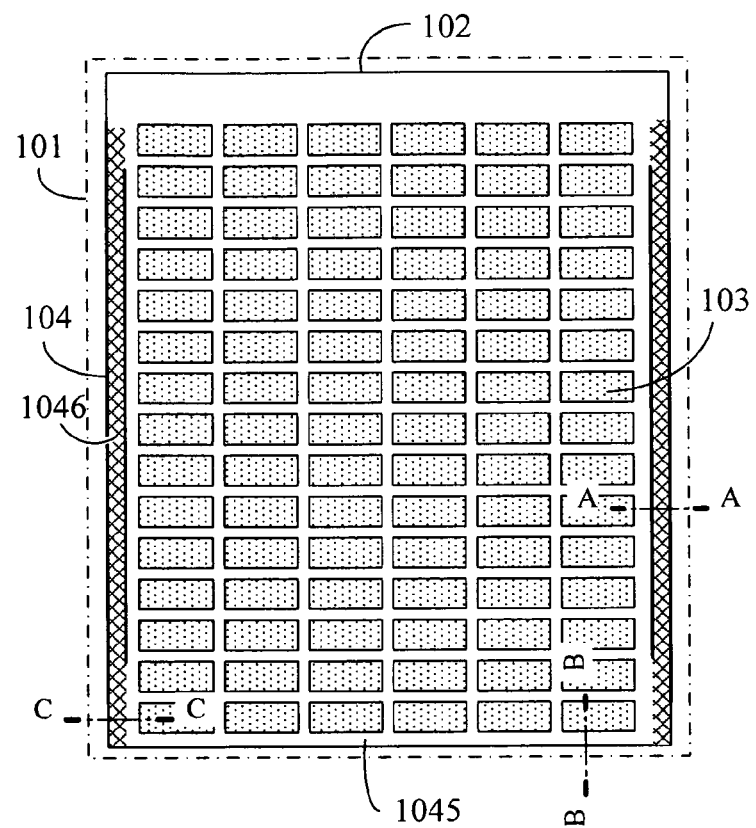
FIG. 75 shows the 75th embodiment of the present invention.

FIG. 75 shows the 75th embodiment of the present invention; as shown in FIG. 75, the electrode plate 101 is grid sheet structure, in which the constitution of the insulated split-flow conductive structure 104 is same as that in FIG. 4, and the further feature is that there is the electric energy input/output terminal with same or near width as that of the electrode plate at one side of the electrode plate.

Figure 76:
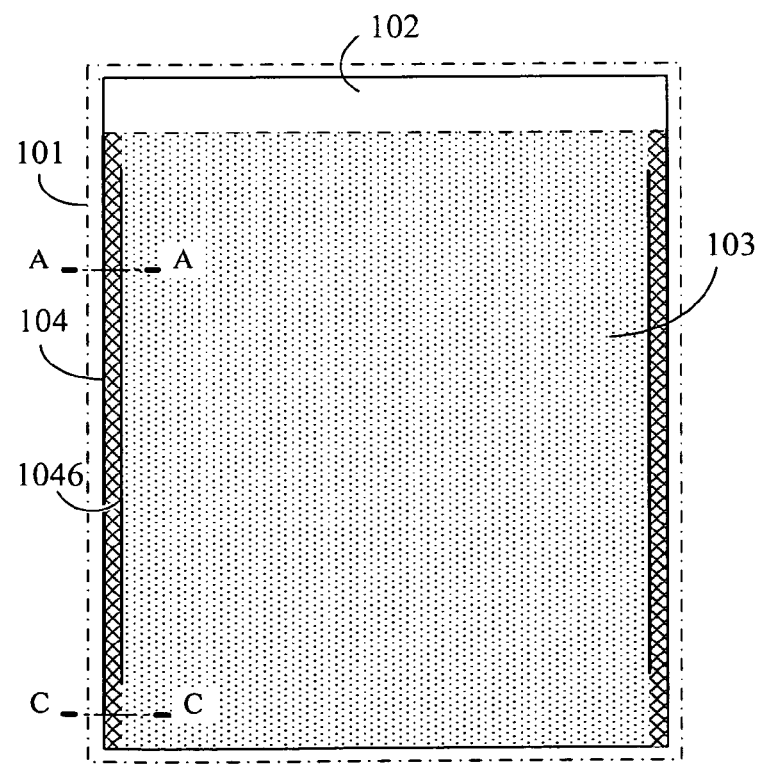
FIG. 76 shows the 76th embodiment of the present invention.

FIG. 76 shows the 76th embodiment of the present invention; as shown in FIG. 76, the electrode plate 101 is laminate structure, in which the constitution of the insulated split-flow conductive structure 104 is same as that in FIG. 46, and the further feature is that there is the electric energy input/output terminal with same or near width as that of the electrode plate at one side of the electrode plate.

Figure 77:
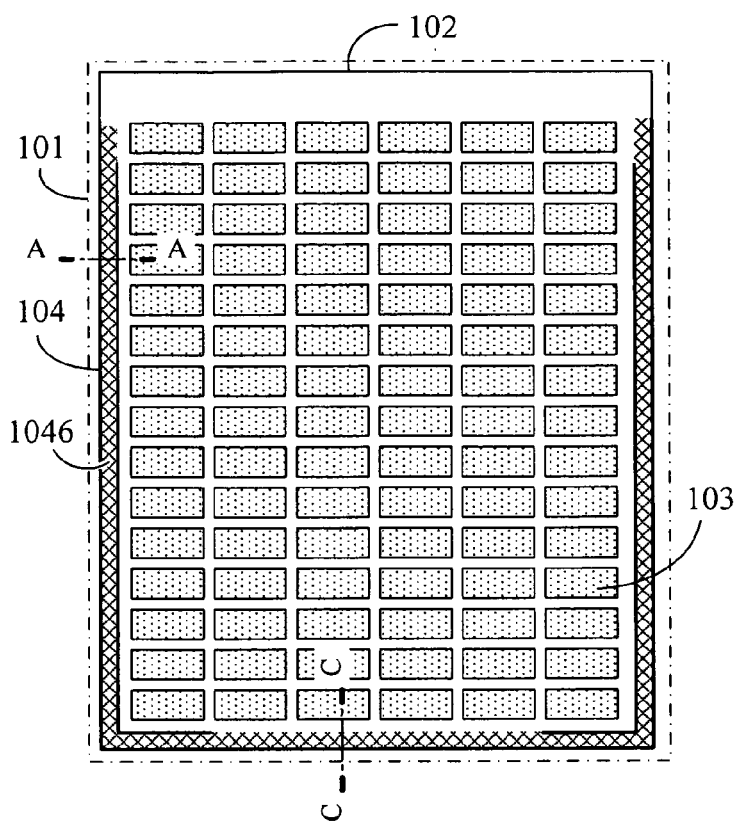
FIG. 77 shows the 77th embodiment of the present invention.

FIG. 77 shows the 77th embodiment of the present invention; as shown in FIG. 77, the electrode plate 101 is laminate structure, in which the electric energy input/output terminal 102 installed at the upside of the electrode plate 101 downward extends along the left side of the electrode plate 101 to the bottom edge near the position of the intermediate part for installing with the insulated split-flow conductive structure 104, thus the input/output current is direct transmitted between the bottom edge near the position of the intermediate part of the electrode plate 101 and the electric energy input/output terminal 102; and the electric energy input/output terminal 102 downward extends along the right side of the electrode plate 101 to the bottom edge near the position of the intermediate part for installing with the insulated split-flow conductive structure 104, thus the input/output current is direct transmitted between the bottom edge of the right side near the position of the intermediate part of the electrode plate 101 and the electric energy input/output terminal 102; the bommom segment of the insulated split-flow conductive structure 104 nears or links with that of the above insulated split-flow conductive structure 104 downward extending from the left side of the electrode plate 101, and is conductive with the electrode plate 101.

Figure 78:
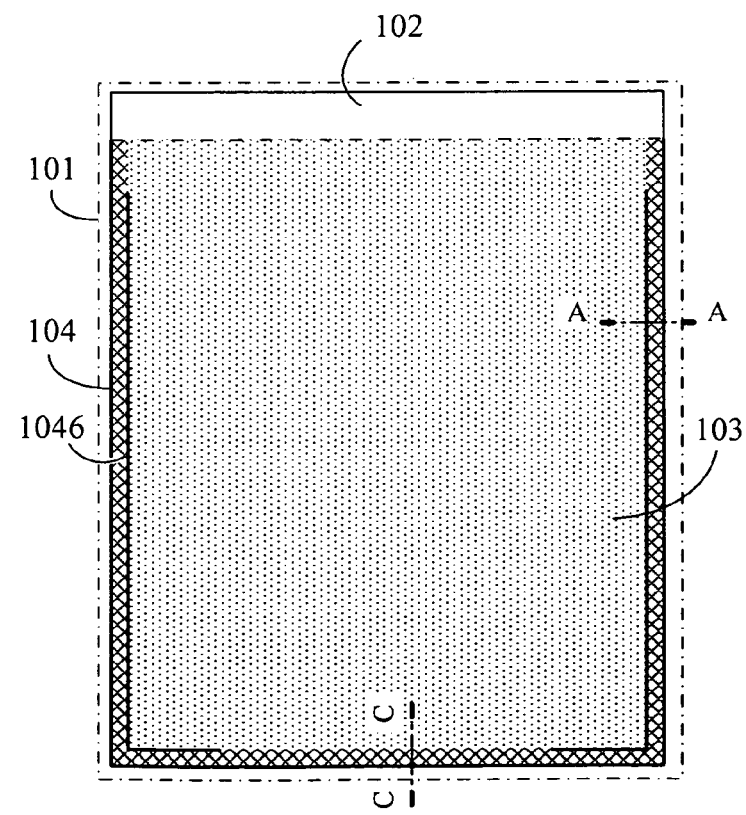
FIG. 78 shows the 78th embodiment of the present invention.

FIG. 78 shows the 78th embodiment of the present invention; as shown in FIG. 78, the electrode plate 101 is laminate structure, in which the constitution of the insulated split-flow conductive structure 104 is same as that in FIG. 9.

Figure 79:
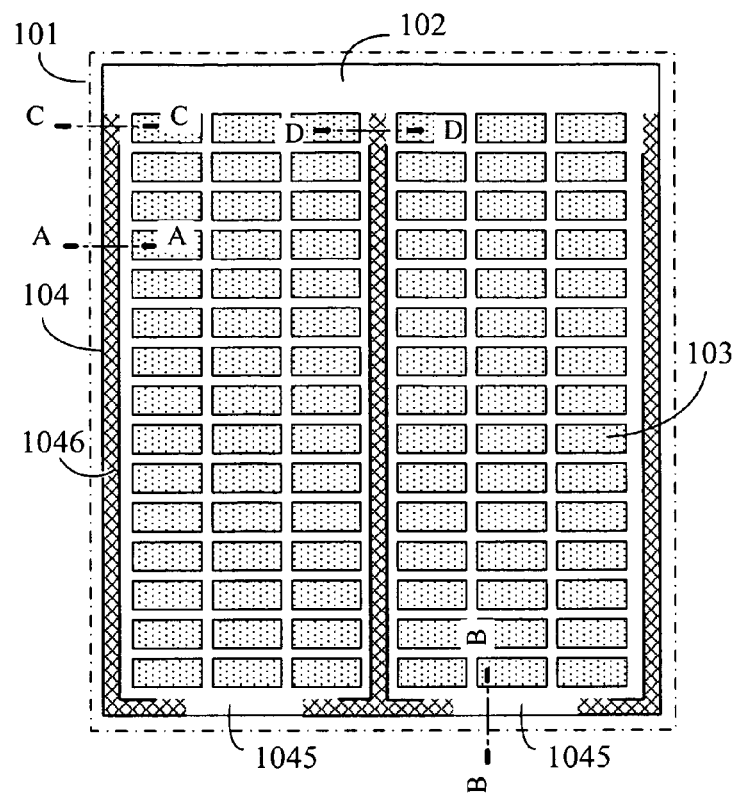
FIG. 79 shows the 79th embodiment of the present invention.

FIG. 79 shows the 79th embodiment of the present invention; as shown in FIG. 79, the electrode plate 101 is grid sheet structure, in which the electric energy input/output terminal 102 installed at the upside of the electrode plate 101 downward extends along the left side of the electrode plate 101 to the bottom edge near the position of the intermediate part for installing with the insulated split-flow conductive structure 104, thus the input/output current is direct transmitted between the bottom edge near the position of the intermediate part of the electrode plate 101 and the electric energy input/output terminal 102; and the electric energy input/output terminal 102 downward extends along the right side of the electrode plate 101 to the bottom edge near the position of the intermediate part for installing with the insulated split-flow conductive structure 104, thus the input/output current is direct transmitted between the bottom edge of the right side near the position of the intermediate part of the electrode plate 101 and the electric energy input/output terminal 102; the bommom segment of the insulated split-flow conductive structure 104 nears or links with that of the above insulated split-flow conductive structure 104 downward extending from the left side of the electrode plate 101, and is conductive with the electrode plate 101; and the intermediate part of the electric energy input/output terminal 102 extends to the bottom of the electrode plate 101 for installing with the insulated split-flow conductive structure 104, thus the input/output current is direct transmitted between the bottom edge of the electrode plate 101 and the intermediate part of the electric energy input/output terminal 102.

Figure 80:
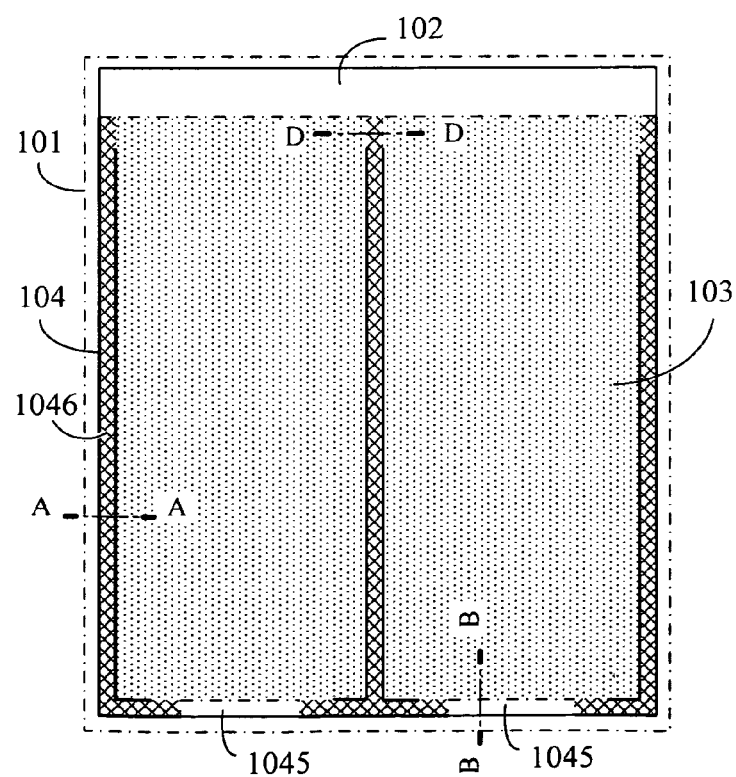
FIG. 80 shows the 80th embodiment of the present invention.

FIG. 80 shows the 80th embodiment of the present invention; as shown in FIG. 80, the electrode plate 101 is laminate structure, in which the constitution of the insulated split-flow conductive structure 104 is same as that in FIG. 79.

Figure 81:
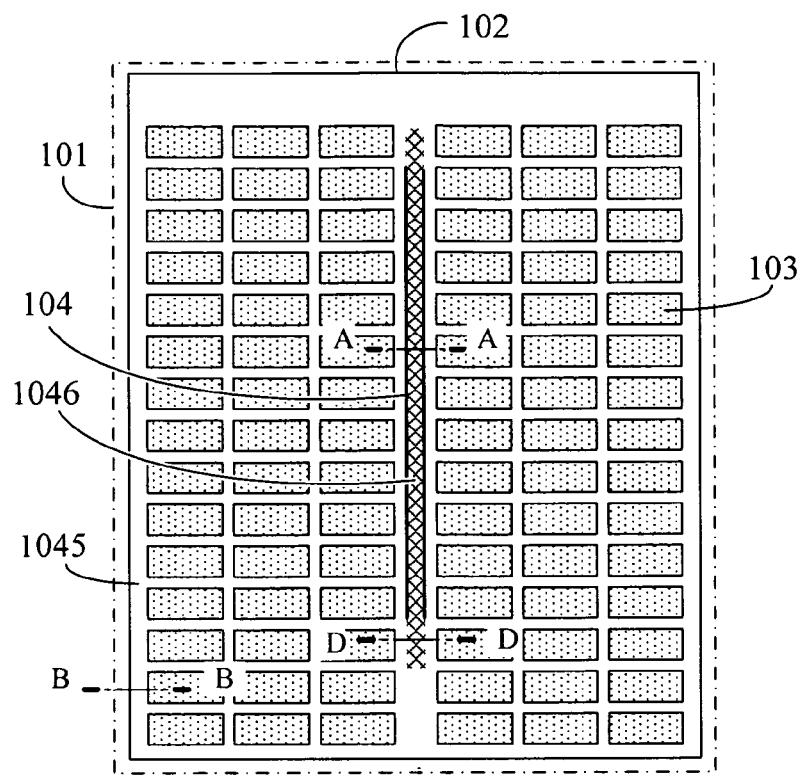
FIG. 81 shows the 81th embodiment of the present invention.

FIG. 81 shows the 81th embodiment of the present invention; as shown in FIG. 81, the electrode plate 101 is laminate structure, in which the electric energy input/output terminal 102 with same or near width as that of the electrode plate is installed at the upside of the electrode plate 101; and the intermediate part of the electric energy input/output terminal 102 installed at the upside of the electrode plate 101 downward extends to the position near the intermediate part region of the electrode plate 101 for installing with the insulated split-flow conductive structure 104, thus the input/output current is direct transmitted with lower impedance between the electrode plate region set in the electrode plate 101 for direct transmitting current with the electric energy input/output terminal 102, and the electric energy input/output terminal 102 linking with another side of the connecting insulated split-flow conductive structure 104.

Figure 82:
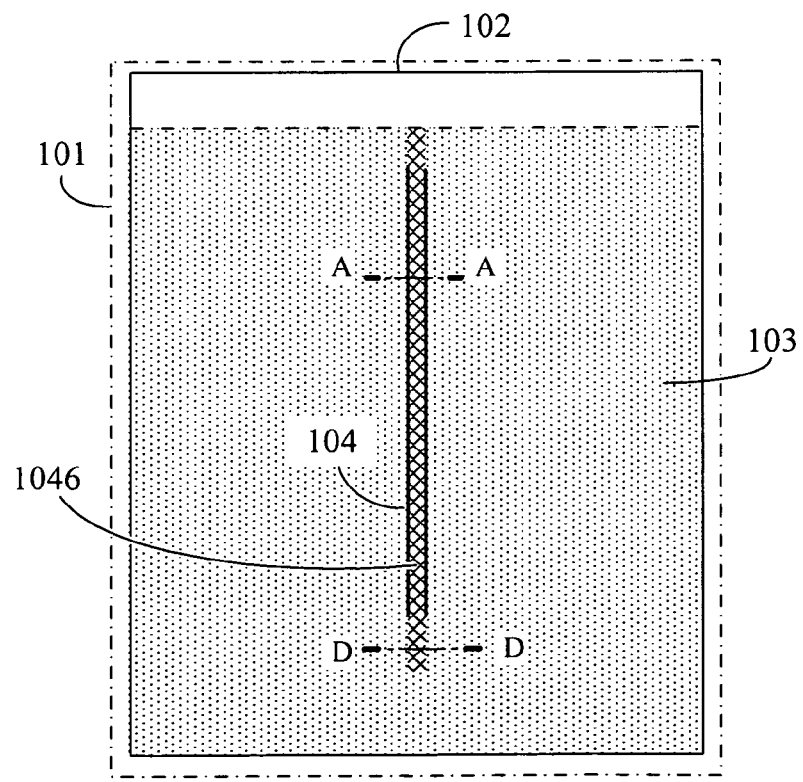
FIG. 82 shows the 82th embodiment of the present invention.

FIG. 82 shows the 82th embodiment of the present invention; as shown in FIG. 82, the electrode plate 101 is laminate structure, in which the constitution of the insulated split-flow conductive structure 104 is same as that in FIG. 81.

Figure 83:
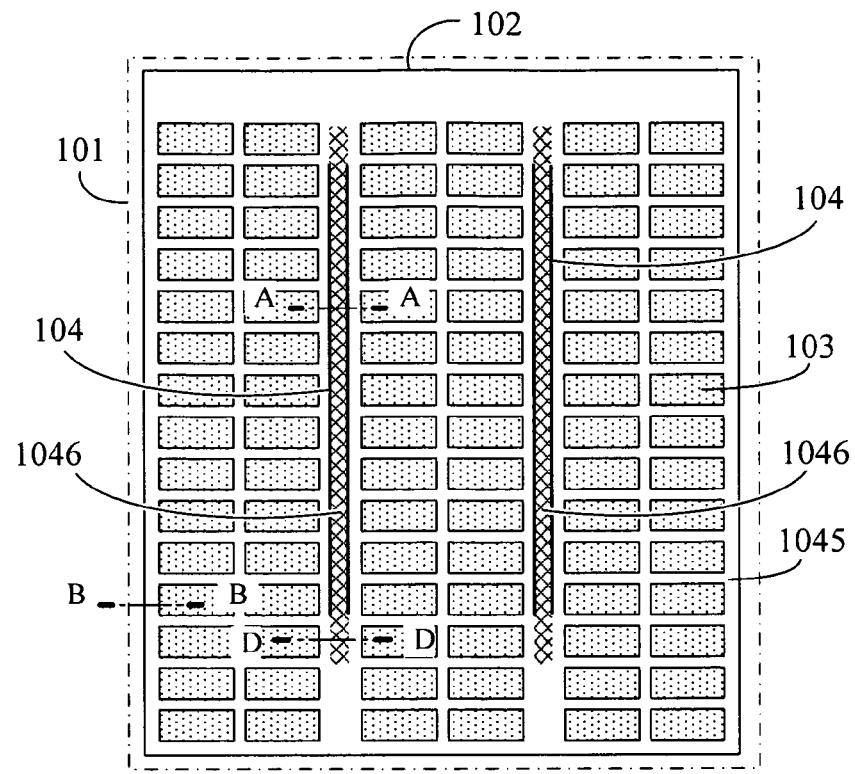
FIG. 83 shows the 83th embodiment of the present invention.

FIG. 83 shows the 83th embodiment of the present invention; as shown in FIG. 83, the electrode plate 101 is grid sheet structure, in which the electric energy input/output terminal 102 with same or near width as that of the electrode plate is installed at the upside of the electrode plate 101; and two or more electric energy input/output terminals 102 (in the figure is represented by two) are installed at the upside of the electrode plate 101, and the intermediate part of the electric energy input/output terminals 102 downward extend to the position near the intermediate part region of the electrode plate 101 for installing with the insulated split-flow conductive structure 104, thus the input/output current is direct transmitted with lower impedance between the electrode plate region set in the electrode plate 101 for direct transmitting current with the electric energy input/output terminal 102, and the electric energy input/output terminal 102 linking with another side of the connecting insulated split-flow conductive structure 104.

Figure 84:
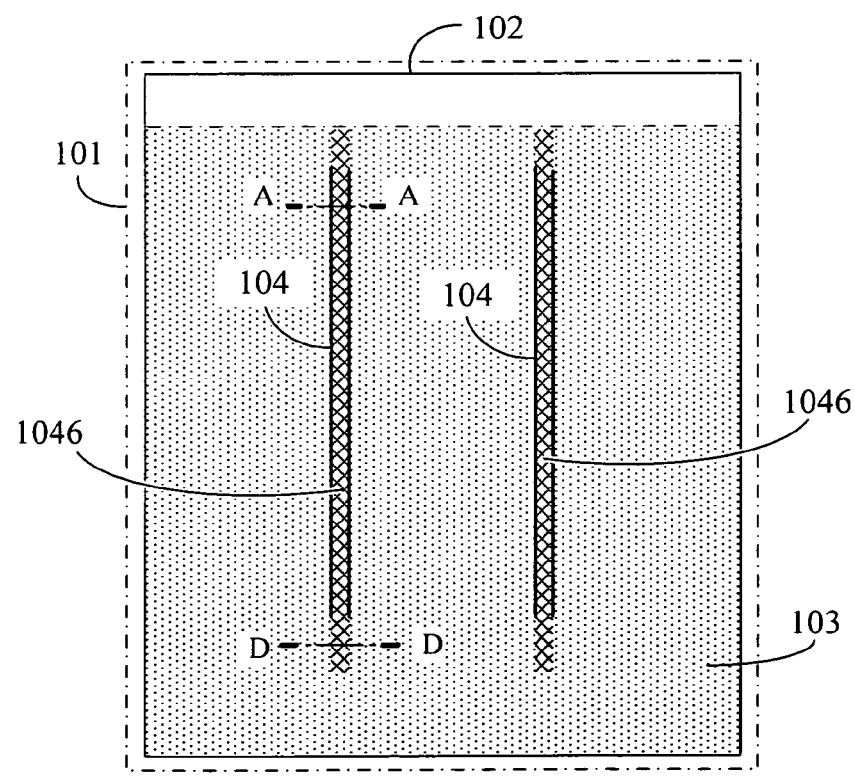
FIG. 84 shows the 84th embodiment of the present invention.

FIG. 84 shows the 84th embodiment of the present invention; as shown in FIG. 84, the electrode plate 101 is laminate structure, in which the constitution of the insulated split-flow conductive structure 104 is same as that in FIG. 83.

Figure 85:
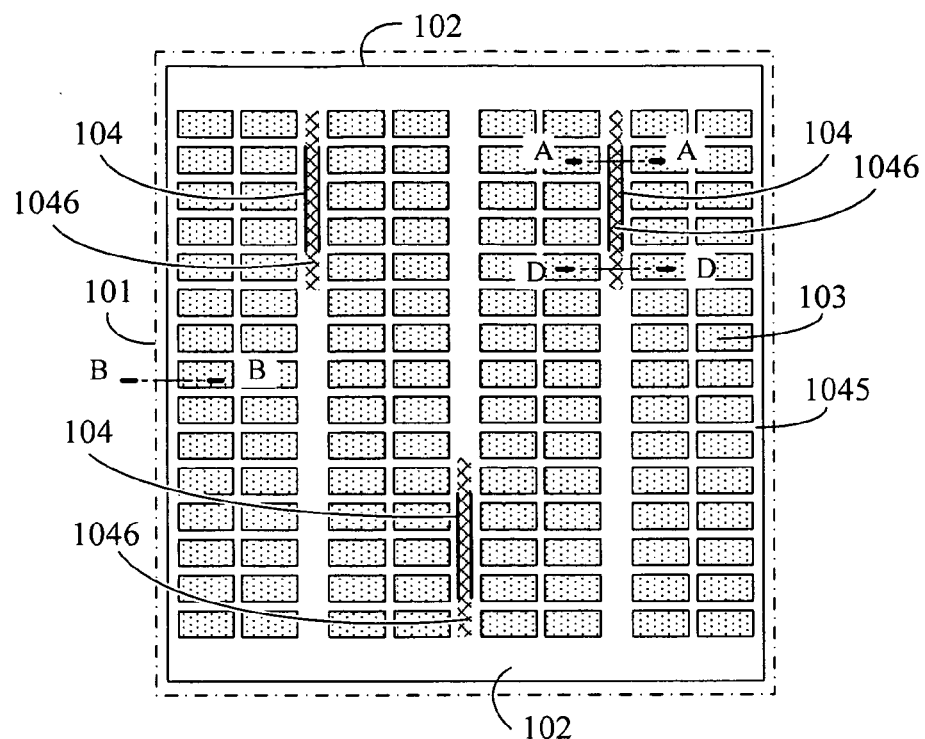
FIG. 85 shows the 85th embodiment of the present invention.

FIG. 85 shows the 85th embodiment of the present invention; as shown in FIG. 85, the electrode plate 101 is grid sheet structure, in which the electric energy input/output terminal 102 with same or near width as that of the electrode plate is installed at each of the upside and the downside of the electrode plate 101; and two or more intermediate part of the electric energy input/output terminals 102 (in the figure is represented by two) installed at the upside of the electrode plate 101, and the positions near two sides of the electric energy input/output terminals 102 downward extend to the position near the intermediate part region of the electrode plate 101 for installing with the insulated split-flow conductive structure 104, and one or more electric energy input/output terminals 102 (in the figure is represented by one) installed at intermediate part of the insulated split-flow conductive structure 104 installed at the position where the electric energy input/output terminal 102 installed at the downside of the electrode plate 101 downward extending, upward extend to the position near the intermediate part region of the electrode plate 101 for installing with the insulated split-flow conductive structure 104, which is the above insulated split-flow conductive structure 104 thus the input/output current is direct transmitted with lower impedance between the electrode plate region near the intermediate part region set in the electrode plate 101 for direct transmitting current with the electric energy input/output terminals 102 installed at the upside and the downside, and the electric energy input/output terminal 102 linking with another side of the insulated split-flow conductive structure 104 connecting with the upside and the downside.

Figure 86:
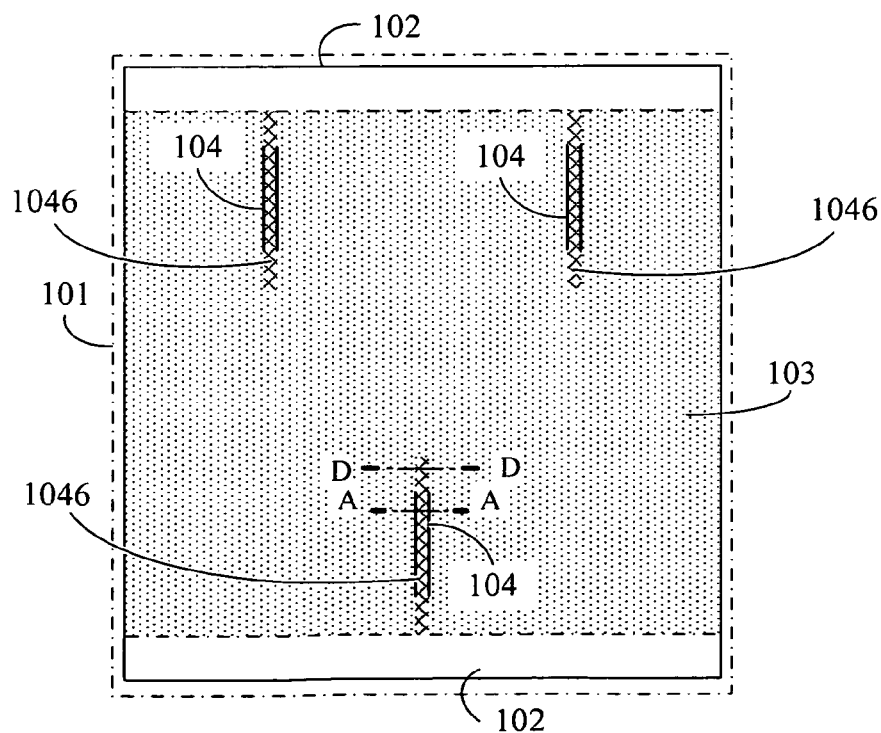
FIG. 86 shows the 86th embodiment of the present invention.

FIG. 86 shows the 86th embodiment of the present invention; as shown in FIG. 86, the electrode plate 101 is laminate structure, in which the constitution of the insulated split-flow conductive structure 104 is same as that in FIG. 85.

Figure 87:
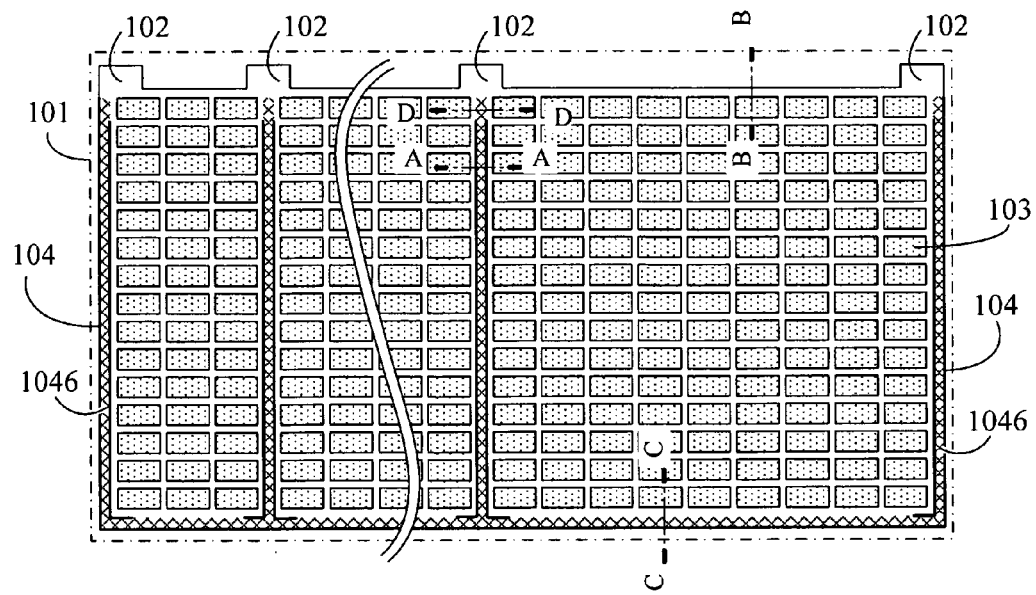
FIG. 87 shows the 87th embodiment of the present invention.

For the equalizing electrode plate with insulated split-flow conductive structure, which is further applied to winding type electrode plate, the embodiments are as follow:

FIG. 87 shows the 87th embodiment of the present invention; as shown in FIG. 87, the electrode plate 101 is grid sheet structure, in which at least one electric energy input/output terminal 102 is installed at the upside of the electrode plate 101, and downward extends along the left side of the electrode plate 101 to the position near the intermediate part of the bottom edge for installing with the insulated split-flow conductive structure 104, thus the input/output current is direct transmitted between the position near the intermediate part of the bottom edge of the electrode plate 101 and the electric energy input/output terminal 102; and the electric energy input/output terminal 102 installed at the most right side of the electrode plate downward extends along the right side (including the right side in the case of single electric energy input/output terminal) of the electrode plate 101 to the bottom edge for installing with the insulated split-flow conductive structure 104 along the bottom edge, thus the input/output current is direct transmitted between the bottom edge of the right side of the electrode plate 101 and the electric energy input/output terminal 102, and the bommom segment of the insulated split-flow conductive structure 104 links with that of the above insulated split-flow conductive structure 104 downward extending from the left side of the electrode plate 101, and is conductive with the electrode plate 101; if two or more electric energy input/output terminals 102 are installed, the electric energy input/output terminal 102 installed at intermediate part extends to the bottom of the electrode plate 101 for installing with the insulated split-flow conductive structure 104, thus the input/output current is direct transmitted between the bottom edge of the electrode plate 101 and the electric energy input/output terminal 102 installed at intermediate part of the electrode plate 101; and there is an isolated body installed between the electrode plate 101 and another electrode plate with different polarity for winding type structure.

Figure 88:
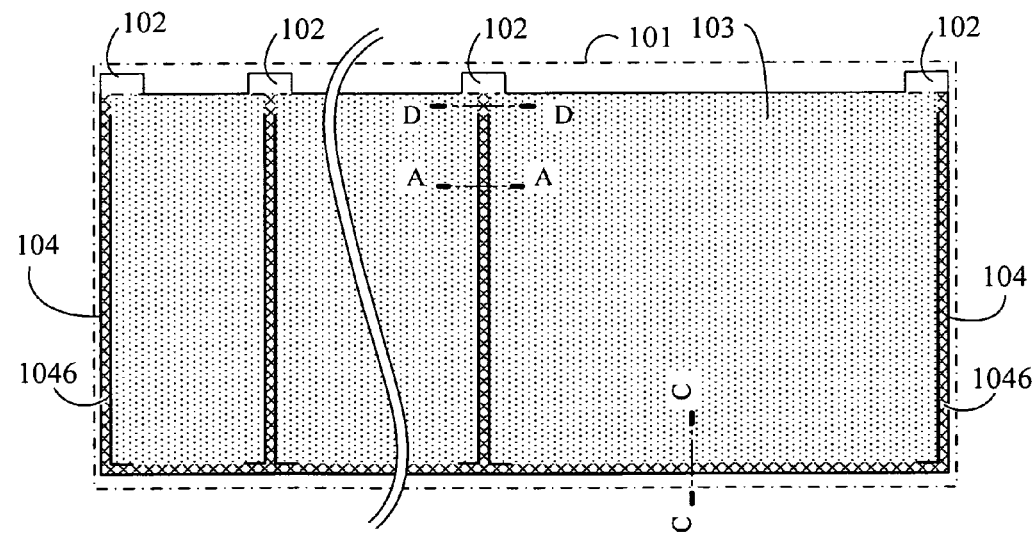
FIG. 88 shows the 88th embodiment of the present invention.

FIG. 88 shows the 88th embodiment of the present invention; as shown in FIG. 88, the electrode plate 101 is laminate structure, in which the constitution of the insulated split-flow conductive structure 104 is same as that in FIG. 87.

Figure 89:
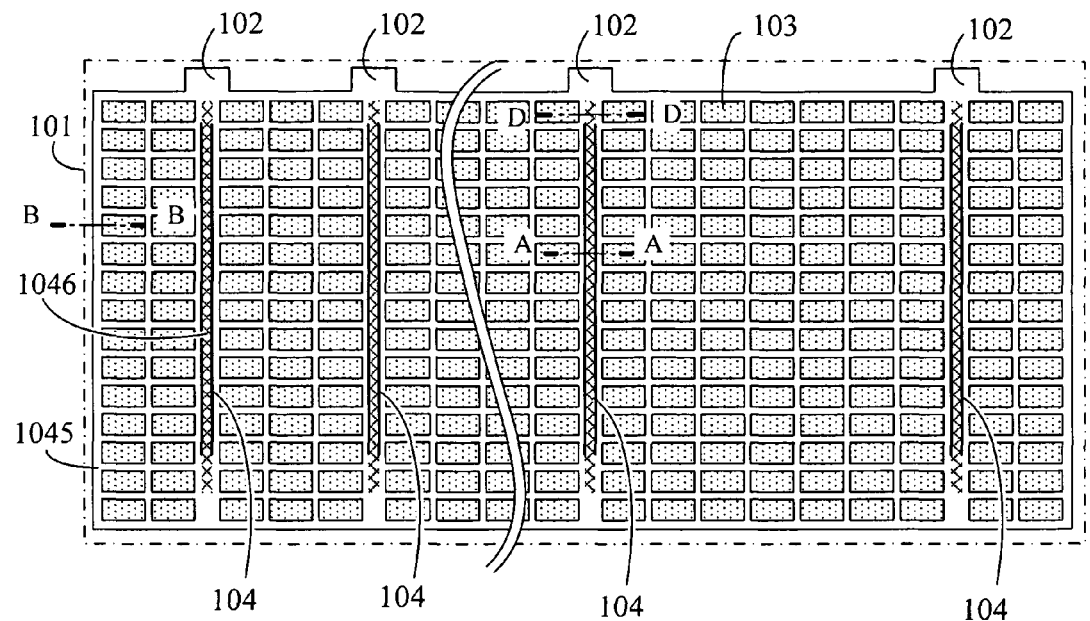
FIG. 89 shows the 89th embodiment of the present invention.

FIG. 89 shows the 89th embodiment of the present invention; as shown in FIG. 89, at least one electric energy input/output terminal 102 is installed at the upside of the electrode plate 101, and the intermediate part of the electric energy input/output terminal 102 installed at the upside of the electrode plate 101 downward extends to the position near the bottom edge of the electrode plate 101 for installing with the insulated split-flow conductive structure 104, thus the input/output current is direct transmitted with lower impedance between the position near the bottom edge of the electrode plate 101 and the electric energy input/output terminal 102 linking with another side of the connecting insulated split-flow conductive structure 104; and there is an isolated body installed between the electrode plate 101 and another electrode plate with different polarity for winding type structure.

Figure 90:
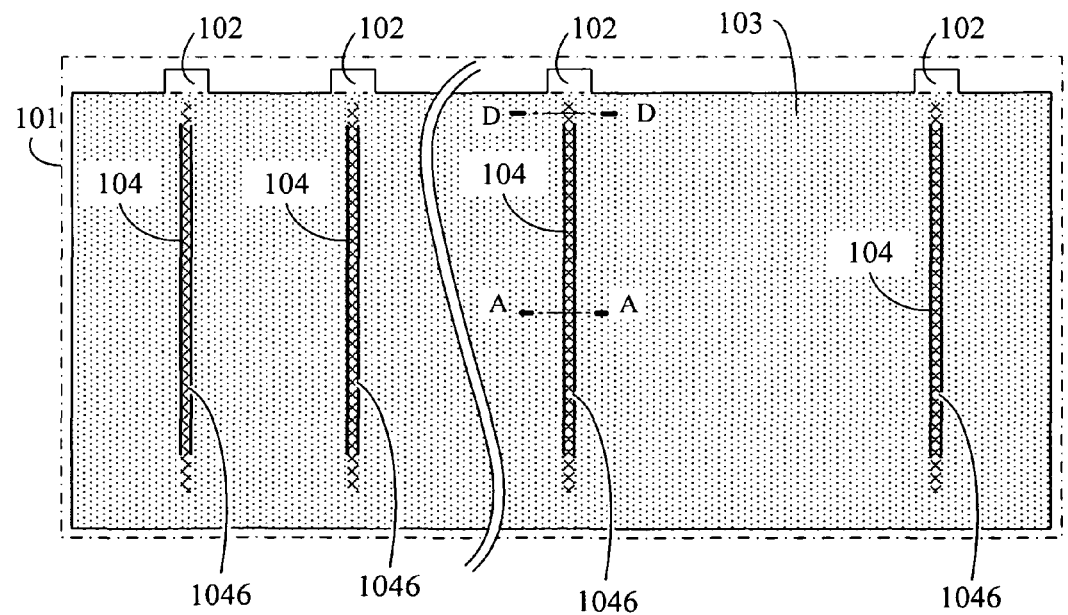
FIG. 90 shows the 90th embodiment of the present invention.

FIG. 90 shows the 90th embodiment of the present invention; as shown in FIG. 90, the electrode plate 101 is laminate structure, in which the constitution of the insulated split-flow conductive structure 104 is same as that in FIG. 89.

Figure 91:
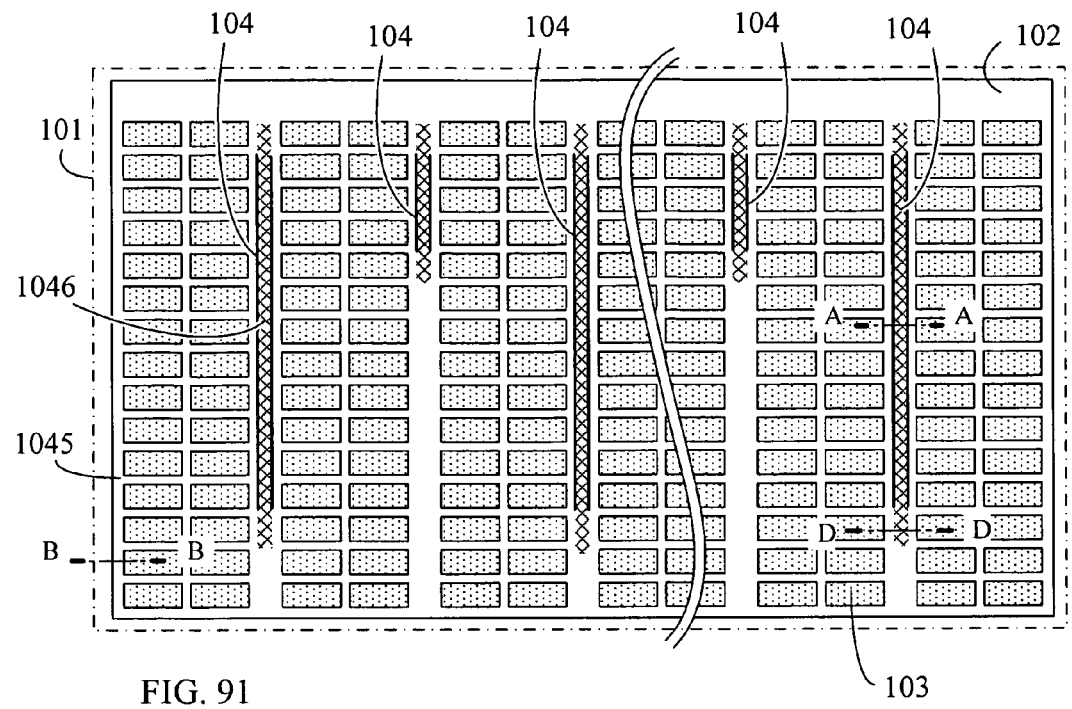
FIG. 91 shows the 91th embodiment of the present invention.

FIG. 91 shows the 91th embodiment of the present invention; as shown in FIG. 91, the electrode plate 101 is grid sheet structure, in which the electric energy input/output terminal 102 with same or near width as that of the electrode plate at the upside of the electrode plate; and two or more electric energy input/output terminals 102 (in the figure is represented by two) are installed at the upside of the electrode plate 101, and the intermediate part of the electric energy input/output terminals 102 downward extend to the position beyond the intermediate part and near the bottom edge region of the electrode plate 101 for installing with the insulated split-flow conductive structure 104, thus the input/output current is direct transmitted with lower impedance between the electrode plate region beyond the intermediate part and near the bottom edge set in the electrode plate 101 for direct transmitting current with the electric energy input/output terminal 102, and the electric energy input/output terminal 102 linking with another side of the connecting insulated split-flow conductive structure 104; and the insulated split-flow conductive structure 104 is installed at the region where the above electric energy input/output terminals 102 downward extend to the position near the intermediate part of the electrode plate 101, thus the input/output current is direct transmitted with lower impedance between the electrode plate region beyond the intermediate part and near the intermediate edge set in the electrode plate 101 for direct transmitting current with the electric energy input/output terminal 102, and the electric energy input/output terminal 102 linking with another side of the connecting insulated split-flow conductive structure 104; and there is an isolated body installed between the electrode plate 101 and another electrode plate with different polarity for winding type structure.

Figure 92:
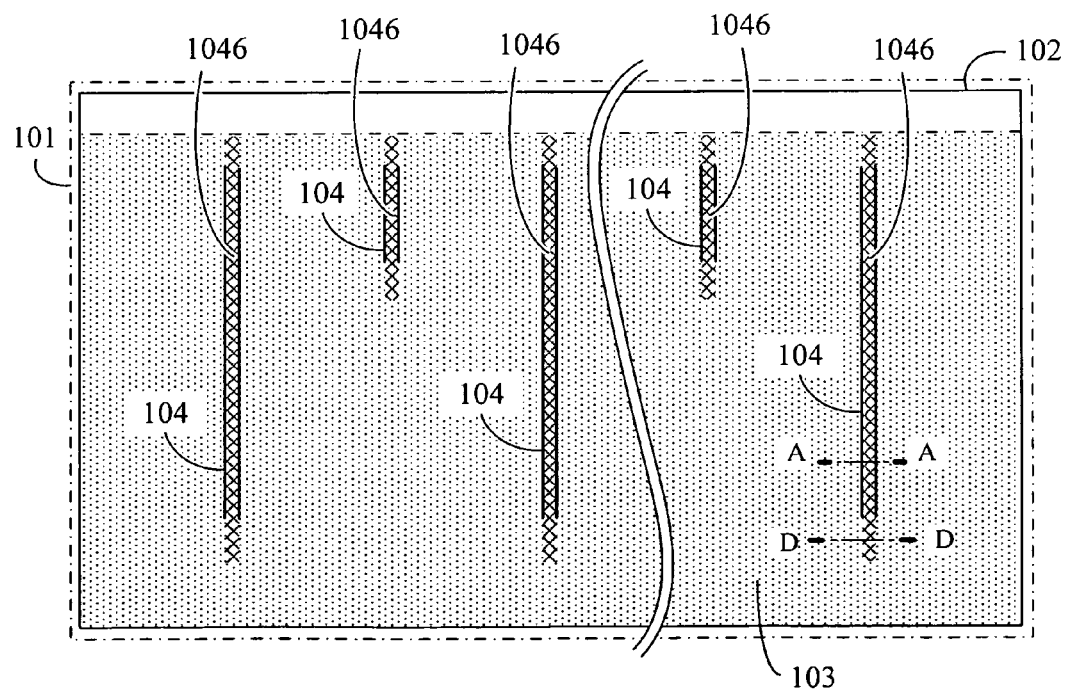
FIG. 92 shows the 92th embodiment of the present invention.

FIG. 92 shows the 92th embodiment of the present invention; as shown in FIG. 92, the electrode plate 101 is laminate structure, in which the constitution of the insulated split-flow conductive structure 104 is same as that in FIG. 91.

Figure 93:
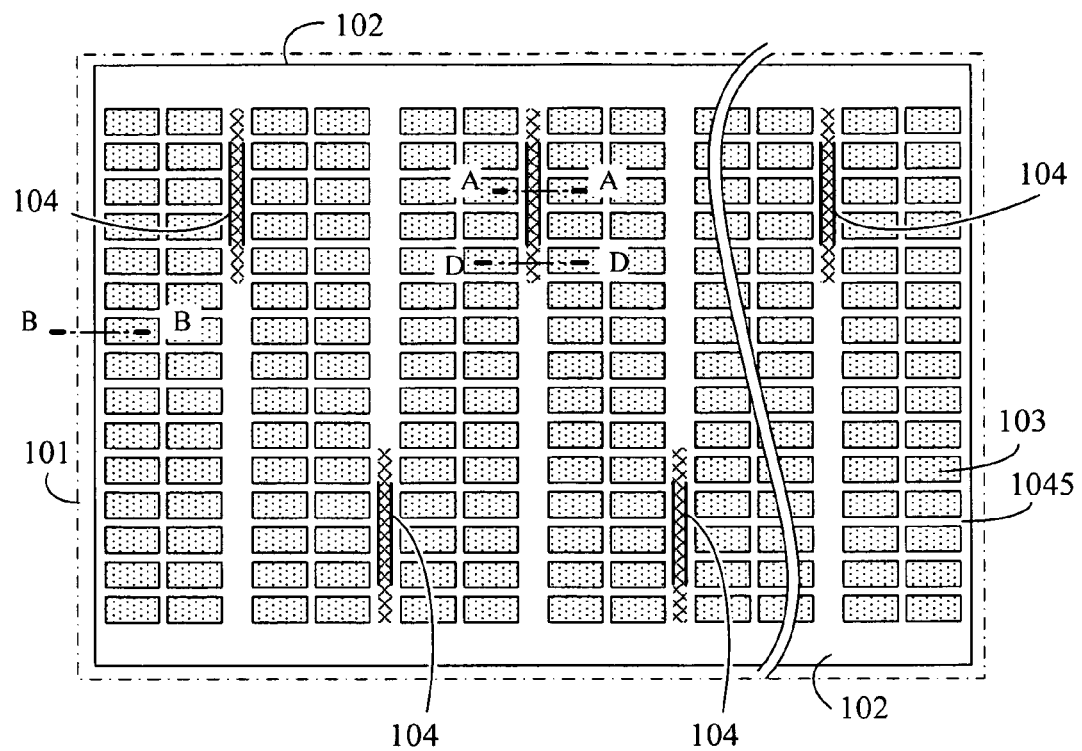
FIG. 93 shows the 93th embodiment of the present invention.

FIG. 93 shows the 94th embodiment of the present invention; as shown in FIG. 93, the electrode plate 101 is grid sheet structure, in which the electric energy input/output terminal 102 with same or near width as that of the electrode plate is installed at each of the upside and the downside of the electrode plate 101; and two or more intermediate part of the electric energy input/output terminals 102 (in the figure is represented by three) installed at the upside of the electrode plate 101, and the positions near two sides of the electric energy input/output terminals 102 downward extend to the position near the intermediate part region of the electrode plate 101 for installing with the insulated split-flow conductive structure 104, and one or more electric energy input/output terminals 102 (in the figure is represented by two) installed at intermediate part of the insulated split-flow conductive structure 104 installed at the position where the electric energy input/output terminal 102 installed at the downside of the electrode plate 101 downward extending, upward extend to the position near the intermediate part region of the electrode plate 101 for installing with the insulated split-flow conductive structure 104, which is the above insulated split-flow conductive structure 104 thus the input/output current is direct transmitted with lower impedance between the electrode plate region near the intermediate part region set in the electrode plate 101 for direct transmitting current with the electric energy input/output terminals 102 installed at the upside and the downside, and the electric energy input/output terminal 102 linking with another side of the insulated split-flow conductive structure 104 connecting with the upside and the downside; and there is an isolated body installed between the electrode plate 101 and another electrode plate with different polarity for winding type structure.

Figure 94:
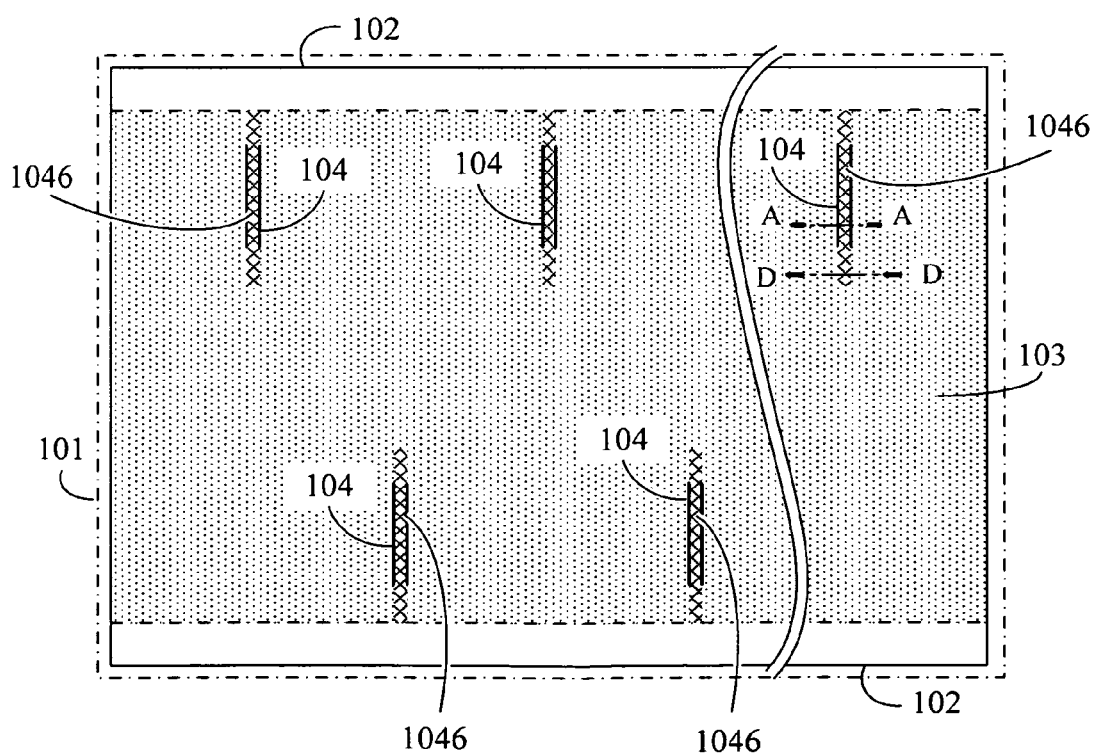
FIG. 94 shows the 94th embodiment of the present invention.

FIG. 94 shows the 94th embodiment of the present invention; as shown in FIG. 94, the electrode plate 101 is laminate structure, in which the constitution of the insulated split-flow conductive structure 104 is same as that in FIG. 93.

Figure 95:
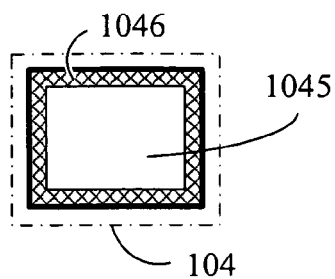
FIG. 95 is the A-A cross-section view of insulated split-flow conductive structure 104, according to the present invention.

For the equalizing electrode plate with insulated split-flow conductive structure, the cross-section shapes of the insulated split-flow conductive structures 104 in various embodiments are as following:

FIG. 95 is the A-A cross-section view of insulated split-flow conductive structure 104, according to the present invention; as shown in FIG. 95, the cross-section structure of the insulated split-flow conductive structure 104 is constituted by the conductive body 1045 coated with the insulator 1046.

Figure 96:
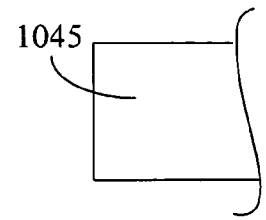
FIG. 96 is the B-B cross-section view of the conductive grid of the electrode plate, according to the present invention.

FIG. 96 is the B-B cross-section view of the conductive grid of the electrode plate, according to the present invention; as shown in FIG. 96, the cross-section structure of the conductive grid electrode is constituted by the strip conductive body 1045.

Figure 97:
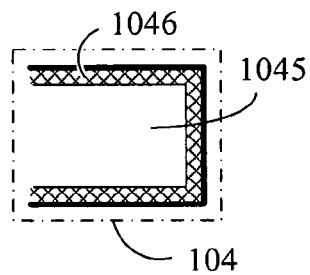
FIG. 97 is the C-C cross-section view of the insulated split-flow conductive structure 104, according to the present invention.

FIG. 97 is the C-C cross-section view of the insulated split-flow conductive structure 104, according to the present invention; as shown in FIG. 97, which is the cross-section structure of the conductive body 1045 of the insulated split-flow conductive structure 104, in which a side without the insulator 1046 installed.

Figure 98:
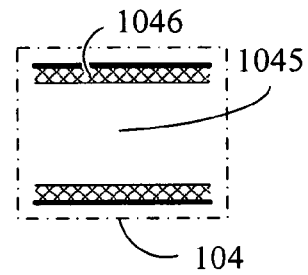
FIG. 98 is the D-D cross-section view of the insulated split-flow conductive structure 104, according to the present invention.

FIG. 98 is the D-D cross-section view of the insulated split-flow conductive structure 104, according to the present invention; as shown in FIG. 98, which is the cross-section structure of the conductive body 1045 of the insulated split-flow conductive structure 104, in which two sides of the conductive body without the insulator 1046 installed.

FIG. 99 is the E-E cross-section view of the parallel insulated split-flow conductive structures 104, according to the present invention; as shown in FIG. 99, which is the cross-section structure of the two parallel insulated split-flow conductive structures 104.

Figure 100:
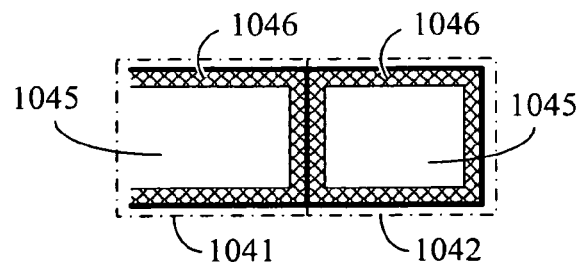
FIG. 100 is the F-F cross-section view of two parallel insulated split-flow conductive structures 1041 and 1042, in which at least one side of conductive body 1045 of one insulated split-flow conductive structure 104 without insulator 1046 installed, according to the present invention.

FIG. 100 is the F-F cross-section view of two parallel insulated split-flow conductive structures 1041 and 1042, in which at least one side of the conductive body 1045 of one insulated split-flow conductive structure 104 without the insulator 1046 installed, according to the present invention; as shown in FIG. 100, which is the cross-section structure of the two parallel insulated split-flow conductive structures 1041 and 1042, in which an insulator is additionally installed around one insulated split-flow conductive structure 104, and at least one side of the conductive body 1045 of another insulated split-flow conductive structure 104 is not installed with the insulator 1046.

Figure 101:
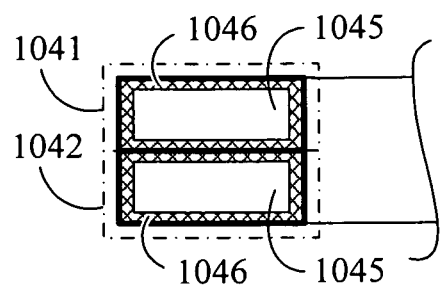
FIG. 101 is the G-G cross-section view of two parallel laminated insulated split-flow conductive structures 1041 and 1042, according to the present invention.

FIG. 101 is the G-G cross-section view of two parallel laminated insulated split-flow conductive structures 1041 and 1042, according to the present invention; as shown in FIG. 101, which is the cross-section structure of two parallel laminated insulated split-flow conductive structures 104.

Figure 102:
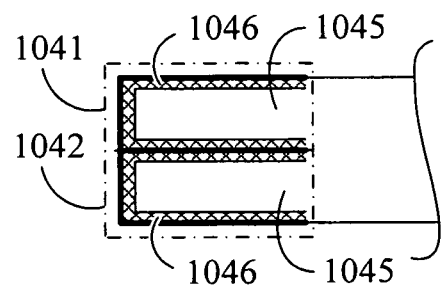
FIG. 102 is a cross-section view of the insulated split-flow conductive structure 1041 and/or the insulated split-flow conductive structure 1042 shown in FIG. 101, in which at least one side without insulator installed.

FIG. 102 is a cross-section view of the insulated split-flow conductive structure 1041 and/or the insulated split-flow conductive structure 1042 shown in FIG. 101, in which at least one side without insulator installed; as shown in FIG. 102, which is the cross-section structure of two parallel laminated insulated split-flow conductive structures, in which at least one or two sides of the conductive body 1045 without insulator installed.

Figure 103:
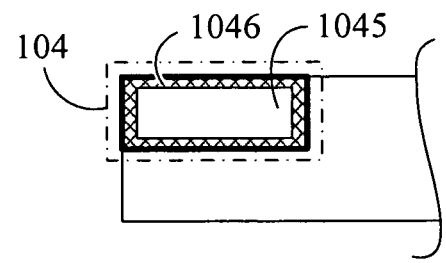
FIG. 103 is the H-H cross-section view of the insulated split-flow conductive structure 104 pasted at the electrode plate at single side, according to the present invention.

FIG. 103 is the H-H cross-section view of the insulated split-flow conductive structure 104 pasted at the electrode plate at single side, according to the present invention; as shown in FIG. 103, which is the cross-section structure of a layer of the insulated split-flow conductive structure 104 pasted at the electrode plate 101 at single side.

Figure 104:
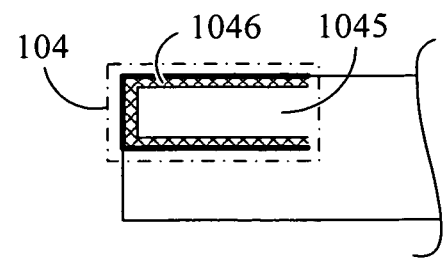
FIG. 104 is a cross-section view of the insulated split-flow conductive structure 104 shown in FIG. 103, in which at least one side without insulator installed.

FIG. 104 is a cross-section view of the insulated split-flow conductive structure 104 shown in FIG. 103, in which at least one side without insulator installed; as shown in FIG. 104, which is the cross-section structure of a layer of the insulated split-flow conductive structure 104 pasted at the electrode plate 101 at single side, in which at least one side of the conductive body 1045 without insulator installed.

For the above various equalizing electrode plate with insulated split-flow conductive structures, which are applied to positive and negative electrode plates constituting the electrode pair for the device with storage-discharge function, and further applied to a number of electrode pairs, which are parallel or in series, for the expansion of rated voltage and constant value current.

The invention claimed is:

1. An equalizing electrode plate structure, comprising:
   an electrode plate used as a positive pole or as a negative pole;
   an electrochemically active substance (103) coated on the electrode plate;
   at least one input/output terminal disposed on at least one side of the electrode plate for outputting and/or inputting electric energy to the electrode plate;
   an insulated split-flow conductive structure (104) including a part of a conductive body (1045) and an insulator (1046), the insulated split-flow conductive structure (104) having a first end connected to the input/output terminal (102) and a second end connected to the electrode plate at a location away from the electric energy input/output terminal, wherein the insulator surrounds a part of the conductive structure (104) extending from the first end of the conductive structure to the second end of the conductive structure, and wherein at least one side of the first end and at least one side of the second end of the conductive structure are uncovered by the insulator to permit electrical connection of the first and second ends of the part of the conductive body included in said insulated split-flow conductive structure (104), said insulated split flow conductive structure (104) thereby providing a current path directly from said input/output terminal (102) to the location of the electrode plate that is away from the input/output terminal (102); and
   wherein electrical energy is transmitted between an area of the electrode plate having a current path farther away from the input/output terminal or an area of the electrode plate are with larger impedance and the input/output terminal, and the conductive body and the electrochemical active substance have a more uniform current density than a plate not having the insulated split-flow conductive structure when outputting and/or inputting electrical energy for transforming electrical energy to chemical energy or chemical energy to electrical energy.

2. The equalizing electrode structure as claimed in claim 1, wherein the conductive body (1045) of the insulated split-flow conductive structure (104) is made in at least one of the following ways:
   (1) made of a same material as that of the electrode plate;
   (2) made of a different material specific resistance lower than that of the electrode plate;
   (3) made of the electrode plate material coated with the conductive body with the specific resistance lower than that of the electrode plate material; and
   (4) made of two or more different materials from that of the electrode plate, wherein the materials are ring coating with each other for two or more layers.

3. The equalizing electrode plate structure as claimed in claim 1, wherein the combination of the insulated split-flow conductive structure (104) and the electrode plate (101) is constituted in at least one of the following ways:
   the insulated split-flow conductive structure (104) and the electrode plate (101) are integrated; one end of the insulated split-flow conductive structure (104) and the electrode plate area set in the electrode plate (101) for directly transmitting current to the electric energy input/output terminal (102) and/or the conductive body of the electrode plate (101) are integrated, another end and the electric energy input/output terminal (102) or the conductive body of the electrode plate (101) are integrated, and the current is directly transmitted in lower impedance therebetween; the insulated split-flow conductive structure (104) in flat or curved shape matches with the electrode plate (101) to form a part of the electrode plate for being co-located in the groove structural body or case of the applying device for electrochemical action.

4. The equalizing electrode plate structure as claimed in claim 1, wherein the combination of the insulated split-flow conductive structure (104) and the electrode plate (101) is constituted in at least one of the following ways:
   one end of the insulated split-flow conductive structure (104) and the electrode plate area set in the electrode plate (101) for directly transmitting current to the electric energy input/output terminal (102) and/or the conductive body of the electrode plate (101) are integrated, another end is welded, riveted, clamped, or locked at the electric energy input/output terminal (102) or the conductive body of the electrode plate (101), and the current is directly transmitted in lower impedance therebetween; the insulated split-flow conductive structure (104) in flat or curved shape matches with the electrode plate (101) to form a part of the electrode plate for being co-located in the groove structural body or case of the applying device for electrochemical action.

5. The equalizing electrode plate structure as claimed in claim 1, wherein the combination of the insulated split-flow conductive structure (104) and the electrode plate (101) is constituted in at least one of the following ways:
   the insulated split-flow conductive structure (104) in the type of independent conductive line or conductive strip constitutes the conductive body (1045), and the two ends of the conductive body (1045) of the insulated split-flow conductive structure (104) respectively connect in a manner of conductive features, wherein one end connects to the electric energy input/output terminal (102) and/or the conductive body of the electrode plate, and another end connects to the electrode plate area set in the electrode plate (101) for directly transmitting current to the electric energy input/output terminal (102) and/or the conductive body of the electrode plate (101) and parallels the electrode plate (101); when outputting and/or inputting electric energy, the current is directly transmitted in lower impedance between the electrode plate area set in the electrode plate (101) for directly transmitting current to the electric energy input/output terminal (102) and/or the conductive body of the electrode plate (101) and the electric energy input/output terminal (102) and/or the conductive body of the electrode plate (101); and the insulated split-flow conductive structure (104) in flat or curved shape matches with the electrode plate (101) to form a part of the electrode plate for being co-located in the groove structural body or case of the applying device for electrochemical action.

6. The equalizing electrode plate structure as claimed in claim 1, wherein the combination of the insulated split-flow conductive structure (104) and the electrode plate (101) is constituted in at least one of the following ways:

the insulated split-flow conductive structure (104) in the type of independent conductive line or conductive strip constitutes the conductive body (1045), and the two ends of the conductive body (1045) of the insulated split-flow conductive structure (104) respectively connect in a manner of conductive features, wherein one end connects to the electric energy input/output terminal (102) and/or the conductive body of the electrode plate, and another end connects to the electrode plate area set in the electrode plate (101) for directly transmitting current to the electric energy input/output terminal (102) and/or the conductive body of the electrode plate (101); the insulated split-flow conductive structure (104) is installed and superimposed on one or two sides of the electrode plate (101); when outputting and/or inputting electric energy, the current in the current path is directly transmitted in lower impedance between the electrode plate area set in the electrode plate (101) for directly transmitting current to the electric energy input/output terminal (102) and/or the conductive body of the electrode plate (101) and the electric energy input/output terminal (102) or the conductive body of the electrode plate (101); and the insulated split-flow conductive structure (104) in flat or curved shape matches with the electrode plate (101) to form a part of the electrode plate for being co-located in the groove structural body or case of the applying device for electrochemical action.

7. The equalizing electrode plate structure as claimed in claim 1, wherein the combination of the insulated split-flow conductive structure (104) and the electrode plate (101) is constituted in at least one of the following ways:

the independent insulated split-flow conductive structure (104) is installed at the external part of the groove structural body or case of the electrode plate, wherein the independent insulated split-flow conductive structure (104) includes the conductive body (1045) of the insulated split-flow conductive structure (104), and the electrode plate area set in the electrode plate (101) for directly transmitting current to the electric energy input/output terminal (102) and/or the conductive body of the electrode plate (101); in the current path when outputting and/or inputting electric energy, between the electrode plate area set in the electrode plate (101) for directly transmitting current to the electric energy input/output terminal (102) and/or the conductive body of the electrode plate (101) and the electric energy input/output terminal (102) and/or the conductive body of the electrode plate (101), the electric energy is directly transmitted in lower impedance therebetween, or the above both separate and respectively operate for outputting and/or inputting electric energy.

8. The equalizing electrode plate with insulated split-flow conductive structure as claimed in claim 1, wherein the electrode plate is constituted by a grid sheet, a radiative grid sheet, a laminate, or a winding type electrode plate, wherein the single side of the electrode plate (101) is installed one or more electric energy input/output terminals (102), and the electric energy input/output terminal (102) extends to one or two sides of the electrode plate (101) for installing with the insulated split-flow conductive structure (104), including extending from a top of the side of the electrode plate to an intermediate part of the side of the electrode plate (101); and/or extending from the top of the side of the electrode plate to a bottom of the side of the electrode plate (101); and/or extending from a top of the electrode plate to the bottom of electrode plate (101) and further extending to the bottom edge of electrode plate (101).

9. The equalizing electrode plate structure as claimed in claim 1, wherein the electric energy input/output terminal (102) or the conductive body of the electrode plate (101) between two electric energy input/output terminals (102) in the non-side electrode plate region of the electrode plate (101) extend for installing with the insulated split-flow conductive structure (104), including extending to an intermediate region between a top and a bottom of the electrode plate, or extending from the top of the electrode plate through the intermediate region of the electrode plate (101) to the bottom edge of the electrode plate (101), or extending from the top of the electrode plate through the intermediate region of the electrode plate (101) to a bottom edge of the electrode plate (101) and further extending to the insulated split-flow conductive structure (104); and/or the electric energy input/output terminal (102) extends to one or two sides of the electrode plate (101) for installing with the insulated split-flow conductive structure (104), including extending to an intermediate part of the side of the electrode plate (101); and/or extending to a bottom of the side of the electrode plate (101); and/or extending to the bottom of the side of the electrode plate (101) and further extending to the bottom edge of the electrode plate (101).

10. The equalizing electrode plate structure as claimed in claim 1, wherein the independent insulated split-flow conductive structure (104) is additional installed at one or more sides of the electrode plate (101), and the independent insulated split-flow conductive structure (104) includes an electric energy input/output terminal (1023) for independently inputting/outputting electric energy, which extends from a top of the side of the electrode plate along the side of the electrode plate (101) to the bottom of the side of the electrode plate (101), and/or extends to the bottom of the electrode plate (101) and further to an intermediate part of the bottom edge of the electrode plate (101), and/or extends to the bottom of the electrode plate (101) and further to the bottom edge of the whole electrode plate (101).

* * * * *